(12) United States Patent
Kawamura et al.

(10) Patent No.: US 9,828,549 B2
(45) Date of Patent: Nov. 28, 2017

(54) LIQUID CRYSTAL COMPOSITION, LIQUID CRYSTAL DISPLAY DEVICE, AND LIQUID CRYSTAL DISPLAY

(71) Applicant: DIC Corporation, Tokyo (JP)

(72) Inventors: Joji Kawamura, Kita-adachi-gun (JP); Makoto Negishi, Kita-adachi-gun (JP); Yoshinori Iwashita, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/768,985

(22) PCT Filed: Feb. 20, 2013

(86) PCT No.: PCT/JP2013/054115
§ 371 (c)(1),
(2) Date: Aug. 19, 2015

(87) PCT Pub. No.: WO2014/128853
PCT Pub. Date: Aug. 28, 2014

(65) Prior Publication Data
US 2015/0376503 A1    Dec. 31, 2015

(51) Int. Cl.
G02F 1/1333  (2006.01)
C09K 19/34   (2006.01)
C09K 19/42   (2006.01)
C09K 19/02   (2006.01)
C09K 19/04   (2006.01)
C09K 19/30   (2006.01)

(52) U.S. Cl.
CPC ...... *C09K 19/3402* (2013.01); *C09K 19/0216* (2013.01); *C09K 19/42* (2013.01); *C09K 2019/0466* (2013.01); *C09K 2019/3009* (2013.01); *C09K 2019/3012* (2013.01); *C09K 2019/3016* (2013.01); *C09K 2019/3019* (2013.01); *C09K 2019/3422* (2013.01)

(58) Field of Classification Search
CPC ... G02F 1/1333; C09K 19/3402; C09K 19/42; C09K 19/0216; C09K 2019/0466; C09K 2019/3009; C09K 2019/3422; C09K 2019/3012; C09K 2019/3016; C09K 2019/3019
USPC .......................... 252/299.01, 299.61; 428/1.1
See application file for complete search history.

(56) References Cited

U.S. PATENT DOCUMENTS 7,838,090 B2 * 11/2010 Wittek ............... C09K 19/42
                                                        252/299.61
8,178,173 B1 * 5/2012 Matsumoto ........ C09K 19/3402
                                                        252/299.61

| 2005/0179007 A1 | 8/2005 | Manabe et al. |
| 2007/0176144 A1 | 8/2007 | Francis et al. |
| 2008/0029736 A1 | 2/2008 | Saito |
| 2008/0029737 A1 | 2/2008 | Saito |
| 2008/0128653 A1 | 6/2008 | Manabe et al. |
| 2009/0101869 A1 | 4/2009 | Czanta et al. |
| 2009/0194739 A1 | 8/2009 | Wittek et al. |
| 2010/0302498 A1 | 12/2010 | Saito |
| 2011/0051023 A1 | 3/2011 | Fujita et al. |
| 2012/0141694 A1 | 6/2012 | Matsumoto et al. |
| 2013/0300996 A1 | 11/2013 | Takeuchi et al. |

FOREIGN PATENT DOCUMENTS

| CN | 101932669 A | 12/2010 |
| EP | 2557140 A2 | 2/2013 |
| JP | 2005-179676 A | 7/2005 |
| JP | 2007-526368 A | 9/2007 |
| JP | 2008-37918 A | 2/2008 |
| JP | 2008-38018 A | 2/2008 |
| JP | 2008-156642 A | 7/2008 |
| JP | 2009-185285 A | 8/2009 |
| JP | 2010-275390 A | 12/2010 |
| JP | 2011-52120 A | 3/2011 |

(Continued)

OTHER PUBLICATIONS

International Search Report dated Mar. 19, 2013, issued in corresponding application No. PCT/JP2013/054115 (2 pages).

(Continued)

*Primary Examiner* — Geraldina Visconti
(74) *Attorney, Agent, or Firm* — Westerman, Hattori, Daniels & Adrian, LLP

(57) ABSTRACT

There is provided a liquid crystal composition containing any one or two or more of compounds represented by general formula (i) below and any one or two or more of compounds represented by general formula (ii) below.

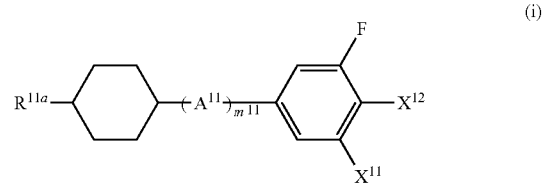

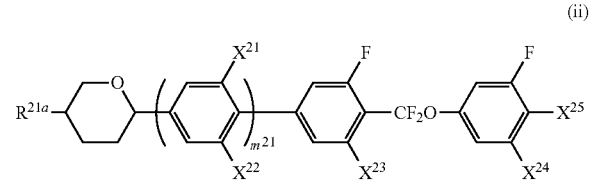

14 Claims, 1 Drawing Sheet

(56) References Cited

FOREIGN PATENT DOCUMENTS

WO          2012/043387 A1     4/2012

OTHER PUBLICATIONS

International Search Report dated Apr. 16, 2013 issued in correponding application No. PCT/JP2013/055938, w/ English translation. (6 pages).
Office Action dated Feb. 23, 2015, issued in corresponding Korean application No. 10-2014-7014495, with English Translation (10 pages).
Office Action dated Dec. 29, 2014, issued in corresponding Taiwanese application No. 102107977, with English Translation (14 pages).
European Search Report dated Jan. 14, 2016, issued in counterpart European Patent Application No. 13874855.3, (7 pages).

* cited by examiner

LIQUID CRYSTAL COMPOSITION, LIQUID CRYSTAL DISPLAY DEVICE, AND LIQUID CRYSTAL DISPLAY

TECHNICAL FIELD

The present invention relates to a nematic liquid crystal composition useful as a liquid crystal display material and exhibiting a positive value of dielectric anisotropy (Δ∈), and also relates to a liquid crystal display device and liquid crystal display using the composition.

BACKGROUND ART

Liquid crystal display devices have been used for watches and electronic calculators, various measuring apparatuses, automotive panels, word processors, electronic notebooks, printers, computers, televisions, watches, advertising displays, etc. Typical examples of a liquid crystal display mode include a TN (twisted nematic) mode, a STN (super twisted nematic) mode, a vertical alignment mode and an IPS (in-plane switching) mode using TFT (thin-film transistor), and the like. Liquid crystal compositions used for these liquid crystal display devices are required to have stability to external stimuli such as moisture, air, heat, light, and the like, exhibit a liquid crystal phase within as wide a temperature range as possible including room temperature as a center, and have low viscosity and low drive voltage. Further, each of the liquid crystal compositions is composed of several types to several tens types of compounds in order to have optimum values of dielectric anisotropy (Δ∈) and/or refractive index anisotropy (Δn) for a display device.

A vertical alignment (VA)-mode display uses a liquid crystal composition having negative Δ∈, while a horizontal alignment-mode display, such as a TN mode, a STN mode, an IPS (in-plane switching) mode, or the like, uses a liquid crystal composition having positive Δ∈. Also, there has been reported a driving method in which a liquid crystal composition having positive Δ∈ is vertically aligned with no voltage applied, and display is performed by applying a transverse electric field, and the need for a liquid crystal composition having positive Δ∈ is further increased. On the other hand, low-voltage driving, fast response, and a wide operating temperature range are required for all driving methods. That is, a large absolute value of positive Δ∈, low viscosity (η), and a high nematic-isotropic liquid phase transition temperature (Tni) are required. Also, in order to set Δn×d which is the product of Δn and a cell gap (d) to a predetermined value, it is necessary to adjust Δn of a liquid crystal composition within a proper range according to the cell gap. In addition, when a liquid crystal display device is applied to a television or the like, fast response is regarded as important, and thus a liquid crystal composition having low rotational viscosity ($\gamma_1$) is required.

A liquid crystal composition disclosed as a configuration of a fast response-oriented liquid crystal composition uses, for example, a compound represented by formula (A-1) or formula (A-2) below, which is a liquid crystal compound having positive Δ∈, in combination with a liquid crystal compound represented by formula (B) below having neutral Δ∈. The liquid crystal composition is characterized in that the liquid crystal compound having positive Δ∈ has a —CF$_2$O structure, and the liquid crystal compound having neutral Δ∈ has an alkenyl group. These characteristics are widely known in the field of liquid crystal compositions (Patent Literatures 1 to 4).

[Chem. 1]

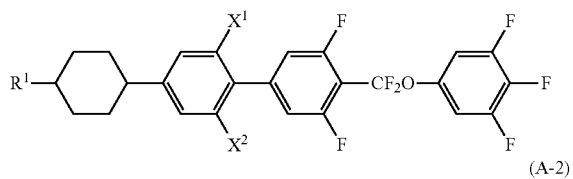

(A-1)

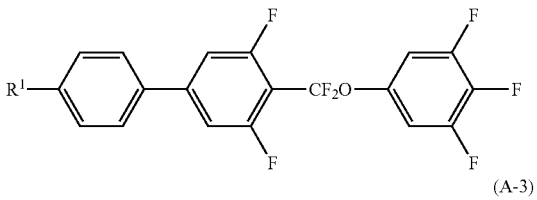

(A-2)

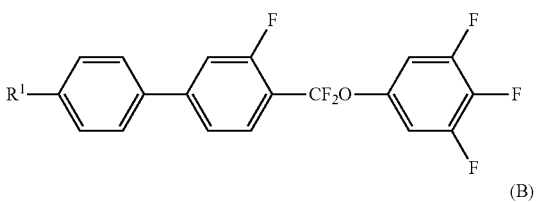

(A-3)

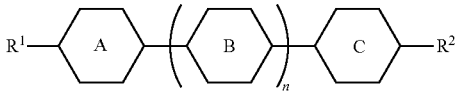

(B)

On the other hand, with expanding application of liquid crystal display devices, significant changes are found in use method and manufacturing method thereof. In order to cope with these changes, it is demanded to optimize characteristics other than basic physical property values which have been known. That is, VA-mode and IPS-mode liquid crystal display devices using liquid crystal compositions are widely used, and supersized liquid crystal devices of 50 inches or more are put into practical application. With increases in substrate size, instead of a usual vacuum injection method, a one drop fill (ODF) method becomes the mainstream of a method of injecting a liquid crystal composition into a substrate. However, when a liquid crystal composition is dropped on a substrate, the problem of degrading display quality by dropping marks is surfaced. Further, in a process of manufacturing a liquid crystal display device by the ODF method, it is necessary to drop a liquid crystal in an optimum amount according to the size of a liquid crystal display device. A large deviation of the dropping amount from the optimum value disrupts a balance between previously designed refractive index and driving electric field of a liquid crystal display device and causes the occurrence of spots and display defects such as contrast defect and the like. In particular, small liquid crystal display devices in heavy use for recently popular smart phones have a small optimum amount of liquid crystal filling, and thus it is difficult to control a deviation from the optimum value within a predetermined range. Therefore, in order to maintain liquid crystal display devices in high yield, for example, a liquid crystal composition is required to be little influenced by a rapid pressure change and impact produced in a dropping apparatus during dropping of a liquid crystal, and to be capable of continuous stable dropping over a long time.

Accordingly, for liquid crystal compositions used for active matrix drive liquid crystal display devices which are driven with TFT elements or the like, developments are being required in view of a method for manufacturing a liquid crystal display device in addition to the characteristic of having high resistivity, high voltage holding ratio, and stability to external stimuli such as light, heat, and the like, which has been regarded as important, while maintaining the characteristics and performance, such as fast response and the like, which are required for liquid crystal display devices.

CITATION LIST

Patent Literature

PTL 1: Japanese Unexamined Patent Application Publication No. 2008-037918
PTL 2: Japanese Unexamined Patent Application Publication No. 2008-038018
PTL 3: Japanese Unexamined Patent Application Publication No. 2010-275390
PTL 4: Japanese Unexamined Patent Application Publication No. 2011-052120

SUMMARY OF INVENTION

Technical Problem

A problem to be solved by the invention is to provide a liquid crystal composition having positive $\Delta\epsilon$, a liquid phase over a wide temperature range, low viscosity, good solubility at a low temperature, high resistivity and voltage holding ratio, and stability to heat and light, and being capable of producing, in high yield, a liquid crystal display device having good display quality and causing little display defects such as image sticking, dropping marks, and the like, and also provide a liquid crystal display device using the liquid crystal composition.

Solution to Problem

As a result of research on various liquid crystal compounds and various chemical substances, the inventors of the present invention found that the problem can be resolved by combining specified liquid crystal compounds, leading to the achievement of the present invention. That is, a first embodiment of the present invention relates to a liquid crystal composition described below, a second embodiment of the present invention relates to a liquid crystal device described below, and a third embodiment of the present invention relates to a liquid crystal display described below.

[1] A liquid crystal composition containing any one or two or more of compounds represented by general formula (i) below and any one or two or more of compounds represented by general formula (ii) below.

[Chem. 2]

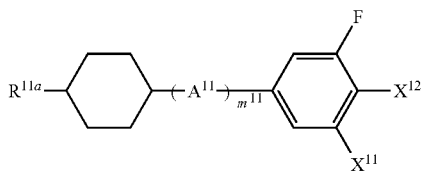

(i)

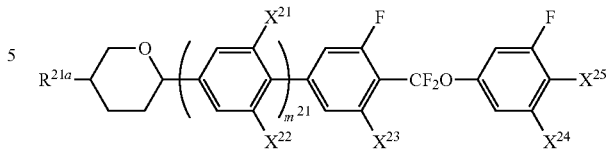

(ii)

(In the formulae, $R^{11a}$ and $R^{21a}$ each independently represent an alkyl group having 1 to 8 carbon atoms; one or nonadjacent two or more —$CH_2$— in the alkyl group may be each independently substituted by —CH=CH—, —C≡C—, —O—, —CO—, —COO—, or —OCO—; one or two or more hydrogen atoms in the alkyl group may be each independently substituted by a fluorine atom or a chlorine atom; $m^{11}$ represents 1 or 2; $A^{11}$ represents a trans-1,4-cyclohexylene group or a 1,4-phenylene group which may have a fluorine atom or a chlorine atom substituted for a hydrogen atom; when $m^{11}$ is 1, $A^{11}$ represents a 1,4-phenylene group which may have a fluorine atom or a chlorine atom substituted for a hydrogen atom; when $m^{11}$ is 2, a plurality of $A^{11}$ may be the same or different, and at least one $A^{11}$ represents a 1,4-phenylene group which may have a fluorine atom or a chlorine atom substituted for a hydrogen atom;

$X^{11}$ represents a hydrogen atom, a fluorine atom, or a chlorine atom; $X^{12}$ represents a hydrogen atom, a fluorine atom, a chlorine atom, a cyano group, —$CF_3$, or —$OCF_3$; $m^{21}$ represents 0 or 1; $X^{21}$, $X^{22}$, $X^{23}$, and $X^{24}$ each independently represent a hydrogen atom, a fluorine atom, or a chlorine atom; and $X^{25}$ represents a hydrogen atom, a fluorine atom, a chlorine atom, a cyano group, —$CF_3$, or —$OCF_3$.)

[2] The liquid crystal composition described above in [1], wherein $m^{11}$ in the general formula (i) is 2.

[3] The liquid crystal composition described above in [1] or [2], containing two or more compounds represented by the general formula (i).

[4] The liquid crystal composition described above in any one of [1] to [3], containing two or more compounds represented by the general formula (ii).

[5] The liquid crystal composition described above in any one of [1] to [4], containing a compound represented by general formula (L) below.

[Chem. 3]

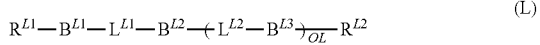

(L)

(In the formula, $R^{L1}$ and $R^{L2}$ each independently represents an alkyl group having 1 to 8 carbon atoms; one or nonadjacent two or more —$CH_2$— in the alkyl group may be each independently substituted by —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of:

(a) a 1,4-cyclohexylene group (one —$CH_2$— or nonadjacent two or more —$CH_2$— present in the group may be substituted by —O—); and (b) a 1,4-phenylene group (one —CH= or nonadjacent two or more —CH= present in the group may be substituted by —N=), and one and/or two or more hydrogen atoms in the group (a) and the group (b) may be each independently substituted by a cyano group, a fluorine atom, or a chlorine atom;

$L^{L1}$ and $L^{L2}$ each independently represent —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—; and when OL is 2 or 3, and a plurality of $L^{L2}$ are present, $L^{L2}$ may be the same or different, and when OL is 2 or 3, and a plurality of $B^{L3}$ are present, $B^{L3}$ may be the same or different.)

[6] The liquid crystal composition described above in any one of [1] to [5], containing a compound represented by general formula (M) below.

[Chem. 4]

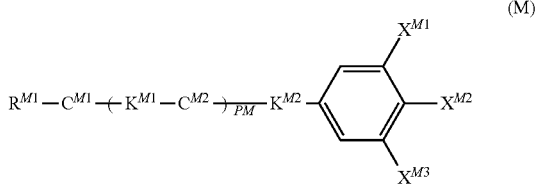

(M)

(In the formula, $R^{M1}$ represent an alkyl group having 1 to 8 carbon atoms; one or nonadjacent two or more —CH$_2$— in the alkyl group may be each independently substituted by —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of:

(d) a 1,4-cyclohexylene group (one —CH$_2$— or nonadjacent two or more —CH$_2$— present in the group may be substituted by —O— or —S—); and (e) a 1,4-phenylene group (one —CH= or nonadjacent two or more —CH= present in the group may be substituted by —N=), and one and/or two or more hydrogen atoms in the group (d) and the group (e) may be each independently substituted by a cyano group, a fluorine atom, or a chlorine atom;

$K^{M1}$ and $K^{M2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—;

when PM is 2, 3, or 4, and a plurality of $K^{M1}$ are present, $K^{M1}$ may be the same or different, and when PM is 2, 3, or 4, and a plurality of $C^{M2}$ are present, $C^{M2}$ may be the same or different;

$X^{M1}$ and $X^{M3}$ each independently represent a hydrogen atom, a chlorine atom, or a fluorine atom; and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. However, the compounds represented by the general formula (i) and general formula (ii) are excluded.)

[7] A liquid crystal display device using the liquid crystal composition described above in any one of [1] to [6].

[8] A liquid crystal display device for an IPS mode using the liquid crystal composition described above in any one of [1] to [6].

[9] A liquid crystal display device for a FFS mode using the liquid crystal composition described above in any one of [1] to [6].

[10] A liquid crystal display device for an OCB mode using the liquid crystal composition described above in any one of [1] to [6].

[11] A liquid crystal display device for an ECB mode using the liquid crystal composition described above in any one of [1] to [6].

[12] A liquid crystal display device for a VA mode using the liquid crystal composition described above in any one of [1] to [6].

[13] A liquid crystal display using the liquid crystal display device described above in any one of [7] to [12].

Advantageous Effects of Invention

A liquid crystal composition having positive dielectric anisotropy according to the present invention has a liquid phase over a wide temperature range, significantly lower viscosity than usual, good solubility at a low temperature, and very small changes in resistivity and voltage holding ratio with heat and light. Therefore, the liquid crystal composition of the present invention has high practicability (applicability) for liquid crystal products, and an IPS-mode or FFS-mode liquid crystal display device using the liquid crystal composition can achieve fast response. Also, the liquid crystal composition of the present invention is very useful because it can stably exhibit its performance even after a process for manufacturing a liquid crystal display device, and thus display defects due to the manufacturing process are suppressed, thereby permitting manufacture of a liquid crystal display device in high yield.

DESCRIPTION OF EMBODIMENTS

Figure 1:
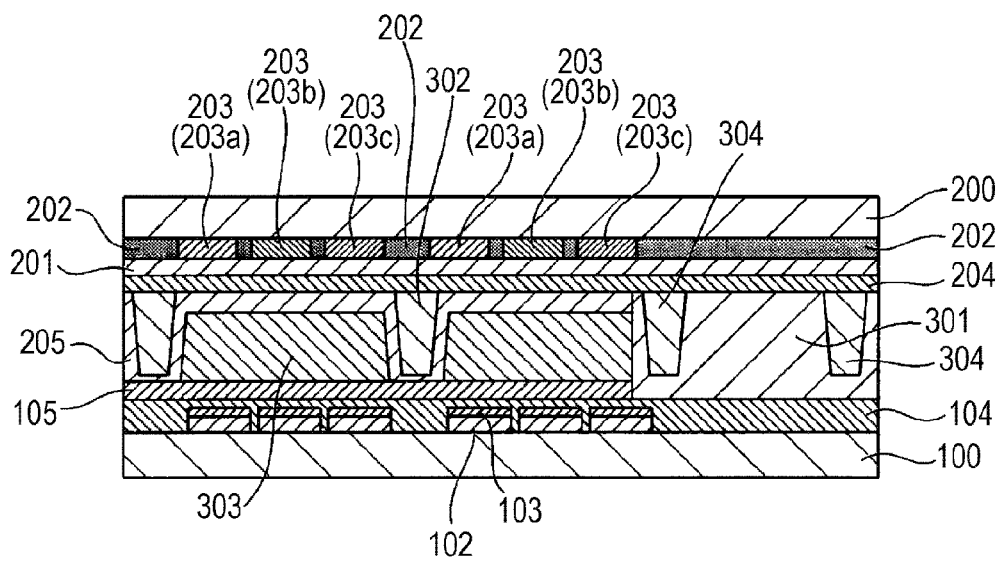
FIG. 1 is a sectional view of a liquid crystal display device of the present invention. A substrate denoted by 100 to 105 is referred to as a "back plane", and a substrate denoted by 200 to 205 is referred to as a "front plane".

A liquid crystal composition having positive dielectric anisotropy according to a first embodiment of the present invention contains a component (A) which is a dielectrically positive component. The component (A) is composed of a compound having a dielectric anisotropy of 2 or more. The dielectric anisotropy of a compound refers to a value obtained by extrapolation from a measured value of dielectric anisotropy of a composition prepared by adding the compound to a composition which has a dielectric anisotropy of about 0 at 25° C.

In a composition below, "%" represents "% by mass" unless otherwise specified.

The component (A) contains any one or two or more of compounds represented by general formula (i) below and any one or two or more of compounds represented by general formula (ii) below.

[Chem. 5]

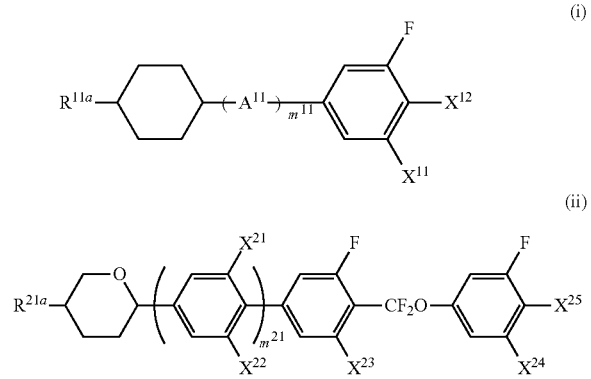

<Compound Represented by General Formula (i)>

In the general formula (i), $R^{11a}$ represents an alkyl group having 1 to 8 carbon atoms, one or nonadjacent two or more —$CH_2$— in the alkyl group may be each independently substituted by —CH=CH—, —C≡C—, —O—, —CO—, —COO—, or —OCO—, and one or two or more hydrogen atoms in the alkyl group may be substituted by a fluorine atom or a chlorine atom.

Further, $R^{11a}$ is preferably a linear alkyl group having 1 to 8 carbon atoms, and the number of carbon atoms in the alkyl group is preferably 1 to 6, more preferably 2 to 5, even more preferably 2, 3, or 5, even more preferably 2 or 3, and still more preferably 3.

In the general formula (i), $X^{11}$ is preferably a hydrogen atom or a fluorine atom.

In the general formula (i), $X^{12}$ is preferably a fluorine atom or —$OCF_3$.

When $m^{11}$ in the general formula (i) is 2, a plurality of $A^{11}$ may be the same or different.

When $m^{11}$ in the general formula (i) is 1, $A^{11}$ is preferably a 1,4-phenylene group which may be substituted by a fluorine atom; when $m^{11}$ is 2, at least one of the two $A^{11}$ is preferably a 1,4-phenylene group which may be substituted by a fluorine atom; and when $m^{11}$ is 2, one of the $A^{11}$ is a trans-1,4-cyclohexylene group, and the other $A^{11}$ is a 1,4-phenylene group which may be substituted by a fluorine atom, the trans-1,4-cyclohexylene group as one of the $A^{11}$ is preferably bonded to a cyclohexylene group having the alkyl group to form linkage of two cyclohexylene groups.

The types of compounds which can be combined are not particularly limited, but a plurality of compounds represented by the general formula (i) can be used in combination according to desired performance such as solubility at a low temperature, transition temperature, electric reliability, birefringence, etc. For example, according to an embodiment of the present invention, the number of the type of compound used and represented by the general formula (i) is 1. According to another embodiment of the present invention, the number of the types is 2 or more, and when a plurality of compounds are used, two compounds are preferably used. In this case, it is preferred to use a compound having a fluorine atom as $X^{12}$ and a compound having —$OCF_3$ as $X^{12}$.

In view of solubility at a low temperature, transition temperature, electric reliability, birefringence, etc., the content of a compound represented by the general formula (i) has a preferred upper limit value and lower limit value according to an embodiment.

Relative to the total mass of the liquid crystal composition of the present invention, the lower limit value of the content of the compound is preferably 1%, preferably 5%, preferably 7%, and preferably 9%, and the upper limit value of the content of the compound is preferably 25%, preferably 20%, preferably 16%, preferably 12%, preferably 10%, preferably 8%, and preferably 7%.

When only one of the compounds is used, the lower limit value of the content of the compound relative to the total mass is preferably 1%, preferably 2%, preferably 5%, and preferably 6%, and the upper limit value of the content of the compound relative to the total mass is preferably 25%, preferably 20%, preferably 15%, preferably 12%, preferably 10%, preferably 9%, and preferably 7%.

When two or more of the compounds are used, the lower limit value of the total content of the two compounds relative to the total mass is preferably 6%, preferably 8%, and preferably 10%, and the upper limit value of the total content of the two compounds relative to the total mass is preferably 25%, preferably 20%, preferably 15%, and preferably 12%.

When solubility of the liquid crystal composition is regarded as important, two compounds represented by the general formula (i) are preferably used, and when the content of compounds represented by the general formula (i) is desired to be increased, the two compounds are preferably used.

According to an embodiment, the content of a compound represented by the general formula (i) relative to the total mass is preferably 1% to 15% by mass, preferably 1% to 12% by mass, preferably 1% to 10% by mass, and preferably 1% to 9% by mass, and according to another embodiment, the content is preferably 5% to 25% by mass, preferably 5% to 20% by mass, preferably 7% to 15% by mass, and preferably 7% to 13% by mass.

In the general formula (i), $m^{11}$ is preferably 1 or 2, and when fast response is regarded as important, $m^{11}$ is preferably 1, while when Tni is regarded as important, $m^{11}$ is preferably 2.

A compound in which $m^{11}$ in the general formula (i) is 2 is preferably a compound represented by general formula (X-1) below.

[Chem. 6]

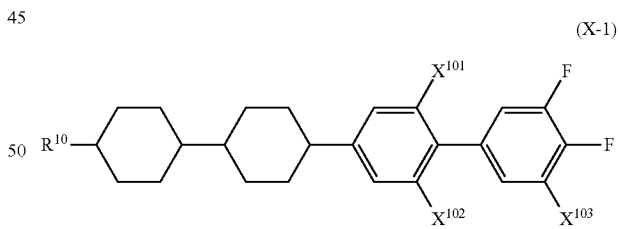

(In the formula, $X^{101}$ to $X^{103}$ each independently represent a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-1) can be properly combined according to each embodiment in view of solubility at a low temperature, transition temperature, electric reliability, birefringence, etc. For example, according to an embodiment of the present invention, the number of the compound used is 1. According to another embodiment of the present invention, the number of the compounds is 2. According to still another embodiment, the number of the compounds is 3. According to a further embodiment, the number of the compounds is 4. According to a further embodiment, the number of the compounds is 5 or more.

In view of solubility at a low temperature, transition temperature, electric reliability, birefringence, etc., the content of a compound represented by the general formula (X-1) has an upper limit value and a lower limit value according to each embodiment. For example, according to an embodiment of the present invention, the content of the compound relative to the total mass of the liquid crystal composition of the present invention is 2% to 40% by mass; according to another embodiment, the content of the compound is 3% to 40% by mass; according to still another embodiment, the content of the compound is 5% to 40% by mass; according to a further embodiment, the content of the compound is 6% to 40% by mass; according to a further embodiment, the content of the compound is 7% to 40% by mass; according to a further embodiment, the content of the compound is 8% to 40% by mass; according to a further embodiment, the content of the compound is 9% to 40% by mass; according to a further embodiment, the content of the compound is 13% to 40% by mass; according to a further embodiment, the content of the compound is 18% to 40% by mass; and according to a further embodiment, the content of the compound is 23% to 40% by mass.

Also, for example, according to an embodiment of the present invention, the content of the compound relative to the total mass is 2% to 40% by mass; according to another embodiment, the content of the compound is 2% to 30% by mass; according to still another embodiment, the content of the compound is 2% to 25% by mass; according to a further embodiment, the content of the compound is 2% to 20% by mass; according to a further embodiment, the content of the compound is 2% to 15% by mass; according to a further embodiment, the content of the compound is 2% to 10% by mass; according to a further embodiment, the content of the compound is 2% to 6% by mass; and according to a further embodiment, the content of the compound is 2% to 4% by mass.

Further, the compound represented by the general formula (X-1) and used in the liquid crystal composition of the present invention is preferably a compound represented by general formula (X-1-1).

[Chem. 7]

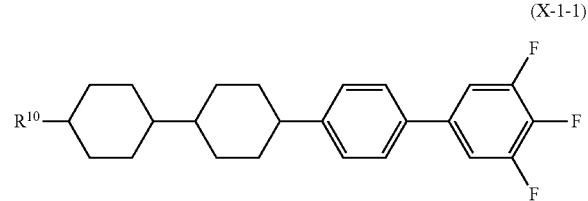

(X-1-1)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-1-1) can be properly combined according to each embodiment in view of solubility at a low temperature, transition temperature, electric reliability, birefringence, etc. For example, according to an embodiment of the present invention, the number of the compound used is 1. According to another embodiment of the present invention, the number of the compounds is 2. According to still another embodiment of the present invention, the number of the compounds is 3. According to a further embodiment of the present invention, the number of the compounds is 4 or more.

The content of a compound represented by the general formula (X-1-1) has an upper limit value and a lower limit value according to each embodiment in view of solubility at a low temperature, transition temperature, electric reliability, birefringence, etc. For example, according to an embodiment of the present invention, the content of the compound relative to the total mass of the liquid crystal composition of the present invention is 3% to 30% by mass; according to another embodiment, the content of the compound is 4% to 30% by mass; according to still another embodiment, the content of the compound is 6% to 30% by mass; according to a further embodiment, the content of the compound is 9% to 30% by mass; according to a further embodiment, the content of the compound is 12% to 30% by mass; according to a further embodiment, the content of the compound is 15% to 30% by mass; according to a further embodiment, the content of the compound is 18% to 30% by mass; and according to a further embodiment, the content of the compound is 21% to 30% by mass.

Also, for example, according to an embodiment of the present invention, the content of the compound relative to the total mass is 3% to 30% by mass; according to another embodiment, the content of the compound is 3% to 20% by mass; according to still another embodiment, the content of the compound is 3% to 13% by mass; according to a further embodiment, the content of the compound is 3% to 10% by mass; and according to a further embodiment, the content of the compound is 3% to 7% by mass.

Further, preferred examples of the compound represented by the general formula (X-1-1) and used in the liquid crystal composition of the present invention include compounds represented by formula (36.1) to formula (36.4), and particularly a compound represented by formula (36.1) and/or formula (36.2) is preferably contained.

[Chem. 8]

(36.1)

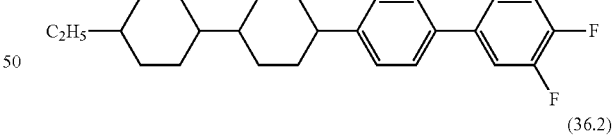

(36.2)

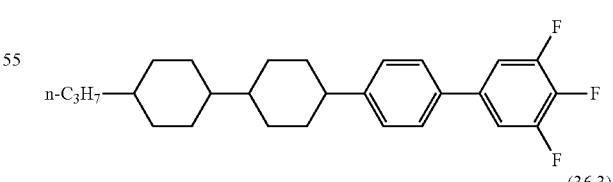

(36.3)

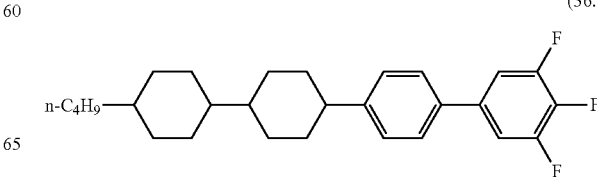

-continued (36.4)

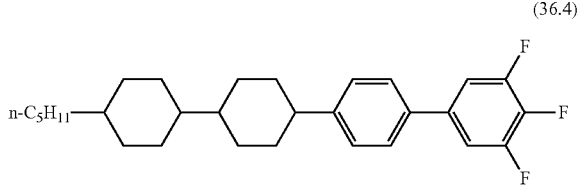

A compound in which $m^{11}$ in the general formula (i) is 2 is preferably a compound represented by general formula (X-1-2) below.

[Chem. 9]

(X-1-2)

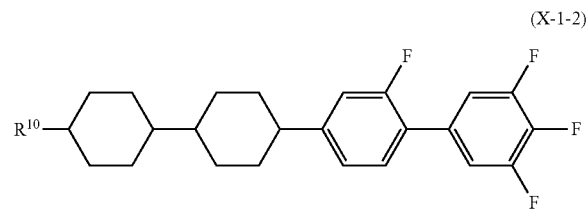

(In the formula, $R^{10}$ represents an alkyl group having 1 to 5 carbon atoms, an alkenyl group having 2 to 5 carbon atoms, or an alkoxy group having 1 to 4 carbon atoms.)

Relative to the total mass of the liquid crystal composition of the present invention, the content of a compound represented by the general formula (X-1-2) is preferably 1% by mass or more, more preferably 2% by mass or more, and still more preferably 6% by mass or more. In addition, in view of solubility at a low temperature, transition temperature, electric reliability, etc., the maximum ratio is preferably limited to 15% by mass or less, more preferably 13% by mass or less, still more preferably 10% by mass or less, and particularly preferably 9% by mass or less.

Examples of a more preferred embodiment include embodiments where the content is 1% to 10% by mass, 2% to 8% by mass, 2% to 7% by mass, 2% to 5% by mass, 4% to 8% by mass, and 5% to 8% by mass, respectively.

Preferred examples of the compound represented by the general formula (X-1-2) include compounds represented by formula (37.1) to formula (37.4), and particularly a compound represented by formula (37.2) is preferably contained.

[Chem. 10]

(37.1)

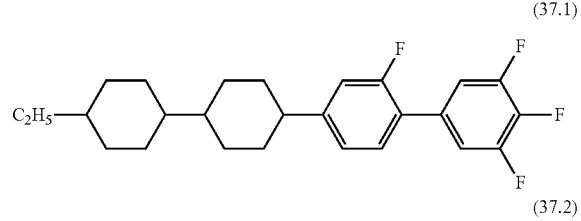

(37.2)

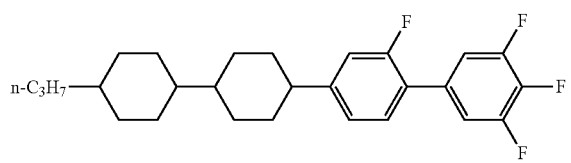

(37.3)

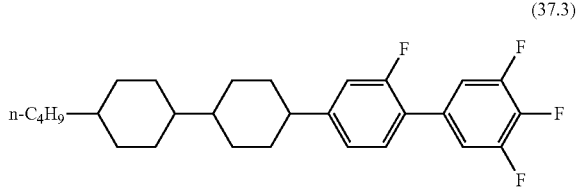

(37.4)

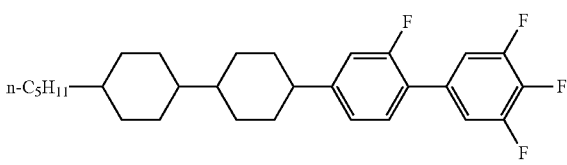

In the liquid crystal composition of the present invention, in view of solubility at a low temperature, transition temperature, electric reliability, etc., the content of a compound represented by the formula (37.2) relative to the total mass of the liquid crystal composition of the present invention is preferably 1% by mass or more and 20% by mass or less, more preferably 2% by mass or more and 15% by mass or less, still more preferably 2% by mass or more and 10% by mass or less, and particularly preferably 2% by mass or more and 8% by mass or less.

A compound in which $m^{11}$ in the general formula (i) is 2 is preferably a compound represented by general formula (X-1-3) below.

[Chem. 11]

(X-1-3)

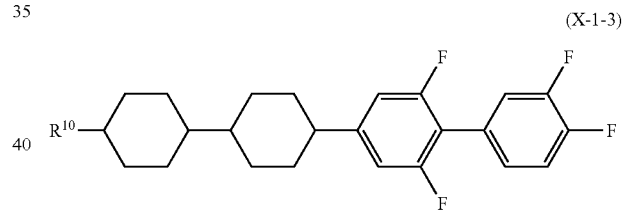

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but compounds represented by the general formula (X-1-3) are preferably used alone or in combination of two or more in view of solubility at a low temperature, transition temperature, electric reliability, birefringence, etc.

Relative to the total mass of the liquid crystal composition of the present invention, the content of a compound represented by the general formula (X-1-3) is preferably 1% by mass or more, more preferably 2% by mass or more, and still more preferably 3% by mass or more. In addition, in view of solubility at a low temperature, transition temperature, electric reliability, etc., the maximum ratio is preferably limited to 15% by mass or less, more preferably 10% by mass or less, still more preferably 8% by mass or less, and particularly preferably 7% by mass or less.

Examples of q more preferred embodiment include embodiments where the content is 1% to 10% by mass, 3% to 8% by mass, 2% to 6% by mass, 2% to 5% by mass, 2% to 4% by mass, 3% to 7% by mass, 4% to 7% by mass, and 5% to 7% by mass, respectively.

Preferred examples of the compound represented by the general formula (X-1-3) include compounds represented by formula (38.1) to formula (38.4), and particularly a compound represented by formula (38.2) is preferably contained.

[Chem. 12]

(38.1)

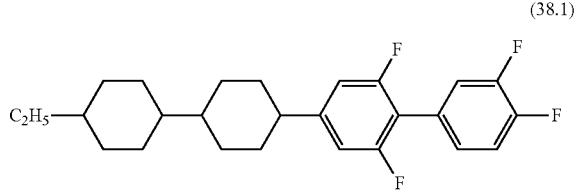
(38.2)

(38.3)

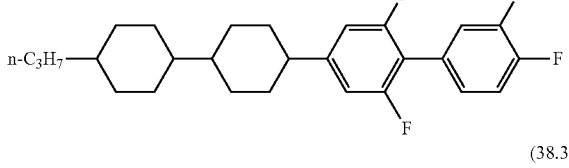
(38.4)

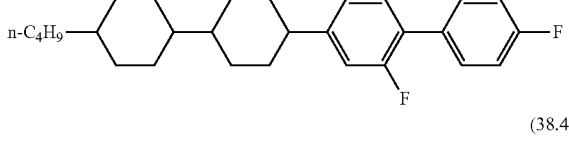

In the liquid crystal composition of the present invention, the content of the compound represented by the formula (38.2) relative to the total mass of the liquid crystal composition of the present invention is preferably 1% by mass or more and 15% by mass or less, more preferably 2% by mass or more and 10% by mass or less, still more preferably 3% by mass or more and 8% by mass or less, and particularly preferably 4% by mass or more and 6% by mass or less.

A compound in which $m^{11}$ in the general formula (i) is 2 is preferably a compound represented by general formula (X-2) below.

[Chem. 13]

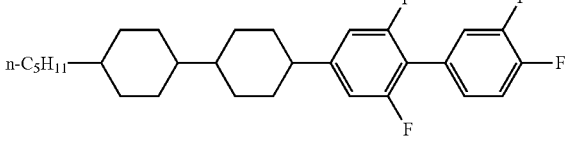
(X-2)

(In the formula, $X^{102}$ and $X^{103}$ each independently represent a fluorine atom or a hydrogen atom, $Y^{10}$ represents a fluorine atom, a chlorine atom, or —$OCF_3$, and $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-2) are preferably used alone or in combination of two or more in view of solubility at a low temperature, transition temperature, electric reliability, birefringence, etc.

A compound in which $m^{11}$ in the general formula (i) is 2 is preferably a compound represented by general formula (X-2-1) below.

[Chem. 14]

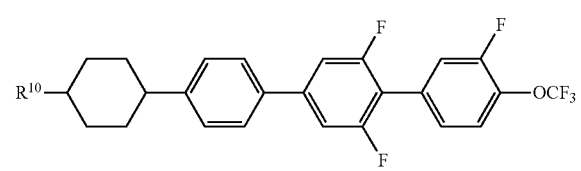
(X-2-1)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but compounds represented by the general formula (X-2-1) are preferably used alone or in combination of two or more and more preferably used alone or in combination of three or more in view of solubility at a low temperature, transition temperature, electric reliability, birefringence, etc.

In view of solubility at a low temperature, transition temperature, electric reliability, etc., the content of a compound represented by the general formula (X-2-1) relative to the total mass of the liquid crystal composition of the present invention is preferably 3% by mass or more and 15% by mass or less, more preferably 4% by mass or more and 10% by mass or less, and particularly preferably 4% by mass or more and 7% by mass or less.

Preferred examples of the compound represented by the general formula (X-2-1) include compounds represented by formula (39.1) to formula (39.4), and particularly a compound represented by formula (39.2) is preferably contained.

[Chem. 15]

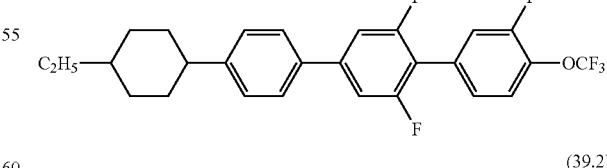
(39.1)

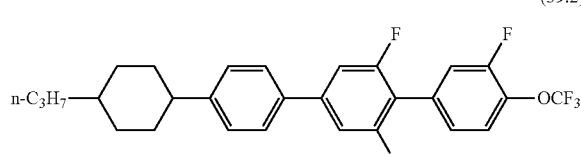
(39.2)

-continued

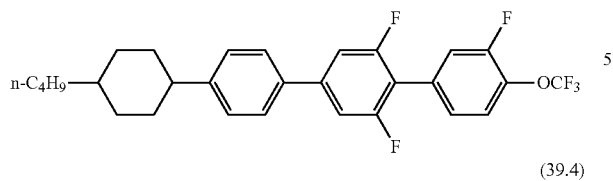

(39.3)

(39.4)

In the liquid crystal composition of the present invention, the content of a compound represented by the formula (39.2) relative to the total mass of the liquid crystal composition of the present invention is preferably 2% by mass or more and 15% by mass or less, more preferably 3% by mass or more and 15% by mass or less, even more preferably 3% by mass or more and 10% by mass or less, still more preferably 4% by mass or more and 8% by mass or less, and particularly preferably 4% by mass or more and 7% by mass or less.

Within the particularly preferred range, the content may be 4 to 6% by mass, 4 to 5% by mass, 5 to 7% by mass, or 6 to 7% by mass.

A compound in which $m^{11}$ in the general formula (i) is 2 is preferably a compound represented by general formula (X-2-2) below.

[Chem. 16]

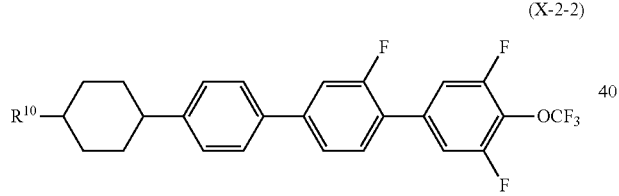

(X-2-2)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-2-2) are preferably used alone or in combination of two or more in view of solubility at a low temperature, transition temperature, electric reliability, birefringence, etc.

In view of solubility at a low temperature, transition temperature, electric reliability, etc., the content of a compound represented by the general formula (X-2-2) relative to the total mass of the liquid crystal composition of the present invention is preferably 3% by mass or more and 20% by mass or less, more preferably 6% by mass or more and 16% by mass or less, still more preferably 9% by mass or more and 12% by mass or less, and particularly preferably 9% by mass or more and 10% by mass or less.

Preferred examples of the compound represented by the general formula (X-2-2) include compounds represented by formula (40.1) to formula (40.4), and particularly a compound represented by formula (40.2) is preferably contained.

[Chem. 17]

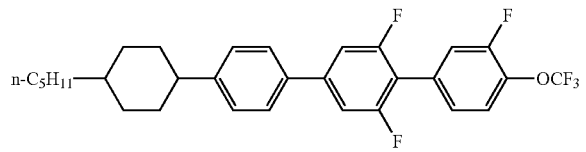

(40.1)

(40.2)

(40.3)

(40.4)

A compound in which $m^{11}$ in the general formula (i) is 1 is preferably a compound represented by general formula (XIV-2-2) below.

[Chem. 18]

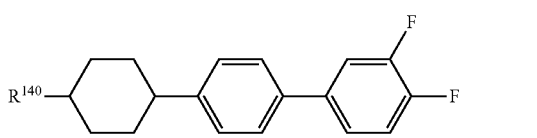

(XIV-2-2)

(In the formula, $R^{140}$ represents an alkyl group having 1 to 5 carbon atoms, an alkenyl group having 2 to 5 carbon atoms, or an alkoxy group having 1 to 4 carbon atoms.)

In view of solubility at a low temperature, transition temperature, electric reliability, etc., the content of a compound represented by the general formula (XIV-2-2) relative to the total mass of the liquid crystal composition of the present invention is preferably 1% by mass or more and 20% by mass or less, more preferably 1% by mass or more and 15% by mass or less, still more preferably 2% by mass or more and 10% by mass or less, and particularly preferably 3% by mass or more and 7% by mass or less.

Preferred examples of the compound represented by the general formula (XIV-2-2) include compounds represented by formula (54.1) to formula (54.4), and particularly a compound represented by formula (54.2) and/or formula (54.4) is preferably contained.

[Chem. 19]

(54.1)
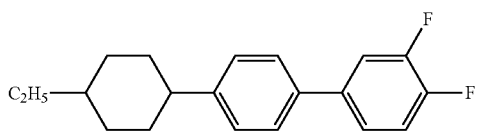

(54.2)
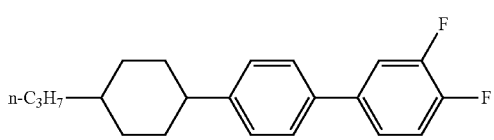

(54.3)
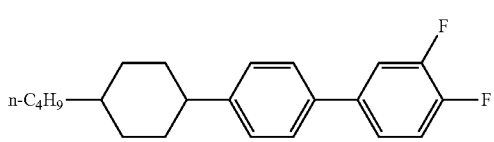

(54.4)
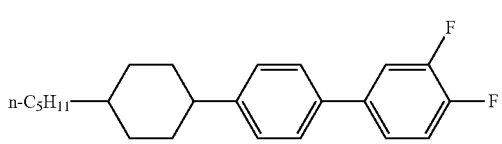

In the liquid crystal composition of the present invention, the content of a compound represented by the formula (54.2) relative to the total mass of the liquid crystal composition of the present invention is preferably 1% by mass or more and 35% by mass or less, more preferably 1% by mass or more and 25% by mass or less, even more preferably 1% by mass or more and 20% by mass or less, even more preferably 1% by mass or more and 15% by mass or less, still more preferably 1% by mass or more and 10% by mass or less, still more preferably 2% by mass or more and 8% by mass or less, and particularly preferably 3% by mass or more and 7% by mass or less.

Within the particularly preferred range, the content may be 3 to 5% by mass or 5 to 7% by mass.

When two compounds represented by the general formula (i) are used, a combination of compounds represented by the formula (37.2) and the formula (39.2) and a combination of compounds represented by the formula (38.2) and the formula (39.2) are preferred.

A compound in which $m^{11}$ in the general formula (i) is 1 is preferably a compound represented by general formula (XIV-2-3) below.

[Chem. 20]

(XIV-2-3)
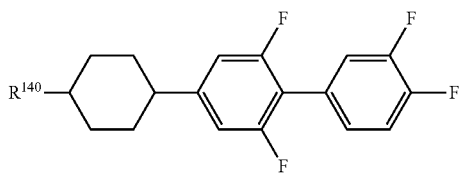

(In the formula, $R^{140}$ represents an alkyl group having 1 to 5 carbon atoms, an alkenyl group having 2 to 5 carbon atoms, or an alkoxy group having 1 to 4 carbon atoms.)

In view of solubility at a low temperature, transition temperature, electric reliability, etc., the content of a compound represented by the general formula (XIV-2-3) relative to the total mass of the liquid crystal composition of the present invention is preferably 5% by mass or more and 30% by mass or less, more preferably 9% by mass or more and 27% by mass or less, still more preferably 12% by mass or more and 24% by mass or less, and particularly preferably 12% by mass or more and 20% by mass or less.

Preferred examples of the compound represented by the general formula (XIV-2-3) include compounds represented by formula (55.1) to formula (55.4), and particularly a compound represented by formula (55.2) and/or formula (55.4) is preferably contained.

[Chem. 21]

(55.1)
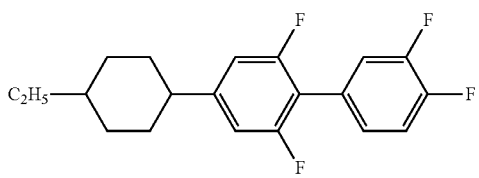

(55.2)
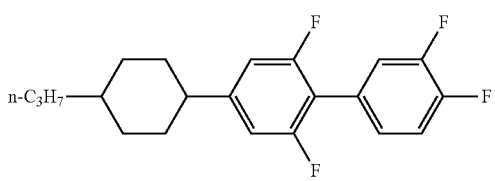

(55.3)
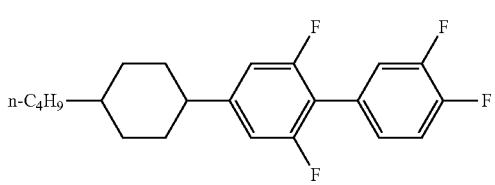

(55.4)
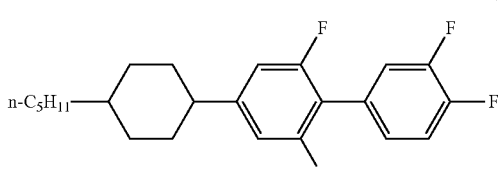

A compound in which $m^{11}$ in the general formula (i) is 1 is preferably a compound represented by general formula (XIV-2-4) below.

[Chem. 22]

(XIV-2-4)
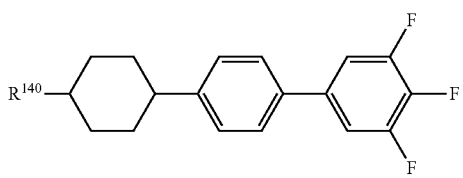

(In the formula, $R^{140}$ represents an alkyl group having 1 to 5 carbon atoms, an alkenyl group having 2 to 5 carbon atoms, or an alkoxy group having 1 to 4 carbon atoms.)

Compounds which can be combined are not limited, but a plurality of compounds represented by the general formula (XIV-2-4) can be properly combined according to each embodiment in view of solubility at a low temperature, transition temperature, electric reliability, birefringence, etc. For example, according to an embodiment of the present invention, the number of the compound used is 1. According to another embodiment of the present invention, the number of the compounds is 2. According to a further embodiment of the present invention, the number of the compounds is 3 or more.

The content of a compound represented by the general formula (XIV-2-4) has an upper limit value and a lower limit value according to each embodiment in view of solubility at a low temperature, transition temperature, electric reliability, birefringence, etc.

For example, according to an embodiment of the present invention, the content of the compound relative to the total mass of the liquid crystal composition of the present invention is 2% to 35% by mass; according to another embodiment, the content of the compound is 5% to 35% by mass; according to still another embodiment, the content of the compound is 8% to 35% by mass; according to a further embodiment, the content of the compound is 9% to 35% by mass; according to a further embodiment, the content of the compound is 10% to 35% by mass; according to a further embodiment, the content of the compound is 18% to 35% by mass; according to a further embodiment, the content of the compound is 21% to 35% by mass; according to a further embodiment, the content of the compound is 22% to 35% by mass; and according to a further embodiment, the content of the compound is 24% to 35% by mass.

Also, for example, according to an embodiment of the present invention, the content of the compound relative to the total mass is 2% to 35% by mass; according to another embodiment, the content of the compound is 2% to 30% by mass; according to still another embodiment, the content of the compound is 2% to 25% by mass; according to a further embodiment, the content of the compound is 2% to 20% by mass; according to a further embodiment, the content of the compound is 2% to 15% by mass; and according to a further embodiment, the content of the compound is 2% to 10% by mass.

When the liquid crystal composition of the present invention is used for a liquid crystal display device having a low drive voltage, it is desired to slightly increase the content of the compound represented by the general formula (XIV-2-4). When the liquid crystal composition is used for a liquid crystal display device having fast response, it is desired to slightly decrease the content of the compound represented by the general formula (XIV-2-4).

Further, preferred examples of the compound represented by the general formula (XIV-2-4) include compounds represented by formula (56.1) to formula (56.4), and particularly a compound represented by formula (56.1), formula (56.2), and/or formula (56.4) is preferably contained.

[Chem. 23]

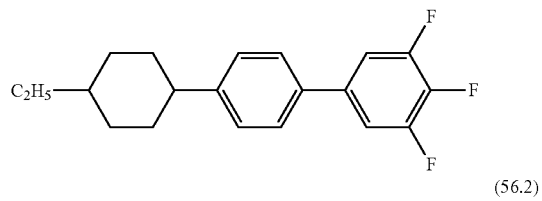

(56.1)

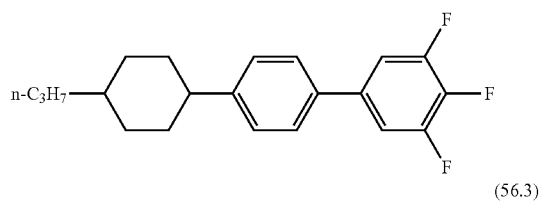

(56.2)

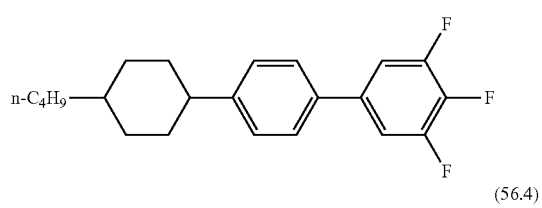

(56.3)

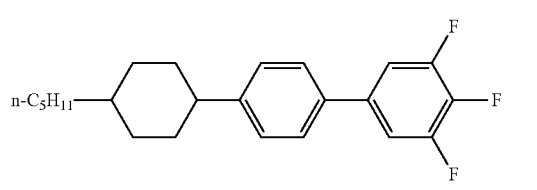

(56.4)

A compound in which $m^{11}$ in the general formula (i) is 1 is preferably a compound represented by general formula (XIV-2-5) below.

[Chem. 24]

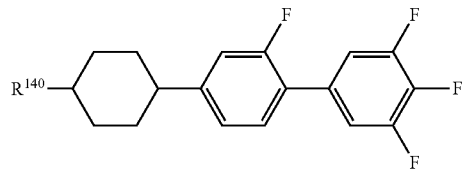

(XIV-2-5)

(In the formula, $R^{140}$ represents an alkyl group having 1 to 5 carbon atoms, an alkenyl group having 2 to 5 carbon atoms, or an alkoxy group having 1 to 4 carbon atoms.)

In view of solubility at a low temperature, transition temperature, electric reliability, etc., the content of a compound represented by the general formula (XIV-2-5) relative to the total mass of the liquid crystal composition of the present invention is preferably 5% by mass or more and 25% by mass or less, more preferably 10% by mass or more and 22% by mass or less, still more preferably 13% by mass or more and 18% by mass or less, and particularly preferably 13% by mass or more and 15% by mass or less.

Further, preferred examples of the compound represented by the general formula (XIV-2-5) include compounds represented by formula (57.1) to formula (57.4), and particularly a compound represented by formula (57.1) is preferably contained.

[Chem. 25]

(57.1)
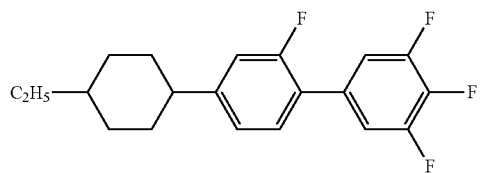

(57.2)
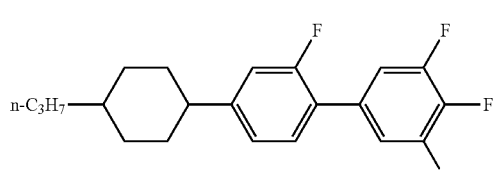

(57.3)
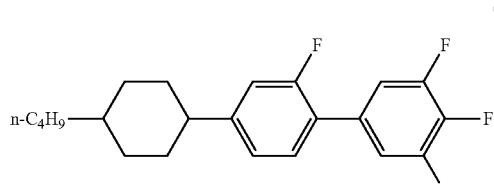

(57.4)
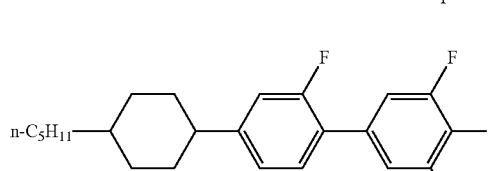

A compound in which $m^{11}$ in the general formula (i) is 1 is preferably a compound represented by general formula (XIV-2-6) below.

[Chem. 26]

(XIV-2-6)
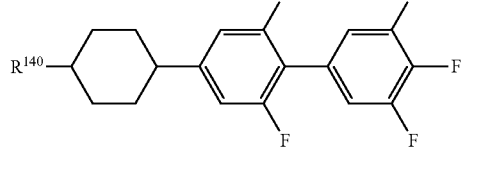

(In the formula, $R^{140}$ represents an alkyl group having 1 to 5 carbon atoms, an alkenyl group having 2 to 5 carbon atoms, or an alkoxy group having 1 to 4 carbon atoms.)

In view of solubility at a low temperature, transition temperature, electric reliability, etc., the content of a compound represented by the general formula (XIV-2-6) relative to the total mass of the liquid crystal composition of the present invention is preferably 5% by mass or more and 25% by mass or less, more preferably 10% by mass or more and 22% by mass or less, still more preferably 15% by mass or more and 20% by mass or less, and particularly preferably 15% by mass or more and 17% by mass or less.

Further, preferred examples of the compound represented by the general formula (XIV-2-6) include compounds represented by formula (58.1) to formula (58.4), and particularly a compound represented by formula (58.2) is preferably contained.

[Chem. 27]

(58.1)
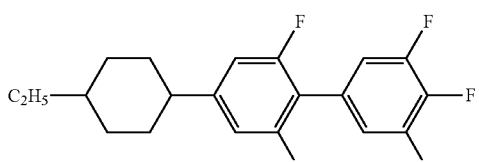

(58.2)
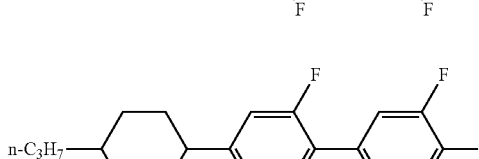

(58.3)
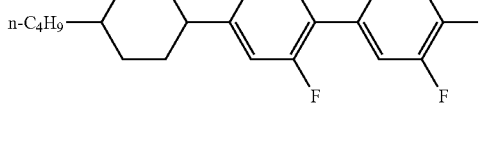

(58.4)
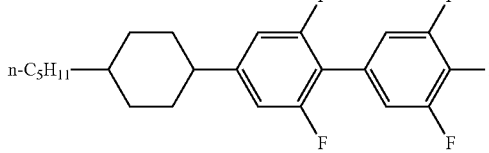

<Compound Represented by General Formula (ii)>

In the general formula (ii), $R^{21a}$ represents a linear alkyl group having 1 to 8 carbon atoms, and the number of carbon atoms is preferably 1 to 6, more preferably 2 to 5, and still more preferably 2 to 3.

In the general formula (ii), $m^{21}$ represents 0 or 1, and $X^{21}$, $X^{22}$, $X^{23}$, and $X^{24}$ each independently represent a hydrogen atom, a fluorine atom, or a chlorine atom, and $X^{25}$ represents a hydrogen atom, a fluorine atom, a chlorine atom, a cyano group, —$CF_3$, or —$OCF_3$.

In addition, $m^{21}$ is preferably 1.

When $m^{21}$ is 1, at least one of $X^{21}$ and $X^{22}$ is preferably a hydrogen atom, and both of $X^{21}$ and $X^{22}$ are more preferably hydrogen atoms.

$X^{23}$, $X^{24}$, and $X^{25}$ are preferably each independently a fluorine atom, at least two of $X^{23}$, $X^{24}$, and $X^{25}$ are more preferably fluorine atoms, and all of $X^{23}$, $X^{24}$, and $X^{25}$ are still more preferably fluorine atoms.

In addition, at least two of $X^{21}$ to $X^{24}$ are preferably fluorine atoms.

The compound represented by the general formula (ii) is preferably a compound represented by general formula (X-6) below.

[Chem. 28]

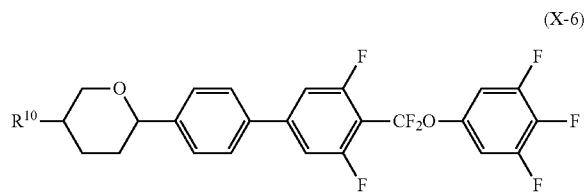
(X-6)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but compounds represented by the general formula (X-6) are preferably alone or in combination of two or more in view of solubility at a low temperature, transition temperature, electric reliability, birefringence, etc.

The content of a compound represented by the general formula (ii) has an upper limit value and lower limit value according to each embodiment in view of characteristics such as solubility at a low temperature, transition temperature, electric reliability, birefringence, etc.

When only one of the compounds is used, the lower limit value of the content of the compound relative to the total mass is preferably 1%, more preferably 2%, and still more preferably 3%, and the upper limit value of the content of the compound relative to the total mass is preferably 15%, more preferably 12%, still more preferably 10%, particularly preferably 8%, and most preferably 7%.

When two of the compounds are used, the lower limit value of the total content of the two compounds relative to the total mass is preferably 4%, more preferably 5%, and still more preferably 6%, and the upper limit value of the total content of the two compounds relative to the total mass is preferably 25%, more preferably 20%, even more preferably 18%, and still more preferably 16%.

When solubility of the liquid crystal composition is regarded as important, two compounds represented by the general formula (ii) are preferably used, and when the content of compounds represented by the general formula (ii) is desired to be increased, the two compounds are preferably used.

For example, according to an embodiment of the present invention, the content of the compound relative to the total mass of the liquid crystal composition of the present invention is 3% to 30% by mass; according to another embodiment, the content of the compound is 3% to 25% by mass; according to still another embodiment, the content of the compound is 3% to 10% by mass; according to a further embodiment, the content of the compound is 3% to 7% by mass; according to a further embodiment, the content of the compound is 5% to 10% by mass; according to a further embodiment, the content of the compound is 6% to 16% by mass; and according to a further embodiment, the content of the compound is 14% to 20% by mass.

Also, for example, according to an embodiment of the present invention, the content of the compound relative to the total mass of the liquid crystal composition of the present invention is 1% to 30% by mass; according to another embodiment, the content of the compound is 1% to 20% by mass; according to still another embodiment, the content of the compound is 1% to 13% by mass; according to a further embodiment, the content of the compound is 1% to 10% by mass; according to a further embodiment, the content of the compound is 1% to 7% by mass; and according to a further embodiment, the content of the compound is 1% to 3% by mass.

Further, preferred examples of the compound represented by the general formula (X-6) include compounds represented by formula (44.1) to formula (44.4), and particularly a compound represented by formula (44.1) and/or formula (44.2) is preferably contained.

[Chem. 29]

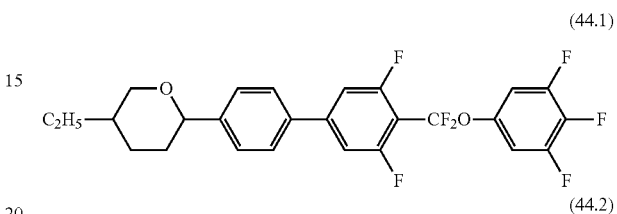
(44.1)

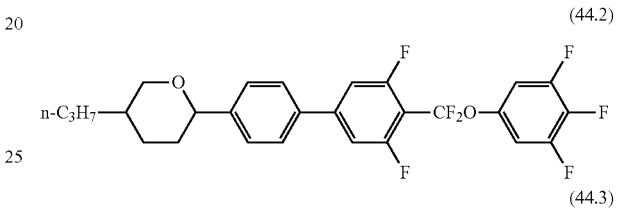
(44.2)

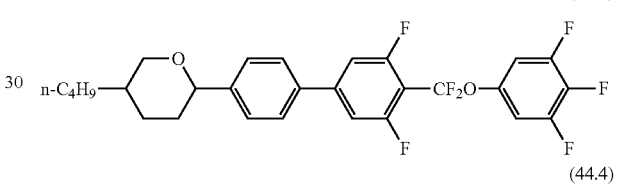
(44.3)

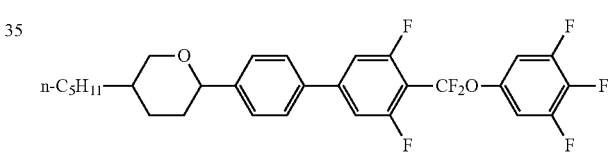
(44.4)

In the liquid crystal composition of the present invention, in view of solubility at a low temperature, transition temperature, electric reliability, etc., the content of a compound represented by the formula (44.1) relative to the total mass of the liquid crystal composition of the present invention is preferably 1% by mass or more and 25% by mass or less, more preferably 3% by mass or more and 20% by mass or less, still more preferably 3% by mass or more and 15% by mass or less, particularly more preferably 3% by mass or more and 10% by mass or less, and most preferably 3% by mass or more and 8% by mass or less.

Within the most preferred range, the content may be, for example, 3% by mass or more and 6% by mass or less, 3% by mass or more and 4% by mass or less, 4% by mass or more and 8% by mass or less, 6% by mass or more and 8% by mass or less, or 7% by mass or more and 8% by mass or less.

In the liquid crystal composition of the present invention, in view of solubility at a low temperature, transition temperature, electric reliability, etc., the content of a compound represented by the formula (44.2) relative to the total mass of the liquid crystal composition of the present invention is preferably 1% by mass or more and 25% by mass or less, more preferably 3% by mass or more and 20% by mass or less, still more preferably 3% by mass or more and 15% by mass or less, particularly more preferably 3% by mass or more and 10% by mass or less, and most preferably 3% by mass or more and 8% by mass or less.

Within the most preferred range, the content may be, for example, 3% by mass or more and 6% by mass or less, 3% by mass or more and 4% by mass or less, 4% by mass or more and 8% by mass or less, 6% by mass or more and 8% by mass or less, or 7% by mass or more and 8% by mass or less.

In the liquid crystal composition of the present invention, in view of solubility at a low temperature, transition temperature, electric reliability, etc., the total content of the compound represented by the formula (44.1) and a compound represented by the formula (44.2) relative to the total mass of the liquid crystal composition of the present invention is preferably 5% by mass or more and 45% by mass or less, more preferably 5% by mass or more and 25% by mass or less, still more preferably 6% by mass or more and 20% by mass or less, and particularly preferably 6% by mass or more and 16% by mass or less.

Within the particularly preferred range, the content may be, for example, 6% by mass or more and 15% by mass or less, 6% by mass or more and 12% by mass or less, 6% by mass or more and 10% by mass or less, 6% by mass or more and 8% by mass or less, 8% by mass or more and 16% by mass or less, 10% by mass or more and 16% by mass or less, 12% by mass or more and 16% by mass or less, or 15% by mass or more and 16% by mass or less.

Compounds represented by the general formula (i) and compounds represented by the general formula (ii) are preferably used in combination of two to four and more preferably used in combination of three or four in total.

The lower limit value of the total content of compounds represented by the general formula (i) and compounds represented by the general formula (ii) relative to the total mass of the liquid crystal composition of the present invention is preferably 4%, more preferably 6%, still more preferably 8%, and particularly preferably 10%. The upper limit value of the total content relative to the total mass is preferably 40%, more preferably 35%, still more preferably 30%, particularly preferably 27%, and most preferably 20%.

When one compound represented by the general formula (i) and one compound represented by the general formula (ii), i.e., two compounds in total, are used, the lower limit value of the total content of two compounds relative to the total mass is preferably 6%, more preferably 8%, even more preferably 10%, and still more preferably 12%. The upper limit value of the total content of two compounds relative to the total mass is preferably 20%, more preferably 18%, still more preferably 16%, and particularly preferably 14%.

When one or two compounds represented by the general formula (i) and two or one compound represented by the general formula (ii), i.e., three compounds in total, are used, the lower limit value of the total content of three compounds relative to the total mass is preferably 5%, more preferably 8%, and still more preferably 10%. The upper limit value of the total content of three compounds relative to the total mass is preferably 30%, more preferably 24%, still more preferably 21%, and particularly preferably 18%.

When one to three compounds represented by the general formula (i) and one to three compounds represented by the general formula (ii), i.e., four compounds in total, are used, the lower limit value of the total content of four compounds relative to the total mass is preferably 15%, more preferably 17%, still more preferably 19%, particularly preferably 20%, and most preferably 24%. The upper limit value of the total content of four compounds relative to the total mass is preferably 40%, more preferably 35%, still more preferably 30%, and particularly preferably 27%.

When solubility of the liquid crystal composition is regarded as important, the above-described compounds are preferably used in combination of two to four in total.

Preferred combinations include a combination of compounds represented by the formula (37.2) and the formula (44.2), a combination of compounds represented by the formula (37.2), the formula (44.1), and the formula (44.2), a combination of compounds represented by the formula (37.2), the formula (39.2), the formula (44.1), and the formula (44.2), and a combination of compounds represented by the formula (38.2), the formula (39.2), the formula (44.1), and the formula (44.2).

The liquid crystal composition according to the first embodiment of the present invention can also contain any one or two or more of compounds represented by general formula (L) below.

[Chem. 30]

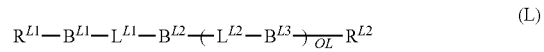

(L)

(In the formula, $R^{L1}$ and $R^{L2}$ each independently represent an alkyl group having 1 to 8 carbon atoms; one or nonadjacent two or more —$CH_2$— in the alkyl group may be each independently substituted by —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of:

(a) a 1,4-cyclohexylene group (one —$CH_2$— or nonadjacent two or more —$CH_2$— in the group may be substituted by —O—); and (b) a 1,4-phenylene group (one —CH= or nonadjacent two or more —CH= in the group may be substituted by —N=), and one and/or two or more hydrogen atoms in the group (a) and the group (b) may be each independently substituted by a cyano group, a fluorine atom, or a chlorine atom;

$L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N— N=CH—, —CH=CH—, —CF=CF—, or —C≡C—; and when OL is 2 or 3, and a plurality of $L^{L2}$ are present, $L^{L2}$ may be the same or different, and when OL is 2 or 3, and a plurality of $B^{L3}$ are present, $B^{L3}$ may be the same or different.)

The types of compounds which can be combined are not particularly limited, but a plurality of compounds represented by the general formula (L) can be properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6. According to a further embodiment of the present invention, the number of the types is 7. According to a further embodiment of the present invention, the number of the types is 8. According to a further embodiment of the present invention, the number of the types is 9. According to a further embodiment of the present invention, the number of the types is 10 or more.

In the liquid crystal composition of the present invention, it is necessary to properly adjust the content of the compound represented by the general formula (L) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 1% to 95% by mass. According to another embodiment of the present invention, the content is 10% to 95% by mass. According to still another embodiment of the present invention, the content is 20% to 95% by mass. According to a further embodiment of the present invention, the content is 30% to 95% by mass. According to a further embodiment of the present invention, the content is 40% to 95% by mass. According to a further embodiment of the present invention, the content is 50% to 95% by mass. According to a further embodiment of the present invention, the content is 55% to 95% by mass. According to a further embodiment of the present invention, the content is 60% to 95% by mass. According to a further embodiment of the present invention, the content is 65% to 95% by mass. According to a further embodiment of the present invention, the content is 70% to 95% by mass. According to a further embodiment of the present invention, the content is 75% to 95% by mass. According to a further embodiment of the present invention, the content is 80% to 95% by mass.

Further, for example, according to an embodiment of the present invention, the content of the compound relative to the total mass of the liquid crystal composition of the present invention is 1% to 95% by mass. According to another embodiment of the present invention, the content is 1% to 85% by mass. According to still another embodiment of the present invention, the content is 1% to 75% by mass. According to a further embodiment of the present invention, the content is 1% to 65% by mass. According to a further embodiment of the present invention, the content is 1% to 55% by mass. According to a further embodiment of the present invention, the content is 1% to 45% by mass. According to a further embodiment of the present invention, the content is 1% to 35% by mass. According to a further embodiment of the present invention, the content is 1% to 25% by mass.

When the viscosity of the liquid crystal composition of the present invention is kept low, and the liquid crystal composition having fast response is required, both the lower limit value and the upper limit value are preferably high. Further, when Tni of the liquid crystal composition of the present invention is kept high, and the liquid crystal composition having good temperature stability is required, both the lower limit value and the upper limit value are preferably high. In addition, when it is desired to increase dielectric anisotropy for keeping the drive voltage low, both the lower limit value and the upper limit value are preferably low.

When a ring structure to which each of $R^{L1}$ and $R^{L2}$ is bonded is a phenyl group (aromatic), $R^{L1}$ and $R^{L2}$ are each preferably a linear alkyl group having 1 to 5 carbon atoms, a linear alkoxy group having 1 to 4 (or more) carbon atoms, or an alkenyl group having 4 to 5 carbon atoms, while when a ring structure to which each of $R^{L1}$ and $R^{L2}$ is bonded is a saturated ring structure, such as cyclohexane, pyran, or dioxane, $R^{L1}$ and $R^{L2}$ are each preferably a linear alkyl group having 1 to 5 carbon atoms, a linear alkoxy group having 1 to 4 (or more) carbon atoms, or a linear alkenyl group having 2 to 5 carbon atoms.

When the liquid crystal composition is required to have chemical stability, a compound represented by the general formula (L) preferably does not contain a chlorine atom in its molecule.

The compound represented by the general formula (L) is preferably, for example, a compound selected from a compound group represented by general formula (I).

[Chem. 31]

$$R^{11}\text{-}A^{11}\text{-}A^{12}\text{-}R^{12} \qquad (I)$$

(In the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms, and $A^{11}$ and $A^{12}$ each independently represent a 1,4-cyclohexylene group, a 1,4-phenylene group, a 2-fluoro-1,4-phenylene group, or a 3-fluoro-1,4-phenylene group.)

The types of compounds which can be combined are not particularly limited, but a plurality of compounds represented by the general formula (I) can be properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6 or more.

In the liquid crystal composition of the present invention, it is necessary to properly adjust the content of a compound represented by the general formula (I) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 3% to 75% by mass. According to another embodiment of the present invention, the content is 15% to 75% by mass. According to still another embodiment of the present invention, the content is 18% to 75% by mass. According to a further embodiment of the present invention, the content is 20% to 75% by mass. According to a further embodiment of the present invention, the content is 29% to 75% by mass. According to a further embodiment of the present invention, the content is 35% to 75% by mass. According to a further embodiment of the present invention, the content is 42% to 75% by mass. According to a further embodiment of the present invention, the content is 47% to 75% by mass. According to a further embodiment of the present invention, the content is 53% to 75% by mass. According to a further embodiment of the present invention, the content is 56% to 75% by mass. According to a further embodiment of the present invention, the content is 60% to 75% by mass.

According to a further embodiment of the present invention, the content is 65% to 75% by mass.

Further, for example, according to an embodiment of the present invention, the content relative to the total mass of the liquid crystal composition of the present invention is 3% to 75% by mass. According to another embodiment of the present invention, the content is 3% to 65% by mass. According to still another embodiment of the present invention, the content is 3% to 55% by mass. According to a further embodiment of the present invention, the content is 3% to 50% by mass. According to a further embodiment of the present invention, the content is 3% to 45% by mass. According to a further embodiment of the present invention, the content is 3% to 40% by mass. According to a further embodiment of the present invention, the content is 3% to 35% by mass. According to a further embodiment of the present invention, the content is 3% to 30% by mass.

When the viscosity of the liquid crystal composition of the present invention is kept low, and the liquid crystal composition having fast response is required, both the lower limit value and the upper limit value are preferably high. Further, when Tni of the liquid crystal composition of the present invention is kept high, and the liquid crystal composition having good temperature stability is required, both the lower limit value and the upper limit value are preferably medium. In addition, when it is desired to increase dielectric anisotropy for keeping the drive voltage low, both the lower limit value and the upper limit value are preferably low.

When a ring structure to which $R^{11}$ and $R^{12}$ is bonded is a phenyl group (aromatic), $R^{M1}$ is preferably a linear alkyl group having 1 to 5 carbon atoms, a linear alkoxy group having 1 to 4 carbon atoms, or an alkenyl group having 4 to 5 carbon atoms, while when a ring structure to which $R^{M1}$ is bonded is a saturated ring structure, such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

Further the compound represented by the general formula (I) is preferably a compound selected from a compound group represented by general formula (I-1).

[Chem. 32]

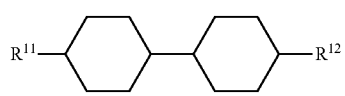

(I-1)

(In the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms.)

The types of compounds which can be combined are not particularly limited, but a plurality of compounds represented by the general formula (I-1) can be properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5 or more.

In the liquid crystal composition of the present invention, it is necessary to properly adjust the content of a compound represented by the general formula (I-1) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 3% to 70% by mass. According to another embodiment of the present invention, the content is 15% to 70% by mass. According to still another embodiment of the present invention, the content is 18% to 70% by mass. According to a further embodiment of the present invention, the content is 25% to 70% by mass. According to a further embodiment of the present invention, the content is 29% to 70% by mass. According to a further embodiment of the present invention, the content is 31% to 70% by mass. According to a further embodiment of the present invention, the content is 35% to 70% by mass. According to a further embodiment of the present invention, the content is 43% to 70% by mass. According to a further embodiment of the present invention, the content is 47% to 70% by mass. According to a further embodiment of the present invention, the content is 50% to 70% by mass. According to a further embodiment of the present invention, the content is 53% to 70% by mass. According to a further embodiment of the present invention, the content is 56% to 70% by mass.

Further, for example, according to an embodiment of the present invention, the content of the compound relative to the total mass of the liquid crystal composition of the present invention is 3% to 70% by mass. According to another embodiment of the present invention, the content is 3% to 60% by mass. According to still another embodiment of the present invention, the content is 3% to 50% by mass. According to a further embodiment of the present invention, the content is 3% to 45% by mass. According to a further embodiment of the present invention, the content is 3% to 40% by mass. According to a further embodiment of the present invention, the content is 3% to 35% by mass. According to a further embodiment of the present invention, the content is 3% to 30% by mass. According to a further embodiment of the present invention, the content is 3% to 26% by mass.

When the viscosity of the liquid crystal composition of the present invention is kept low, and the liquid crystal composition having fast response is required, both the lower limit value and the upper limit value are preferably high. Further, when Tni of the liquid crystal composition of the present invention is kept high, and the liquid crystal composition having good temperature stability is required, both the lower limit value and the upper limit value are preferably medium. In addition, when it is desired to increase dielectric anisotropy for keeping the drive voltage low, both the lower limit value and the upper limit value are preferably low.

The compound represented by the general formula (I-1) is preferably a compound selected from a compound group represented by general formula (I-1-1).

[Chem. 33]

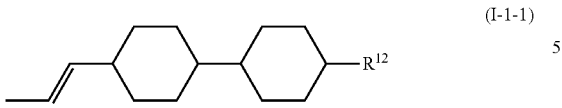

(I-1-1)

(In the formula, $R^{12}$ represents an alkyl group having 1 to 5 carbon atoms, an alkenyl group having 2 to 5 carbon atoms, or an alkoxy group having 1 to 5 carbon atoms.)

In the liquid crystal composition of the present invention, it is necessary to properly adjust the content of the compound represented by the general formula (I-1-1) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 2% to 60% by mass. According to another embodiment of the present invention, the content is 4% to 60% by mass. According to still another embodiment of the present invention, the content is 7% to 60% by mass. According to a further embodiment of the present invention, the content is 11% to 60% by mass. According to a further embodiment of the present invention, the content is 13% to 60% by mass. According to a further embodiment of the present invention, the content is 15% to 60% by mass. According to a further embodiment of the present invention, the content is 17% to 60% by mass. According to a further embodiment of the present invention, the content is 20% to 60% by mass. According to a further embodiment of the present invention, the content is 25% to 60% by mass. According to a further embodiment of the present invention, the content is 30% to 60% by mass. According to a further embodiment of the present invention, the content is 32% to 60% by mass. According to a further embodiment of the present invention, the content is 35% to 60% by mass.

For example, according to an embodiment of the present invention, the content of the compound relative to the total mass of the liquid crystal composition of the present invention is 2% to 60% by mass. According to another embodiment of the present invention, the content is 2% to 50% by mass. According to still another embodiment of the present invention, the content of is 2% to 40% by mass. According to a further embodiment of the present invention, the content is 2% to 35% by mass. According to a further embodiment of the present invention, the content is 2% to 30% by mass. According to a further embodiment of the present invention, the content is 2% to 25% by mass. According to a further embodiment of the present invention, the content is 2% to 20% by mass. According to a further embodiment of the present invention, the content is 2% to 15% by mass.

Further, the compound represented by the general formula (I-1-1) is preferably a compound selected from a compound group represented by formula (1.1) to formula (1.3), a compound represented by the formula (1.2) or the formula (1.3) is preferred, and a compound represented by the formula (1.3) is particularly preferred.

[Chem. 34]

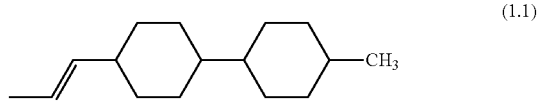

(1.1)

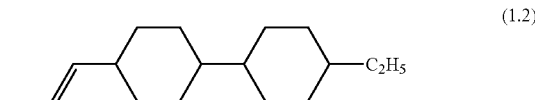

(1.2)

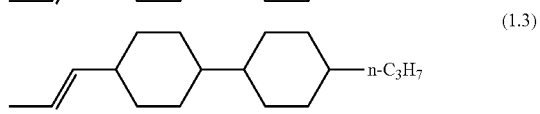

(1.3)

When the compound represented by the formula (1.2) or the formula (1.3) is used singly, the compound represented by the formula (1.2) at a slightly high content is preferred because it has the effect of improving the response speed, and the compound represented by the formula (1.3) at a content within a range described below is preferred because a liquid crystal composition having fast response and high electric and optical reliability can be produced.

The content of the compound represented by the formula (1.3) relative to the total mass of the liquid crystal composition of the present invention is preferably 5% by mass or more and 35% by mass or less, more preferably 5% by mass or more and 30% by mass or less, still more preferably 5% by mass or more and 25% by mass or less, particularly preferably 5% by mass or more and 20% by mass or less, and most preferably 5% by mass or more and 17% by mass or less.

Examples of the content within the most preferred range include 5% by mass or more and 15% by mass or less, 5% by mass or more and 12% by mass or less, 5% by mass or more and 10% by mass or less, 5% by mass or more and 8% by mass or less, 5% by mass or more and 7% by mass or less, 7% by mass or more and 17% by mass or less, 8% by mass or more and 17% by mass or less, 10% by mass or more and 17% by mass or less, 12% by mass or more and 17% by mass or less, 14% by mass or more and 17% by mass or less, and 15% by mass or more and 17% by mass or less.

Further, the compound represented by the general formula (I-1) is preferably a compound selected from a compound group represented by general formula (I-1-2).

[Chem. 35]

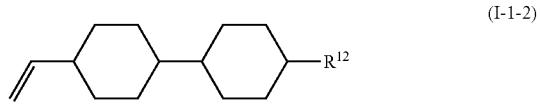

(I-1-2)

(In the formula, $R^{12}$ represents an alkyl group having 1 to 5 carbon atoms, an alkoxy group having 1 to 5 carbon atoms, or an alkenyl group having 2 to 5 carbon atoms.)

The types of compounds which can be combined are not particularly limited, but a plurality of compounds represented by the general formula (I-1-2) can be properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2.

According to still another embodiment of the present invention, the number of the types is 3.

In the liquid crystal composition of the present invention, it is necessary to properly adjust the content of the compound represented by the general formula (I-1-2) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 7% to 60% by mass. According to another embodiment of the present invention, the content is 15% to 60% by mass. According to still another embodiment of the present invention, the content is 18% to 60% by mass. According to a further embodiment of the present invention, the content is 21% to 60% by mass. According to a further embodiment of the present invention, the content is 24% to 60% by mass. According to a further embodiment of the present invention, the content is 27% to 60% by mass. According to a further embodiment of the present invention, the content is 30% to 60% by mass. According to a further embodiment of the present invention, the content is 34% to 60% by mass. According to a further embodiment of the present invention, the content is 37% to 60% by mass. According to a further embodiment of the present invention, the content is 41% to 60% by mass. According to a further embodiment of the present invention, the content is 47% to 60% by mass. According to a further embodiment of the present invention, the content is 50% to 60% by mass.

Further, for example, according to an embodiment of the present invention, the content of the compound relative to the total mass of the liquid crystal composition of the present invention is 7% to 60% by mass. According to another embodiment of the present invention, the content is 7% to 55% by mass. According to still another embodiment of the present invention, the content is 7% to 45% by mass. According to a further embodiment of the present invention, the content is 7% to 40% by mass. According to a further embodiment of the present invention, the content is 7% to 35% by mass. According to a further embodiment of the present invention, the content is 7% to 30% by mass. According to a further embodiment of the present invention, the content is 7% to 25% by mass. According to a further embodiment of the present invention, the content is 7% to 20% by mass.

Further, the compound represented by the general formula (I-1-2) is preferably a compound selected from a compound group represented by formula (2.1) to formula (2.4), and compounds represented by the formula (2.2) to the formula (2.4) are preferred. In particular, a compound represented by the formula (2.2) is particularly preferred for improving the response speed of the liquid crystal composition of the present invention. In addition, when high Tni rather than the response speed is required, a compound represented by the formula (2.3) or the formula (2.4) is preferably used. Each of the compounds represented by the formula (2.3) and the formula (2.4) at a content of 30% or more is undesired for improving solubility at a low temperature.

[Chem. 36]

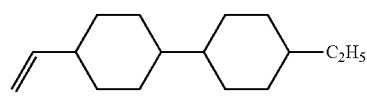
(2.1)

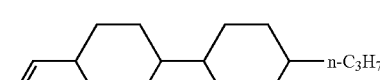
(2.2)

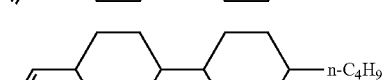
(2.3)

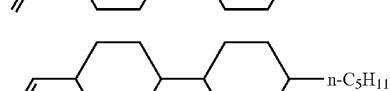
(2.4)

In the liquid crystal composition of the present invention, the content of the compound represented by the formula (2.2) relative to the total mass of the liquid crystal composition of the present invention is preferably 5% by mass or more and 55% by mass or less. More preferred examples of the content include 10% by mass or more and 40% by mass or less, 14% by mass or more and 40% by mass or less, 17% by mass or more and 40% by mass or less, 19% by mass or more and 40% by mass or less, 22% by mass or more and 40% by mass or less, 25% by mass or more and 40% by mass or less, 27% by mass or more and 40% by mass or less, 30% by mass or more and 40% by mass or less, 33% by mass or more and 40% by mass or less, and 36% by mass or more and 40% by mass or less.

Among these ranges, 25% by mass or more and 40% by mass or less is particularly preferred. Examples of the content within the particularly preferred range include 25% by mass or more and 35% by mass or less, 25% by mass or more and 30% by mass or less, 30% by mass or more and 40% by mass or less, and 35% by mass or more and 40% by mass or less.

In the liquid crystal composition of the present invention, the content of the compound represented by the formula (2.3) relative to the total mass of the liquid crystal composition of the present invention is preferably 5% by mass or more and 55% by mass or less, more preferably 5% by mass or more and 45% by mass or less, even more preferably 5% by mass or more and 35% by mass or less, even more preferably 5% by mass or more and 25% by mass or less, still more preferably 5% by mass or more and 20% by mass or less, particularly preferably 8% by mass or more and 18% by mass or less, and most preferably 11% by mass or more and 15% by mass or less. Examples of the content within the most preferred range include 11% by mass or more and 13% by mass or less and 14% by mass or more and 15% by mass or less.

In the liquid crystal composition of the present invention, the content of the compound represented by the formula (2.4) relative to the total mass of the liquid crystal composition of the present invention is preferably 1% by mass or more and 55% by mass or less, more preferably 3% by mass or more and 45% by mass or less, even more preferably 3% by mass or more and 35% by mass or less, still more preferably 3% by mass or more and 25% by mass or less, particularly preferably 5% by mass or more and 15% by mass or less, and most preferably 8% by mass or more and 12% by mass or less.

The liquid crystal composition of the present invention can further contain a compound represented by formula (2.5) having a structure similar to the compound represented by the general formula (I-1-2).

[Chem. 37]

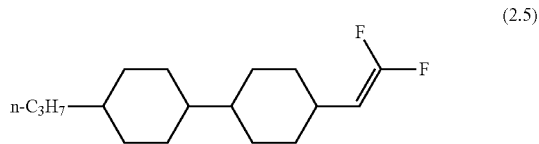

(2.5)

The content of the compound represented by the formula (2.5) is preferably adjusted according to the desired performance such as solubility at a low temperature, transition temperature, electric reliability, birefringence, etc. The content of the compound relative to the total mass of the liquid crystal composition of the present invention is preferably 11% by mass or more, more preferably 15% by mass or more, even more preferably 23% by mass or more, still more preferably 26% by mass or more, and particularly preferably 28% by mass or more.

Further, the compound represented by the general formula (I) is preferably a compound selected from a compound group represented by general formula (I-2).

[Chem. 38]

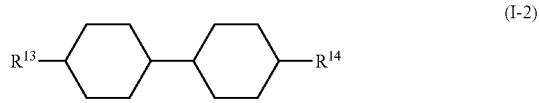

(I-2)

(In the formula, $R^{13}$ and $R^{14}$ each independently represent an alkyl group having 1 to 5 carbon atoms.)

The types of compounds which can be combined are not particularly limited, but a plurality of compounds represented by the general formula (I-2) can be properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3.

In the liquid crystal composition of the present invention, it is necessary to properly adjust the content of the compound represented by the general formula (I-2) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 3% to 60% by mass. According to another embodiment of the present invention, the content is 4% to 60% by mass. According to still another embodiment of the present invention, the content is 15% to 60% by mass. According to a further embodiment of the present invention, the content is 25% to 60% by mass. According to a further embodiment of the present invention, the content is 30% to 60% by mass. According to a further embodiment of the present invention, the content is 35% to 60% by mass. According to a further embodiment of the present invention, the content is 38% to 60% by mass. According to a further embodiment of the present invention, the content is 40% to 60% by mass. According to a further embodiment of the present invention, the content is 42% to 60% by mass. According to a further embodiment of the present invention, the content is 45% to 60% by mass. According to a further embodiment of the present invention, the content is 47% to 60% by mass. According to a further embodiment of the present invention, the content is 50% to 60% by mass.

Further, for example, according to an embodiment of the present invention, the content of the compound relative to the total mass of the liquid crystal composition of the present invention is 3% to 60% by mass. According to another embodiment of the present invention, the content is 3% to 55% by mass. According to still another embodiment of the present invention, the content is 3% to 45% by mass. According to a further embodiment of the present invention, the content is 3% to 40% by mass. According to a further embodiment of the present invention, the content is 3% to 30% by mass. According to a further embodiment of the present invention, the content is 3% to 20% by mass. According to a further embodiment of the present invention, the content is 3% to 15% by mass. According to a further embodiment of the present invention, the content is 3% to 5% by mass.

The compound represented by the general formula (I-2) is preferably a compound selected from a compound group represented by formula (3.1) to formula (3.4), and a compound represented by the formula (3.1), the formula (3.3), or the formula (3.4) is preferred. In particular, a compound represented by the formula (3.2) is particularly preferred for improving the response speed of the liquid crystal composition of the present invention. In addition, when high Tni rather than the response speed is required, a compound represented by the formula (3.3) or the formula (3.4) is preferably used. It is undesired for improving solubility at a low temperature that the content of each of the compounds represented by the formula (3.3) and the formula (3.4) is 20% or more.

The compound represented by the general formula (I-2) is preferably a compound selected from a compound group represented by formula (3.1) to formula (3.4), and a compound represented by the formula (3.1), the formula (3.3) and/or the formula (3.4) is preferred.

[Chem. 39]

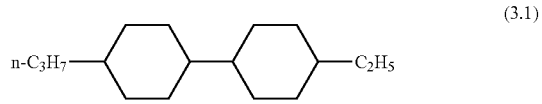

(3.1)

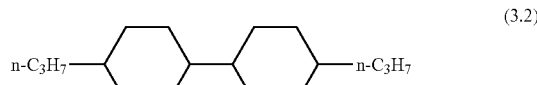

(3.2)

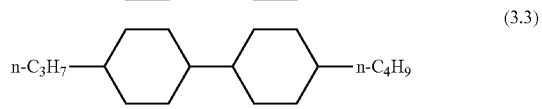

(3.3)

(3.4)

In the liquid crystal composition of the present invention, the content of the compound represented by the formula (3.3) relative to the total mass of the liquid crystal composition of the present invention is preferably 2% by mass or more and 40% by mass or less. Examples of a more preferred content include 3% by mass or more and 40% by mass or less, 4% by mass or more and 40% by mass or less, 10% by mass or more and 40% by mass or less, 12% by mass or more and 40% by mass or less, 14% by mass or more and 40% by mass or less, 16% by mass or more and 40% by mass or less, 20% by mass or more and 40% by mass or less, 23% by mass or more and 40% by mass or less, 26% by mass or more and 40% by mass or less, 30% by mass or more and 40% by mass or less, 34% by mass or more and 40% by mass or less, 37% by mass or more and 40% by mass or less, 3% by mass or more and 4% by mass or less, 3% by mass or more and 10% by mass or less, 3% by mass or more and 12% by mass or less, 3% by mass or more and 14% by mass or less, 3% by mass or more and 16% by mass or less, 3% by mass or more and 20% by mass or less, 3% by mass or more and 23% by mass or less, 3% by mass or more and 26% by mass or less, 3% by mass or more and 30% by mass or less, 3% by mass or more and 34% by mass or less, 3% by mass or more and 37% by mass or less, and 2% by mass or more and 6% by mass or less.

Among these contents, 2% by mass or more and 6% by mass or less is particularly preferred.

Further, the compound represented by the general formula (I) is preferably a compound selected from a compound group represented by general formula (I-3).

[Chem. 40]

(I-3)

(In the formula, $R^{13}$ represents an alkyl group having 1 to 5 carbon atoms, and $R^{15}$ represents an alkoxy group having 1 to 4 carbon atoms.)

The types of compounds which can be combined are not particularly limited, but a plurality of compounds represented by the general formula (I-3) can be properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3.

In the liquid crystal composition of the present invention, it is necessary to properly adjust the content of the compound represented by the general formula (1-3) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 3% by mass. According to another embodiment of the present invention, the content is 4% to 60% by mass. According to still another embodiment of the present invention, the content is 15% to 60% by mass. According to a further embodiment of the present invention, the content is 25% to 60% by mass. According to a further embodiment of the present invention, the content is 30% to 60% by mass. According to a further embodiment of the present invention, the content is 35% to 60% by mass. According to a further embodiment of the present invention, the content is 38% to 60% by mass. According to a further embodiment of the present invention, the content is 40% to 60% by mass. According to a further embodiment of the present invention, the content is 42% to 60% by mass. According to a further embodiment of the present invention, the content is 45% to 60% by mass. According to a further embodiment of the present invention, the content is 47% to 60% by mass. According to a further embodiment of the present invention, the content is 50% to 60% by mass.

Further, for example, according to an embodiment of the present invention, the content of the compound relative to the total mass of the liquid crystal composition of the present invention is 3% to 60% by mass. According to another embodiment of the present invention, the content is 3% to 55% by mass. According to still another embodiment of the present invention, the content is 3% to 45% by mass. According to a further embodiment of the present invention, the content is 3% to 40% by mass. According to a further embodiment of the present invention, the content is 3% to 30% by mass. According to a further embodiment of the present invention, the content is 3% to 20% by mass. According to a further embodiment of the present invention, the content is 3% to 15% by mass. According to a further embodiment of the present invention, the content is 3% to 5% by mass.

When solubility at a low temperature is regarded as important, a slightly high content has a high effect, while when the response speed is regarded as important, a slightly low content has a high effect. When dropping marks and image sticking are improved, the content range is preferably determined to a medium range.

The compound represented by the general formula (I-3) is preferably a compound selected from a compound group represented by formula (4.1) to formula (4.3), and a compound represented by the formula (4.3) is preferred.

[Chem. 41]

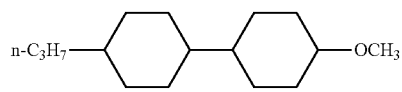

(4.1)

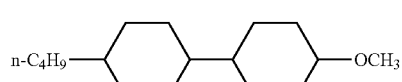

(4.2)

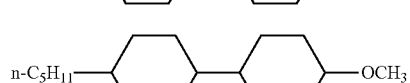

(4.3)

The content of the compound represented by the formula (4.3) relative to the total mass of the liquid crystal composition of the present invention is preferably 2% by mass or more and 30% by mass or less, more preferably 4% by mass or more and 30% by mass or less, more preferably 6% by mass or more and 30% by mass or less, more preferably 8% by mass or more and 30% by mass or less, more preferably 10% by mass or more and 30% by mass or less, more preferably 12% by mass or more and 30% by mass or less, more preferably 14% by mass or more and 30% by mass or less, more preferably 16% by mass or more and 30% by mass or less, more preferably 18% by mass or more and 25% by mass or less, more preferably 20% by mass or more and 24% by mass or less, and particularly preferably 22% by mass or more and 23% by mass or less.

Further, the compound represented by the general formula (I) is preferably a compound selected from a compound group represented by general formula (I-4).

[Chem. 42]

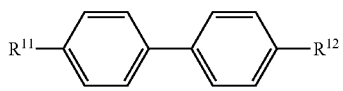

(I-4)

(In the formula, $R^{11}$ and $R^{12}$ each independently represent an alkyl group having 1 to 5 carbon atoms, an alkenyl group having 4 to 5 carbon atoms, or an alkoxy group having 1 to 4 carbon atoms.)

The types of compounds which can be combined are not particularly limited, but a plurality of compounds represented by the general formula (I-4) can be used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2.

In the liquid crystal composition of the present invention, it is necessary to properly adjust the content of the compound represented by the general formula (I-4) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 3% to 50% by mass. According to another embodiment of the present invention, the content is 5% to 50% by mass. According to still another embodiment of the present invention, the content is 6% to 50% by mass. According to a further embodiment of the present invention, the content is 8% to 50% by mass. According to a further embodiment of the present invention, the content is 10% to 50% by mass. According to a further embodiment of the present invention, the content is 12% to 50% by mass. According to a further embodiment of the present invention, the content is 15% to 50% by mass. According to a further embodiment of the present invention, the content is 20% to 50% by mass. According to a further embodiment of the present invention, the content is 25% to 50% by mass. According to a further embodiment of the present invention, the content is 30% to 50% by mass. According to a further embodiment of the present invention, the content is 35% to 50% by mass. According to a further embodiment of the present invention, the content is 40% to 50% by mass.

Further, for example, according to an embodiment of the present invention, the content of the compound relative to the total mass of the liquid crystal composition of the present invention is 3% to 50% by mass. According to another embodiment of the present invention, the content is 3% to 40% by mass. According to still another embodiment of the present invention, the content is 3% to 35% by mass. According to a further embodiment of the present invention, the content is 3% to 30% by mass. According to a further embodiment of the present invention, the content is 3% to 20% by mass. According to a further embodiment of the present invention, the content is 3% to 15% by mass. According to a further embodiment of the present invention, the content is 3% to 10% by mass. According to a further embodiment of the present invention, the content is 3% to 5% by mass.

When high birefringence is required, a slightly high content has a high effect, while when high Tni is regarded as important, a slightly low content has a high effect. When dropping marks and image sticking are improved, the content range is preferably determined to a medium range.

Further, the compound represented by the general formula (1-4) is preferably a compound selected from a compound group represented by formula (5.1) to formula (5.4), and compounds represented by the formula (5.2) to formula (5.4) are preferred.

[Chem. 43]

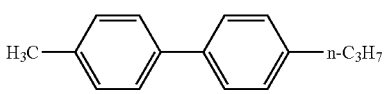

(5.1)

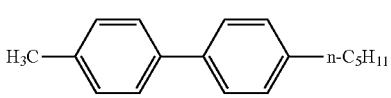

(5.2)

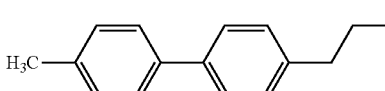

(5.3)

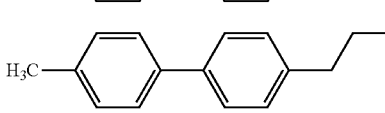

(5.4)

The content of the compound represented by the formula (5.3) relative to the total mass of the liquid crystal composition of the present invention is preferably 1% by mass or more and 30% by mass or less, more preferably 2% by mass or more and 20% by mass or less, still more preferably 2% by mass or more and 10% by mass or less, and particularly preferably 3% by mass or more and 7% by mass or less. Examples of the content within the particularly preferred range include 3% by mass or more and 5% by mass or less and 5% by mass or more and 7% by mass or less.

The content of the compound represented by the formula (5.4) relative to the total mass of the liquid crystal composition of the present invention is preferably 2% by mass or more and 30% by mass or less. Examples of a more preferred content include 4% by mass or more and 30% by mass or less, 6% by mass or more and 30% by mass or less, 8% by mass or more and 30% by mass or less, 10% by mass or more and 30% by mass or less, 12% by mass or more and 30% by mass or less, 14% by mass or more and 30% by mass or less, 16% by mass or more and 30% by mass or less, 18% by mass or more and 30% by mass or less, 20% by mass or more and 30% by mass or less, 22% by mass or more and 30% by mass or less, 23% by mass or more and 30% by mass or less, 24% by mass or more and 30% by mass or less, 25% by mass or more and 30% by mass or less, 4% by mass or more and 6% by mass or less, 4% by mass or more and 8% by mass or less, 4% by mass or more and 10% by mass or less, 4% by mass or more and 12% by mass or less, 4% by mass or more and 14% by mass or less, 4% by mass or more and 16% by mass or less, 4% by mass or more and 18% by mass or less, 4% by mass or more and 20% by mass or less, 4% by mass or more and 22% by mass or less, 4% by mass or more and 23% by mass or less, 4% by mass or more and 24% by mass or less, and 4% by mass or more and 25% by mass or less.

Further, the compound represented by the general formula (I) is preferably a compound selected from a compound group represented by general formula (I-5).

[Chem. 44]

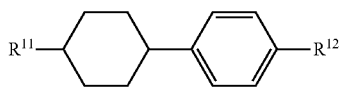

(I-5)

(In the formula, $R^{11}$ represents an alkyl group having 1 to 5 carbon atoms, an alkenyl group having 2 to 5 carbon atoms, or an alkoxy group having 1 to 4 carbon atoms, and $R^{12}$ represents an alkyl group having 1 to 5 carbon atoms, an alkenyl group having 4 to 5 carbon atoms, or an alkoxy group having 1 to 4 carbon atoms.)

The types of compounds which can be combined are not particularly limited, but a plurality of compounds represented by the general formula (I-5) can be properly used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2.

In the liquid crystal composition of the present invention, it is necessary to properly adjust the content of the compound represented by the general formula (I-5) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 1% to 50% by mass. According to another embodiment of the present invention, the content is 5% to 50% by mass. According to still another embodiment of the present invention, the content is 8% to 50% by mass. According to a further embodiment of the present invention, the content is 11% to 50% by mass. According to a further embodiment of the present invention, the content is 13% to 50% by mass. According to a further embodiment of the present invention, the content is 15% to 50% by mass. According to a further embodiment of the present invention, the content is 17% to 50% by mass. According to a further embodiment of the present invention, the content is 20% to 50% by mass. According to a further embodiment of the present invention, the content is 25% to 50% by mass. According to a further embodiment of the present invention, the content is 30% to 50% by mass. According to a further embodiment of the present invention, the content is 35% to 50% by mass. According to a further embodiment of the present invention, the content is 40% to 50% by mass.

Further, for example, according to an embodiment of the present invention, the content of the compound relative to the total mass of the liquid crystal composition of the present invention is 1% to 50% by mass. According to another embodiment of the present invention, the content is 1% to 40% by mass. According to still another embodiment of the present invention, the content is 1% to 35% by mass. According to a further embodiment of the present invention, the content is 1% to 30% by mass. According to a further embodiment of the present invention, the content is 1% to 20% by mass. According to a further embodiment of the present invention, the content is 1% to 15% by mass. According to a further embodiment of the present invention, the content is 1% to 10% by mass. According to a further embodiment of the present invention, the content is 1% to 5% by mass.

When solubility at a low temperature is regarded as important, a slightly high content has a high effect, while when the response speed is regarded as important, a slightly low content has a high effect. When dropping marks and image sticking are improved, the content range is preferably determined to a medium range.

Further, the compound represented by the general formula (1-5) is preferably a compound selected from a compound group represented by formula (6.1) to formula (6.6), and compounds represented by the formula (6.3), the formula (6.4), and the formula (6.6) are preferred.

[Chem. 45]

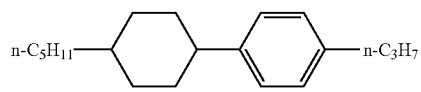

(6.1)

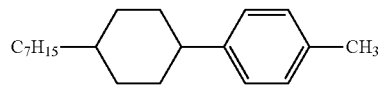

(6.2)

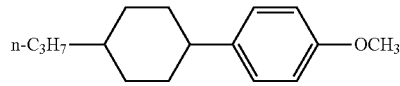

(6.3)

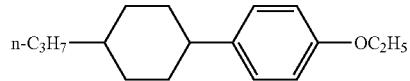

(6.4)

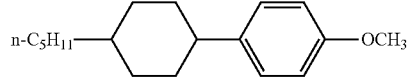

(6.5)

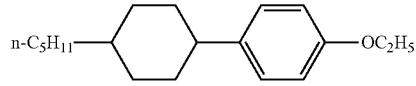

(6.6)

The content of the compound represented by the formula (6.3) relative to the total mass of the liquid crystal composition of the present invention is preferably 2% by mass or more and 30% by mass or less, more preferably 4% by mass or more and 25% by mass or less, still more preferably 6% by mass or more and 20% by mass or less, and particularly preferably 8% by mass or more and 14% by mass or less. Examples of the content within the particularly preferred range include 8% by mass or more and 11% by mass or less and 11% by mass or more and 14% by mass or less.

For example, the content of the compound represented by the formula (6.6) relative to the total mass of the liquid crystal composition of the present invention is preferably 2% by mass or more and 30% by mass or less, more preferably 4% by mass or more and 30% by mass or less, more preferably 5% by mass or more and 30% by mass or less, more preferably 6% by mass or more and 30% by mass or less, more preferably 9% by mass or more and 30% by mass or less, more preferably 12% by mass or more and 30% by mass or less, more preferably 14% by mass or more and 30% by mass or less, more preferably 16% by mass or more and 30% by mass or less, more preferably 18% by mass or more and 25% by mass or less, more preferably 20% by mass or more and 24% by mass or less, and particularly preferably 22% by mass or more and 23% by mass or less.

The liquid crystal composition of the present invention can further contain compounds represented by formula (6.7) and formula (6.8) as the compound represented by the general formula (I-5).

[Chem. 46]

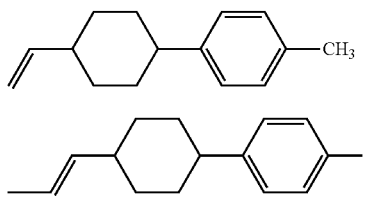

(6.7)

(6.8)

The content of the compound represented by the formula (6.7) is preferably adjusted according to desired performance such as solubility at a low temperature, transition temperature, electric reliability, birefringence, etc., and the content of the compound relative to the total mass of the liquid crystal composition of the present invention is preferably 2% by mass or more, more preferably 3% by mass or more, still more preferably 5% by mass or more, and particularly preferably 7% by mass or more.

Further, the compound represented by the general formula (I) is preferably a compound selected from a compound group represented by general formula (I-6).

[Chem. 47]

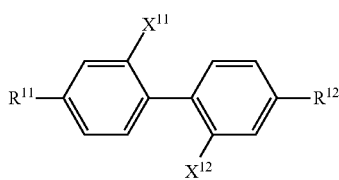

(I-6)

(In the formula, $R^{11}$ and $R^{12}$ each independently represent an alkyl group having 1 to 5 carbon atoms, an alkenyl group having 4 to 5 carbon atoms, or an alkoxy group having 1 to 4 carbon atoms, $X^{11}$ and $X^{12}$ each independently represent a fluorine atom or a hydrogen atom, and one of $X^{11}$ and $X^{12}$ is a fluorine atom.)

The content of the compound represented by the general formula (I-6) relative to the total mass of the liquid crystal composition of the present invention is preferably 2% by mass or more and 30% by mass or less, more preferably 4% by mass or more and 30% by mass or less, more preferably 5% by mass or more and 30% by mass or less, more preferably 6% by mass or more and 30% by mass or less, more preferably 9% by mass or more and 30% by mass or less, more preferably 12% by mass or more and 30% by mass or less, more preferably 14% by mass or more and 30% by mass or less, more preferably 16% by mass or more and 30% by mass or less, more preferably 18% by mass or more and 25% by mass or less, more preferably 20% by mass or more and 24% by mass or less, and particularly preferably 22% by mass or more and 23% by mass or less.

Further, the compound represented by the general formula (I-6) is preferably a compound represented by formula (7.1).

[Chem. 48]

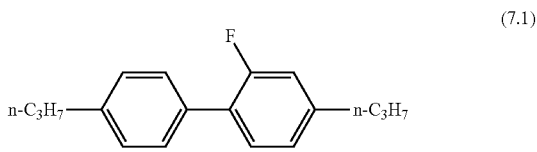

(7.1)

Further, the compound represented by the general formula (I) is preferably a compound selected from a compound group represented by general formula (I-7).

[Chem. 49]

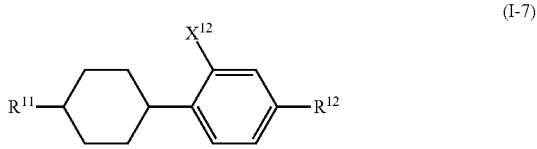

(I-7)

(In the formula, $R^{11}$ and $R^{12}$ each independently represent an alkyl group having 1 to 5 carbon atoms, an alkenyl group having 2 to 5 carbon atoms, or an alkoxy group having 1 to 4 carbon atoms, and $X^{12}$ each independently represent a fluorine atom or a hydrogen atom.)

The content of the compound represented by the general formula (I-7) relative to the total mass of the liquid crystal composition of the present invention is preferably 1% by mass or more and 30% by mass or less, more preferably 2% by mass or more and 30% by mass or less, more preferably 3% by mass or more and 30% by mass or less, more preferably 4% by mass or more and 30% by mass or less, more preferably 6% by mass or more and 30% by mass or less, more preferably 8% by mass or more and 30% by mass or less, more preferably 10% by mass or more and 30% by mass or less, more preferably 12% by mass or more and 30% by mass or less, more preferably 15% by mass or more and 25% by mass or less, more preferably 18% by mass or more and 24% by mass or less, and particularly preferably 21% by mass or more and 22% by mass or less.

Further, the compound represented by the general formula (I-7) is preferably a compound represented by formula (8.1).

[Chem. 50]

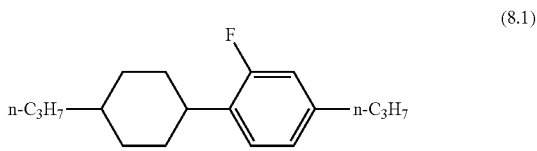

(8.1)

Further, the compound represented by the general formula (I) is preferably a compound selected from a compound group represented by general formula (I-8).

[Chem. 51]

(I-8)

(In the formula, $R^{16}$ and $R^{17}$ each independently represent an alkenyl group having 2 to 5 carbon atoms.)

The types of compounds which can be combined are not particularly limited, but a plurality of compounds represented by the general formula (I-8) are preferably used alone or in combination of two or three according to desired performance such as solubility at a low temperature, transition temperature, electric reliability, birefringence, etc. According to desired performance such as solubility at a low temperature, transition temperature, electric reliability, birefringence, process adaptability, dropping marks, image sticking, dielectric anisotropy, etc., the content of the compound represented by the general formula (I-8) relative to the total mass of the liquid crystal composition of the present invention is preferably 5% by mass or more and 65% by mass or less, more preferably 10% by mass or more and 65% by mass or less, more preferably 15% by mass or more and 65% by mass or less, more preferably 20% by mass or more and 65% by mass or less, more preferably 25% by mass or more and 65% by mass or less, more preferably 30% by mass or more and 65% by mass or less, more preferably 35% by mass or more and 65% by mass or less, more preferably 40% by mass or more and 65% by mass or less, more preferably 45% by mass or more and 60% by mass or less, more preferably 50% by mass or more and 58% by mass or less, and particularly preferably 55% by mass or more and 56% by mass or less.

Further, the compound represented by the general formula (I-8) is preferably a compound selected from a compound group represented by formula (9.1) to formula (9.10), and compounds represented by the formula (9.2), the formula (9.4), and the formula (9.7) are preferred.

[Chem. 52]

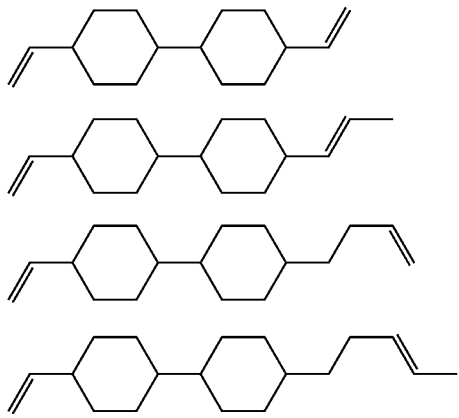

(9.1)

(9.2)

(9.3)

(9.4)

-continued

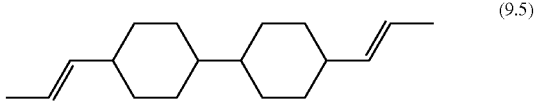

(9.5)

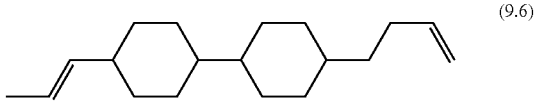

(9.6)

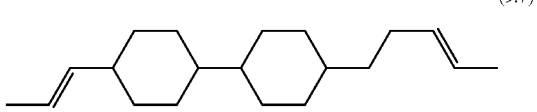

(9.7)

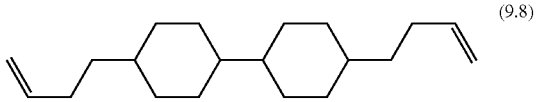

(9.8)

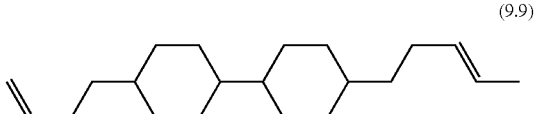

(9.9)

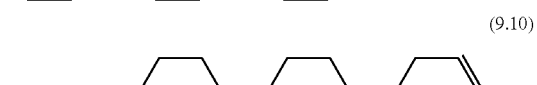

(9.10)

Further, the compound represented by the general formula (L) is preferably, for example, a compound selected from compounds represented by general formula (II).

[Chem. 53]

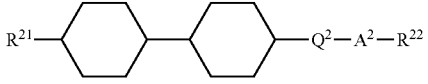

(II)

($R^{21}$ and $R^{22}$ each independently represent an alkenyl group having 2 to 5 carbon atoms, an alkyl group having 1 to 5 carbon atoms, or an alkoxy group having 1 to 4 carbon atoms, $A^2$ represents a 1,4-cyclohexylene group or a 1,4-phenylene group, and $Q^2$ represents a single bond, —COO—, —CH$_2$—CH$_2$—, or —CF$_2$O—.)

The types of compounds which can be combined are not particularly limited, but a plurality of compounds represented by the general formula (II) can be used in combination according to desired performance such as solubility at a low temperature, transition temperature, electric reliability, birefringence, etc. For example, according to an embodiment of the present invention, the number of the type of compound used is 1. According to still another embodiment of the present invention, the number of the types is 2. According to a further embodiment of the present invention, the number of the types is 3. According to a further embodiment of the present invention, the number of the types is 4 or more.

In the liquid crystal composition of the present invention, it is necessary to properly adjust the content of the compound represented by the general formula (II) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 3% to 50% by mass. According to another embodiment of the present invention, the content is 5% to 50% by mass. According to still another embodiment of the present invention, the content is 7% to 50% by mass. According to a further embodiment of the present invention, the content is 10% to 50% by mass. According to a further embodiment of the present invention, the content is 14% to 50% by mass. According to a further embodiment of the present invention, the content is 16% to 50% by mass. According to a further embodiment of the present invention, the content is 20% to 50% by mass. According to a further embodiment of the present invention, the content is 23% to 50% by mass. According to a further embodiment of the present invention, the content is 26% to 50% by mass. According to a further embodiment of the present invention, the content is 30% to 50% by mass. According to a further embodiment of the present invention, the content is 35% to 50% by mass. According to a further embodiment of the present invention, the content is 40% to 50% by mass.

Further, according to an embodiment of the present invention, the content of the compound relative to the total mass of the liquid crystal composition of the present invention is 3% to 50% by mass. According to another embodiment of the present invention, the content is 3% to 40% by mass. According to still another embodiment of the present invention, the content is 3% to 35% by mass. According to a further embodiment of the present invention, the content is 3% to 30% by mass. According to a further embodiment of the present invention, the content is 3% to 20% by mass. According to a further embodiment of the present invention, the content is 3% to 15% by mass. According to a further embodiment of the present invention, the content is 3% to 10% by mass. According to a further embodiment of the present invention, the content is 3% to 5% by mass.

Further, the compound represented by the general formula (II) is preferably, for example, a compound selected from a compound group represented by general formula (II-1).

[Chem. 54]

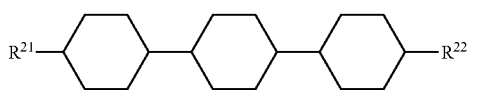
(II-1)

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

The content of the compound represented by the general formula (II-1) is preferably adjusted according to desired performance such as solubility at a low temperature, transition temperature, electric reliability, birefringence, etc., and is preferably 4% by mass or more and 24% by mass or less, more preferably 8% by mass or more and 18% by mass or less, and still more preferably 12% by mass or more and 14% by mass or less.

Further, preferred examples of the compound represented by the general formula (II-1) include compounds represented by formula (10.1) and formula (10.2).

[Chem. 55]

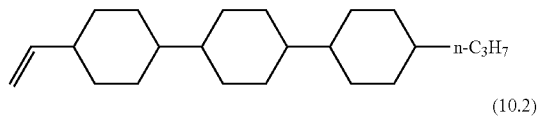
(10.1)

(10.2)

Further, the compound represented by the general formula (II) is preferably, for example, a compound selected from a compound group represented by general formula (II-2).

[Chem. 56]

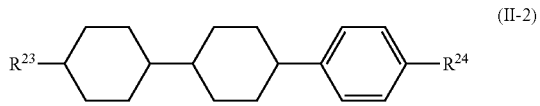
(II-2)

($R^{23}$ represents an alkenyl group having 2 to 5 carbon atoms, and $R^{24}$ represents an alkyl group having 1 to 5 carbon atoms or an alkoxy group having 1 to 4 carbon atoms.)

The types of compounds which can be combined are not particularly limited, but a plurality of compounds represented by the general formula (II-2) can be used in combination according to desired performance such as solubility at a low temperature, transition temperature, electric reliability, birefringence, etc. For example, according to an embodiment of the present invention, the number of the type of compound used is 1. According to still another embodiment of the present invention, the number of the types is 2 or more.

In the liquid crystal composition of the present invention, it is necessary to properly adjust the content of the compound represented by the general formula (II-2) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 3% to 50% by mass. According to another embodiment of the present invention, the content is 5% to 50% by mass. According to still another embodiment of the present invention, the content is 7% to 50% by mass. According to a further embodiment of the present invention, the content is 10% to 50% by mass. According to a further embodiment of the present invention, the content is 14% to 50% by mass. According to a further embodiment of the present invention, the content is 16% to 50% by mass. According to a further embodiment of the present invention, the content is 20% to 50% by mass. According to a further embodiment of the present invention, the content is 23% to 50% by mass. According to a further embodiment of the present invention, the content is 26% to 50% by mass. According to a further embodiment of the present invention, the content is 30% to 50% by mass. According to a further embodiment of the present invention, the content is 35% to 50% by mass.

According to a further embodiment of the present invention, the content is 40% to 50% by mass.

Further, according to an embodiment of the present invention, the content of the compound relative to the total mass of the liquid crystal composition of the present invention is 3% to 50% by mass. According to another embodiment of the present invention, the content is 3% to 40% by mass. According to still another embodiment of the present invention, the content is 3% to 35% by mass. According to a further embodiment of the present invention, the content is 3% to 30% by mass. According to a further embodiment of the present invention, the content is 3% to 20% by mass. According to a further embodiment of the present invention, the content is 3% to 15% by mass. According to a further embodiment of the present invention, the content is 3% to 10% by mass. According to a further embodiment of the present invention, the content is 3% to 5% by mass.

Further, preferred examples of the compound represented by the general formula (II-2) include compounds represented by formula (11.1) to formula (11.3).

[Chem. 57]

(11.1)

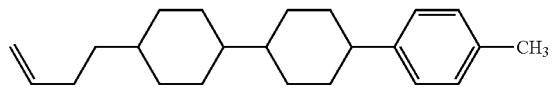
(11.2)

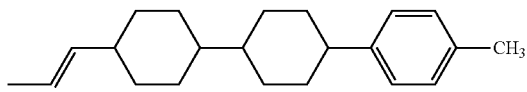
(11.3)

According to desired performance such as solubility at a low temperature, transition temperature, electric reliability, birefringence, etc., the liquid crystal composition of the present invention may contain a compound represented by the formula (11.1), a compound represented by the formula (11.2), both a compound represented by the formula (11.1) and a compound represented by the formula (11.2), or all compounds represented by the formula (11.1) to the formula (11.3). The content of the compound represented by the formula (11.1) or the formula (11.2) relative to the total mass of the liquid crystal composition of the present invention is preferably 3% by mass or more and 40% by mass or less, more preferably 5% by mass or more and 35% by mass or less, still more preferably 5% by mass or more and 30% by mass or less, particularly preferably 5% by mass or more and 25% by mass or less, and most preferably 5% by mass or more and 20% by mass or less. Examples of the content within the most preferred range include 8% by mass or more and 20% by mass or less, 12% by mass or more and 20% by mass or less, 15% by mass or more and 20% by mass or less, 5% by mass or more and 18% by mass or less, 5% by mass or more and 15% by mass or less, 5% by mass or more and 12% by mass or less, 5% by mass or more and 10% by mass or less, and 5% by mass or more and 8% by mass or less.

The content of the compound represented by the formula (11.1) relative to the total mass of the liquid crystal composition of the present invention is preferably 3% by mass or more and 40% by mass or less, more preferably 5% by mass or more and 35% by mass or less, still more preferably 5% by mass or more and 30% by mass or less, yet more preferably 5% by mass or more and 25% by mass or less, and particularly preferably 5% by mass or more and 20% by mass or less. Examples of the content within the particularly preferred range include 5% by mass or more and 17% by mass or less, 5% by mass or more and 15% by mass or less, 5% by mass or more and 12% by mass or less, 5% by mass or more and 10% by mass or less, 5% by mass or more and 8% by mass or less, 6% by mass or more and 20% by mass or less, 8% by mass or more and 20% by mass or less, 10% by mass or more and 20% by mass or less, 12% by mass or more and 20% by mass or less, 15% by mass or more and 20% by mass or less, and 17% by mass or more and 20% by mass or less.

The content of the compound represented by the formula (11.2) relative to the total mass of the liquid crystal composition of the present invention is preferably 3% by mass or more and 40% by mass or less, more preferably 3% by mass or more and 35% by mass or less, still more preferably 3% by mass or more and 30% by mass or less, yet more preferably 3% by mass or more and 25% by mass or less, particularly preferably 3% by mass or more and 20% by mass or less, and most preferably 5% by mass or more and 12% by mass or less.

Examples of the content within the most preferred range include 5% by mass or more and 10% by mass or less, 5% by mass or more and 8% by mass or less, 5% by mass or more and 6% by mass or less, 6% by mass or more and 12% by mass or less, 8% by mass or more and 12% by mass or less, and 10% by mass or more and 12% by mass or less.

When both the compound represented by the formula (11.1) and the compound represented by the formula (11.2) are contained, the total mass of both compounds relative to the total mass of the liquid crystal composition of the present invention is preferably 10% by mass or more and 45% by mass or less, more preferably 13% by mass or more and 35% by mass or less, and still more preferably 16% by mass or more and 25% by mass or less.

Examples of the content within the still more preferred range include 16% by mass or more and 22% by mass or less, 16% by mass or more and 20% by mass or less, 16% by mass or more and 18% by mass or less, 18% by mass or more and 25% by mass or less, 20% by mass or more and 25% by mass or less, and 22% by mass or more and 25% by mass or less.

Further, the compound represented by the general formula (II) is preferably, for example, a compound selected from a compound group represented by general formula (II-3).

[Chem. 58]

(II-3)

($R^{25}$ represents an alkyl group having 1 to 5 carbon atoms, and $R^{24}$ represents an alkyl group having 1 to 5 carbon atoms or an alkoxy group having 1 to 4 carbon atoms.)

The types of compounds which can be combined are not particularly limited, but a plurality of compounds represented by the general formula (II-3) are preferably used alone or in combination of two or three according to desired performance such as solubility at a low temperature, transition temperature, electric reliability, birefringence, etc.

It is necessary to properly adjust the content of the compound represented by the general formula (II-3) according to desired performance such as solubility at a low temperature, transition temperature, electric reliability, birefringence, process adaptability, dropping marks, image sticking, dielectric anisotropy, etc. The content of the compound relative to the total mass of the liquid crystal composition of the present invention is, for example, 2% to 45% by mass. Examples of the more preferred content include 5% to 45% by mass, 8% to 45% by mass, 11% to 45% by mass, 14% to 45% by mass, 17% to 45% by mass, 20% to 45% by mass, 23% to 45% by mass, 26% to 45% by mass, 29% to 45% by mass, 2% to 45% by mass, 2% to 40% by mass, 2% to 35% by mass, 2% to 30% by mass, 2% to 25% by mass, 2% to 20% by mass, 2% to 15% by mass, and 2% to 10% by mass.

Further, preferred examples of the compound represented by the general formula (II-3) include compounds represented by formula (12.1) to formula (12.3).

[Chem. 59]

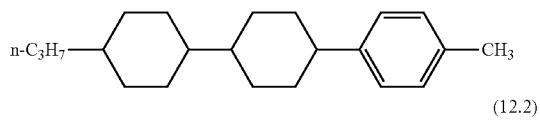
(12.1)

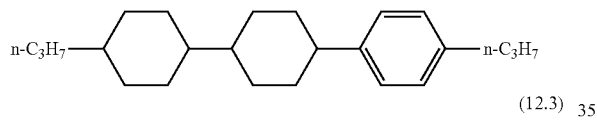
(12.2)

(12.3)

According to desired performance such as solubility at a low temperature, transition temperature, electric reliability, birefringence, etc., the liquid crystal composition of the present invention may contain a compound represented by the formula (12.1), a compound represented by the formula (12.2), or both a compound represented by the formula (12.1) and a compound represented by the formula (12.2). The content of the compound represented by the formula (12.1) or the formula (12.2) relative to the total mass of the liquid crystal composition of the present invention is preferably 3% by mass or more and 40% by mass or less, more preferably 5% by mass or more and 40% by mass or less, even more preferably 7% by mass or more and 40% by mass or less, even more preferably 9% by mass or more and 40% by mass or less, still more preferably 11% by mass or more and 40% by mass or less, still more preferably 12% by mass or more and 40% by mass or less, still more preferably 13% by mass or more and 40% by mass or less, still more preferably 18% by mass or more and 30% by mass or less, and particularly preferably 21% by mass or more and 25% by mass or less. The content of the compound represented by the formula (12.2) relative to the total mass of the liquid crystal composition of the present invention is preferably 3% by mass or more and 40% by mass or less, more preferably 5% by mass or more and 40% by mass or less, even more preferably 8% by mass or more and 40% by mass or less, even more preferably 10% by mass or more and 40% by mass or less, still more preferably 12% by mass or more and 40% by mass or less, still more preferably 15% by mass or more and 40% by mass or less, still more preferably 17% by mass or more and 30% by mass or less, and particularly preferably 19% by mass or more and 25% by mass or less. When both the compound represented by the formula (12.1) and the compound represented by the formula (12.2) are contained, the total mass of both compounds relative to the total mass of the liquid crystal composition of the present invention is preferably 15% by mass or more and 45% by mass or less, more preferably 19% by mass or more and 45% by mass or less, still more preferably 24% by mass or more and 40% by mass or less, and particularly preferably 30% by mass or more and 35% by mass or less.

The content of the compound represented by the formula (12.3) relative to the total mass of the liquid crystal composition of the present invention is preferably 0.05% by mass or more and 2% by mass or less, more preferably 0.1% by mass or more and 1% by mass or less, and still more preferably 0.2% by mass or more and 0.5% by mass or less. The compound represented by the formula (12.3) may be an optically active compound.

Further, the compound represented by the general formula (II-3) is preferably, for example, a compound selected from a compound group represented by general formula (II-3-1).

[Chem. 60]

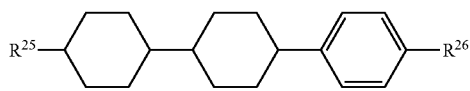
(II-3-1)

($R^{25}$ represents an alkyl group having 1 to 5 carbon atoms, and $R^{26}$ represents an alkoxy group having 1 to 4 carbon atoms.)

The types of compounds which can be combined are not particularly limited, but one to three of compounds represented by the general formula (II-3-1) are preferably contained according to desired performance such as solubility at a low temperature, transition temperature, electric reliability, birefringence, etc.

It is preferred to properly adjust the content of the compound represented by the general formula (II-3-1) according to desired performance such as solubility at a low temperature, transition temperature, electric reliability, birefringence, etc., and the content of the compound is preferably 1% by mass or more and 24% by mass or less, more preferably 4% by mass or more and 18% by mass or less, and still more preferably 8% by mass or more and 14% by mass or less.

Further, preferred examples of the compound represented by the general formula (II-3-1) include compounds represented by formula (13.1) to formula (13.4), and a compound represented by formula (13.3) is particularly preferred.

[Chem. 61]

(13.1)

-continued

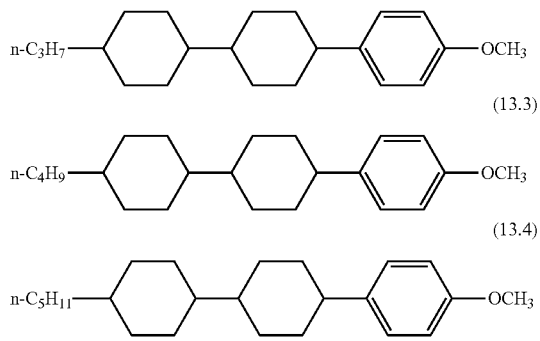

Further, the compound represented by the general formula (II) is preferably, for example, a compound selected from a compound group represented by general formula (II-4).

[Chem. 62]

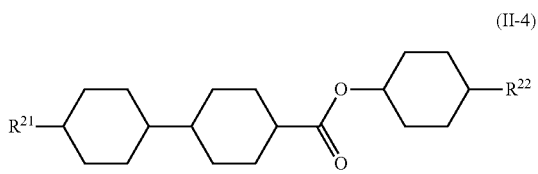

(R$^{21}$ and R$^{22}$ each independently represent an alkenyl group having 2 to 5 carbon atoms, an alkyl group having 1 to 5 carbon atoms, or an alkoxy group having 1 to 4 carbon atoms.)

These compounds may be contained alone or in combination of two or more and are preferably properly combined according to desired performance. The types of compounds which can be combined are not particularly limited, but one or two, particularly preferably one to three, of a plurality of compounds represented by the general formula (II-4) are preferably contained according to desired performance such as solubility at a low temperature, transition temperature, electric reliability, birefringence, etc.

The content of the compound represented by the general formula (II-4) relative to the total mass of the liquid crystal composition of the present invention is preferably 1% by mass or more and 15% by mass or less, more preferably 2% by mass or more and 15% by mass or less, even more preferably 3% by mass or more and 15% by mass or less, still more preferably 4% by mass or more and 12% by mass or less, and particularly preferably 5% by mass or more and 7% by mass or less.

Further, preferred examples of the compound represented by the general formula (II-4) include compounds represented by formula (14.1) to formula (14.5), and a compound represented by formula (14.2) or formula (14.5) is particularly preferred.

[Chem. 63]

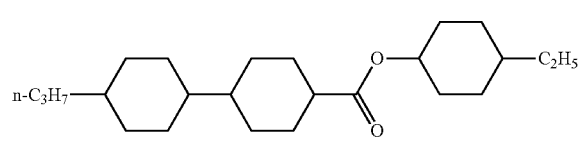

-continued

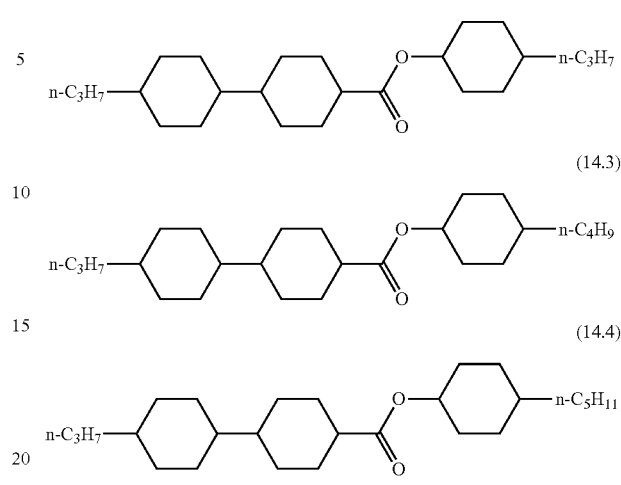

Further, the compound represented by the general formula (L) is preferably a compound selected from a compound group represented by general formula (III).

[Chem. 64]

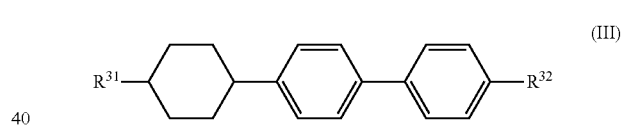

(R$^{31}$ and R$^{32}$ each independently represent an alkenyl group having 2 to 5 carbon atoms, an alkyl group having 1 to 5 carbon atoms, or an alkoxy group having 1 to 4 carbon atoms.)

In view of desired solubility, birefringence, etc., the content of the compound represented by the general formula (III) relative to the total mass of the liquid crystal composition of the present invention is preferably 3% by mass or more and 25% by mass or less, more preferably 6% by mass or more and 20% by mass or less, and still more preferably 8% by mass or more and 15% by mass or less.

Further, the compound represented by the general formula (III) is preferably, for example, a compound represented by formula (15.1) or formula (15.2), and a compound represented by formula (15.1) is particularly preferred.

[Chem. 65]

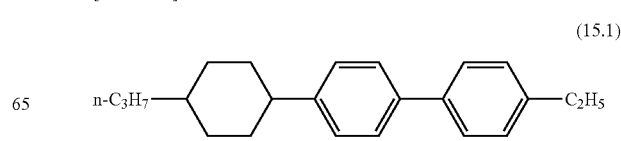

-continued (15.2)

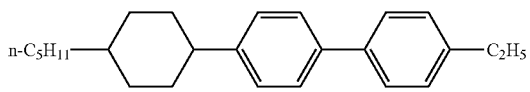

Further, the compound represented by the general formula (III) is preferably a compound selected from a compound group represented by general formula (III-1).

[Chem. 66]

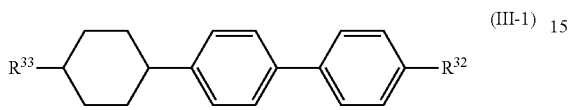

(III-1)

($R^{33}$ represents an alkenyl group having 2 to 5 carbon atoms. $R^{32}$ represents an alkyl group having 1 to 5 carbon atoms or an alkoxy group having 1 to 4 carbon atoms.)

The content of the compound represented by the general formula (III-1) is preferably adjusted according to desired performance such as solubility at a low temperature, transition temperature, electric reliability, birefringence, etc., and the content of the compound is preferably 4% by mass or more and 23% by mass or less, more preferably 6% by mass or more and 18% by mass or less, and still more preferably 10% by mass or more and 13% by mass or less.

Further, the compound represented by the general formula (III-1) is preferably, for example, a compound represented by formula (16.1) or formula (16.2).

[Chem. 67]

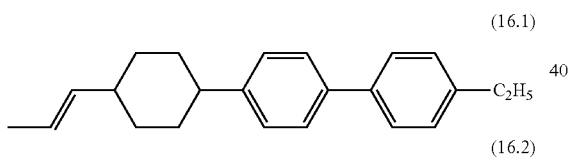

(16.1)

(16.2)

Further, the compound represented by the general formula (III) is preferably a compound selected from a compound group represented by general formula (III-2).

[Chem. 68]

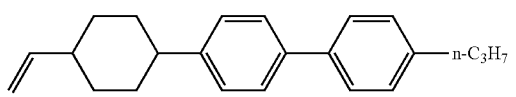

(III-2)

($R^{31}$ represents an alkyl group having 1 to 5 carbon atoms, and $R^{34}$ represents an alkoxy group having 1 to 4 carbon atoms.)

The content of the compound represented by the general formula (III-2) is preferably adjusted according to desired performance such as solubility at a low temperature, transition temperature, electric reliability, birefringence, etc., and the content of the compound is preferably 4% by mass or more and 23% by mass or less, more preferably 6% by mass or more and 18% by mass or less, and still more preferably 10% by mass or more and 13% by mass or less.

Further, the compound represented by the general formula (III-2) is preferably, for example, a compound selected from a compound group represented by formula (17.1) to formula (17.3), and a compound represented by formula (17.3) is particularly preferred.

[Chem. 69]

(17.1)

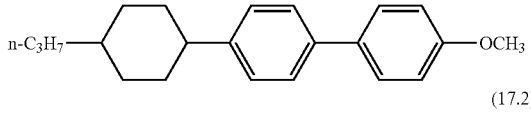

(17.2)

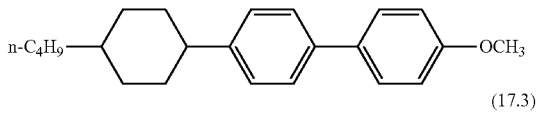

(17.3)

Further, the compound represented by the general formula (L) is preferably a compound selected from a group represented by general formula (IV).

[Chem. 70]

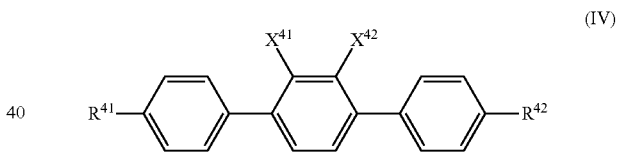

(IV)

(In the formula, $R^{41}$ and $R^{42}$ each independently represent an alkyl group having 1 to 5 carbon atoms or an alkenyl group having 2 to 5 carbon atoms, and $X^{41}$ and $X^{42}$ each independently represent a hydrogen atom or a fluorine atom.)

The types of compounds which can be combined are not particularly limited, but a plurality of compounds represented by the general formula (IV) can be used in combination according to desired performance such as solubility at a low temperature, transition temperature, electric reliability, birefringence, etc. For example, according to an embodiment of the present invention, the number of the type of compound used is 1. According to still another embodiment of the present invention, the number of the types is 2. According to a further embodiment of the present invention, the number of the types is 3. According to a further embodiment of the present invention, the number of the types is 4. According to a further embodiment of the present invention, the number of the types is 5. According to a further embodiment of the present invention, the number of the types is 6 or more.

Further, the compound represented by the general formula (IV) is preferably, for example, a compound selected from a compound group represented by general formula (IV-1).

[Chem. 71]

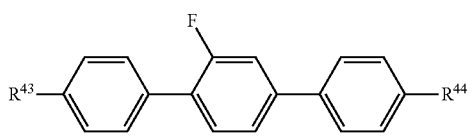

(IV-1)

(In the formula, $R^{43}$ and $R^{44}$ each independently represent an alkyl group having 1 to 5 carbon atoms.)

It is necessary to properly adjust the content of the compound represented by the general formula (IV-1) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 1% to 40% by mass. According to another embodiment of the present invention, the content is 2% to 40% by mass. According to still another embodiment of the present invention, the content is 4% to 40% by mass. According to a further embodiment of the present invention, the content is 6% to 40% by mass. According to a further embodiment of the present invention, the content is 8% to 40% by mass. According to a further embodiment of the present invention, the content is 10% to 40% by mass. According to a further embodiment of the present invention, the content is 12% to 40% by mass. According to a further embodiment of the present invention, the content is 15% to 40% by mass. According to a further embodiment of the present invention, the content is 18% to 40% by mass. According to a further embodiment of the present invention, the content is 21% to 40% by mass.

Further, for example, according to an embodiment of the present invention, the content of the compound relative to the total mass of the liquid crystal composition of the present invention is 1% to 40% by mass. According to another embodiment of the present invention, the content is 1% to 30% by mass. According to still another embodiment of the present invention, the content is 1% to 25% by mass. According to a further embodiment of the present invention, the content is 1% to 20% by mass. According to a further embodiment of the present invention, the content is 1% to 15% by mass. According to a further embodiment of the present invention, the content is 1% to 10% by mass. According to a further embodiment of the present invention, the content is 1% to 5% by mass. According to a further embodiment of the present invention, the content is 1% to 4% by mass.

Further, preferred examples of the compound represented by the general formula (IV-1) include compounds represented by formula (18.1) to formula (18.9).

[Chem. 72]

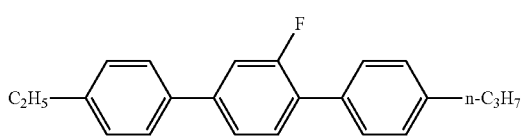

(18.1)

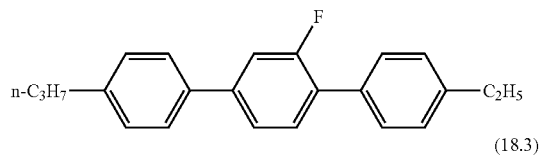

(18.2)

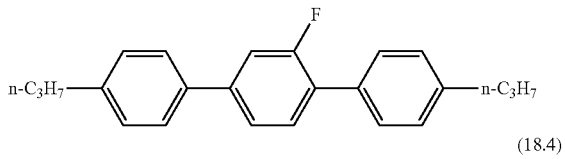

(18.3)

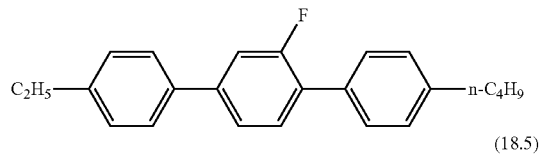

(18.4)

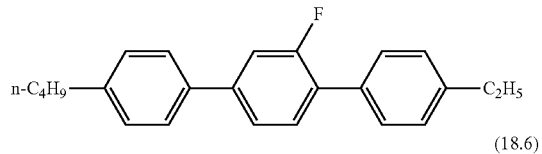

(18.5)

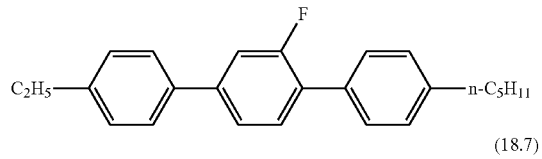

(18.6)

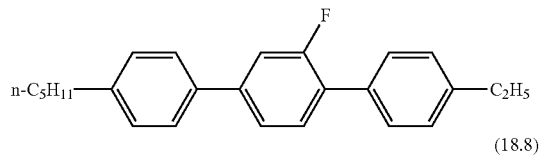

(18.7)

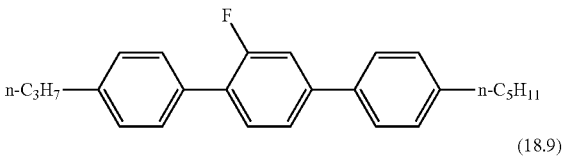

(18.8)

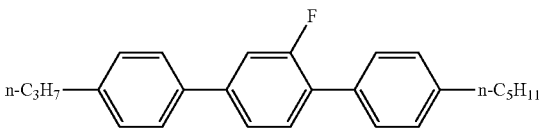

(18.9)

The types of compounds which can be combined are not particularly limited, but one to three, more preferably one to four, of these compounds are preferably contained. Also, since it is effective for solubility that the compound selected has a wide molecular weight distribution, for example, one compound represented by the formula (18.1) or the formula (18.2), one compound represented by the formula (18.4) or the formula (18.5), one compound represented by the formula (18.6) or the formula (18.7), and one compound represented by the formula (18.8) or the formula (18.9) are preferably selected and appropriately combined. In particular, the compounds represented by the formula (18.1), the formula (18.3), the formula (18.4), the formula (18.6), and the formula (18.9) are preferably contained.

Further, the compound represented by the general formula (IV) is preferably, for example, a compound selected from a compound group represented by general formula (IV-2).

[Chem. 73]

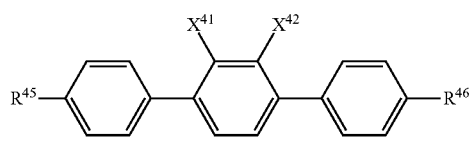

(IV-2)

(In the formula, $R^{45}$ and $R^{46}$ each independently represent an alkyl group having 1 to 5 carbon atoms or an alkenyl group having 2 to 5 carbon atoms, at least one of $R^{45}$ and $R^{46}$ represents an alkenyl group having 2 to 5 carbon atoms, and $X^{41}$ and $X^{42}$ each independently represent a hydrogen atom or a fluorine atom.)

The types of compounds which can be combined are not particularly limited, but a plurality of compounds represented by the general formula (IV-2) can be used in combination according to desired performance such as solubility at a low temperature, transition temperature, electric reliability, birefringence, etc.

It is necessary to properly adjust the content of the compound represented by the general formula (IV-2) according to desired performance such as solubility at a low temperature, transition temperature, electric reliability, birefringence, process adaptability, dropping marks, image sticking, dielectric anisotropy, etc. For example, the content of the compound relative to the total mass of the liquid crystal composition of the present invention is preferably 0.5% to 40% by mass. Examples of a more preferred content include 1% to 40% by mass, 2% to 40% by mass, 3% to 40% by mass, 5% to 40% by mass, 7% to 40% by mass, 9% to 40% by mass, 12% to 40% by mass, 15% to 40% by mass, 20% to 40% by mass, 1% to 40% by mass, 1% to 30% by mass, 1% to 25% by mass, 1% to 20% by mass, 1% to 15% by mass, 1% to 10% by mass, 1% to 5% by mass, and 1% to 4% by mass.

Further, preferred examples of the compound represented by the general formula (IV-2) include compounds represented by formula (19.1) to formula (19.8), and a compound represented by formula (19.2) is particularly preferred.

[Chem. 74]

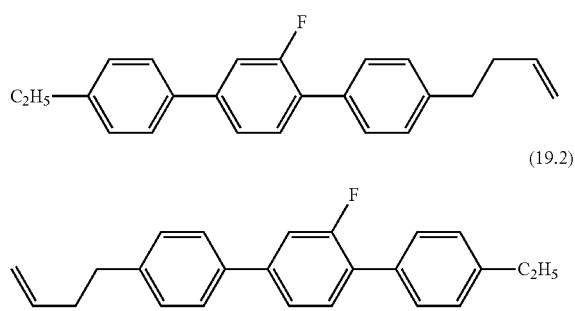

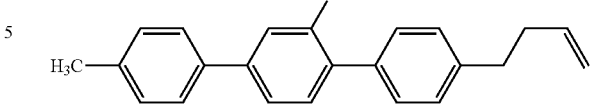

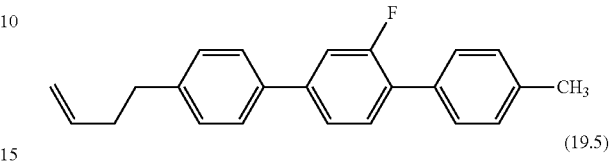

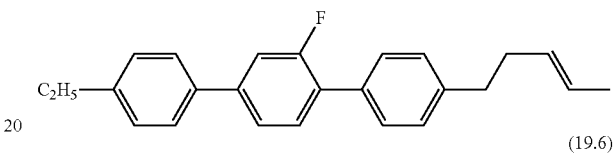

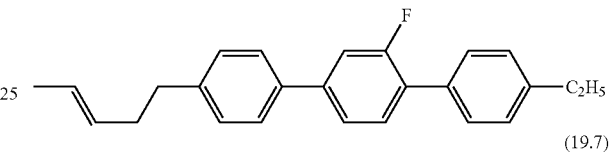

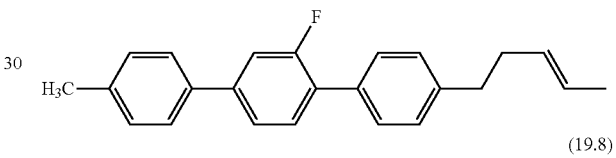

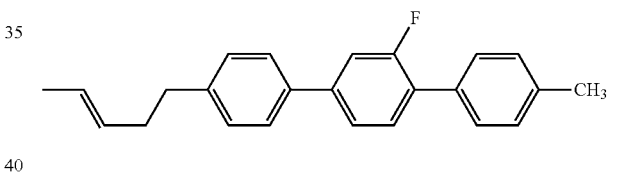

Since it is effective for solubility that the compound selected as a component of the liquid crystal composition has a wide molecular weight distribution, for example, one compound represented by the formula (19.1) or the formula (19.2), one compound represented by the formula (19.3) or the formula (19.4), one compound represented by the formula (19.5) or the formula (19.6), and one compound represented by the formula (19.7) or the formula (19.8) are preferably selected and appropriately combined.

In the liquid crystal composition of the present invention, in view of solubility at a low temperature, transition temperature, electric reliability, etc., the content of the compound represented by the general formula (19.2) relative to the total mass of the liquid crystal composition of the present invention is preferably 0.5% by mass or more and 15% by mass or less, more preferably 1% by mass or more and 10% by mass or less, still more preferably 1% by mass or more and 7% by mass or less, particularly preferably 1% by mass or more and 5% by mass or less, and most preferably 1% by mass or more and 3% by mass or less.

In the liquid crystal composition of the present invention, in view of solubility at a low temperature, transition temperature, electric reliability, etc., the content of the compound represented by the general formula (19.4) relative to the total mass of the liquid crystal composition of the present invention is preferably 3% by mass or more and 25% by mass or less, more preferably 5% by mass or more and 20% by mass or less, still more preferably 5% by mass or more and 15% by mass or less, and particularly preferably 7% by mass or more and 10% by mass or less.

Further, the compound represented by the general formula (L) is preferably a compound selected from a group represented by general formula (V).

[Chem. 75]

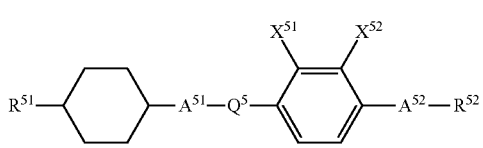

(V)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, $A^{51}$ and $A^{52}$ each independently represent a 1,4-cyclhexylene group or a 1,4-phenylene group, $Q^2$ represents a single bond or —COO—, and $X^{51}$ and $X^{52}$ each independently represent a fluorine atom or a hydrogen atom.)

The types of compounds which can be combined are not particularly limited, but a plurality of compounds represented by the general formula (V) can be used in combination according to desired performance such as solubility at a low temperature, transition temperature, electric reliability, birefringence, etc. For example, according to an embodiment of the present invention, the number of the type of compound used is 1. According to still another embodiment of the present invention, the number of the types is 2. According to a further embodiment of the present invention, the number of the types is 3. According to a further embodiment of the present invention, the number of the types is 4.

For example, according to an embodiment of the present invention, the content of the compound relative to the total mass of the liquid crystal composition of the present invention is 2% to 40% by mass. According to another embodiment of the present invention, the content is 4% to 40% by mass. According to still another embodiment of the present invention, the content is 7% to 40% by mass. According to a further embodiment of the present invention, the content is 10% to 40% by mass. According to a further embodiment of the present invention, the content is 12% to 40% by mass. According to a further embodiment of the present invention, the content is 15% to 40% by mass. According to a further embodiment of the present invention, the content is 17% to 40% by mass. According to a further embodiment of the present invention, the content is 18% to 40% by mass. According to a further embodiment of the present invention, the content is 20% to 40% by mass. According to a further embodiment of the present invention, the content is 22% to 40% by mass.

Also, for example, according to an embodiment of the present invention, the content of the compound relative to the total mass of the liquid crystal composition of the present invention is 2% to 40% by mass. According to another embodiment of the present invention, the content of the compound is 2% to 30% by mass. According to still another embodiment of the present invention, the content of the compound is 2% to 25% by mass. According to a further embodiment of the present invention, the content of the compound is 2% to 20% by mass. According to a further embodiment of the present invention, the content of the compound is 2% to 15% by mass. According to a further embodiment of the present invention, the content of the compound is 2% to 10% by mass. According to a further embodiment of the present invention, the content of the compound is 2% to 5% by mass. According to a further embodiment of the present invention, the content of the compound is 2% to 4% by mass.

Further, the compound represented by the general formula (V) is preferably a compound represented by general formula (V-1).

[Chem. 76]

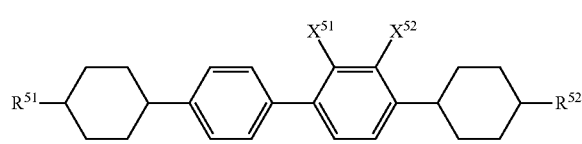

(V-1)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, and $X^{51}$ and $X^{52}$ each independently represent a fluorine atom or a hydrogen atom.)

Further, the compound represented by the general formula (V-1) is preferably a compound represented by general formula (V-1-1).

[Chem. 77]

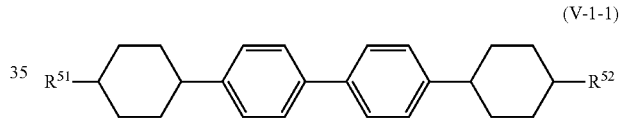

(V-1-1)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The content of the compound represented by the general formula (V-1-1) relative to the total mass of the liquid crystal composition of the present invention is preferably 1% by mass or more and 15% by mass or less, more preferably 2% by mass or more and 15% by mass or less, still more preferably 3% by mass or more and 10% by mass or less, and particularly preferably 4% by mass or more and 8% by mass or less.

Further, preferred examples of the compound represented by the general formula (V-1-1) include compounds represented by formula (20.1) to formula (20.4), and a compound represented by formula (20.2) is particularly preferred.

[Chem. 78]

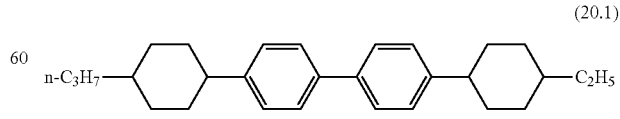

(20.1)

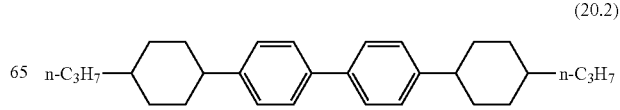

(20.2)

-continued (20.3)
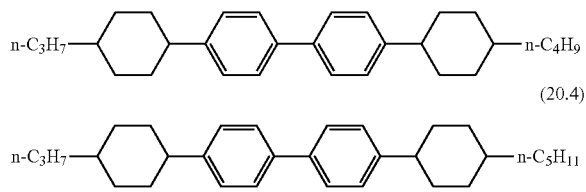

(20.4)
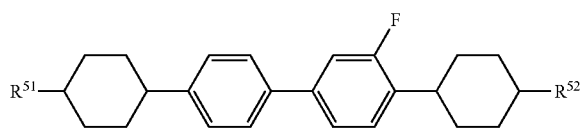

Further, the compound represented by the general formula (V-1) is preferably a compound represented by general formula (V-1-2).

[Chem. 79]

(V-1-2)
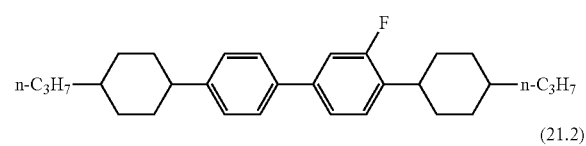

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The content of the compound represented by the general formula (V-1-2) relative to the total mass of the liquid crystal composition of the present invention is preferably 1% by mass or more and 15% by mass or less, more preferably 2% by mass or more and 15% by mass or less, still more preferably 3% by mass or more and 10% by mass or less, and particularly preferably 4% by mass or more and 8% by mass or less.

Further, preferred examples of the compound represented by the general formula (V-1-2) include compounds represented by formula (21.1) to formula (21.3), and a compound represented by formula (21.1) is particularly preferred.

[Chem. 80]

(21.1)
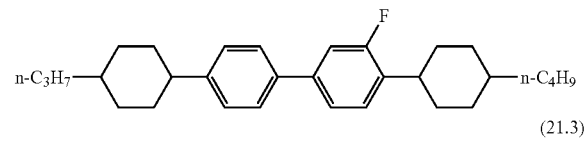

(21.2)

(21.3)
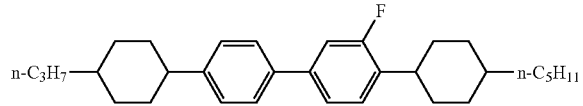

Further, the compound represented by the general formula (V-1) is preferably a compound represented by general formula (V-1-3).

[Chem. 81]

(V-1-3)
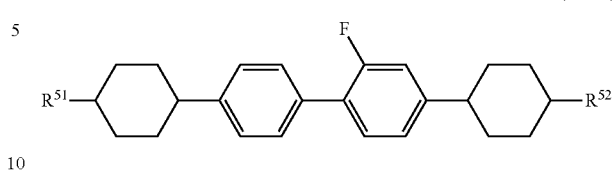

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The content of the compound represented by the general formula (V-1-3) relative to the total mass of the liquid crystal composition of the present invention is preferably 1% by mass or more and 15% by mass or less, more preferably 2% by mass or more and 15% by mass or less, still more preferably 3% by mass or more and 10% by mass or less, and particularly preferably 4% by mass or more and 8% by mass or less.

Further, examples of the compound represented by the general formula (V-1-3) include compounds represented by formula (22.1) to formula (22.3), and a compound represented by formula (22.1) is particularly preferred.

[Chem. 82]

(22.1)
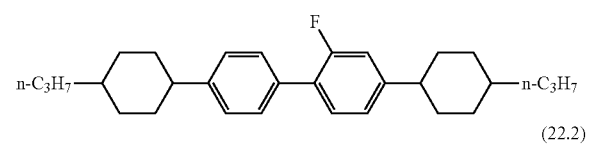

(22.2)
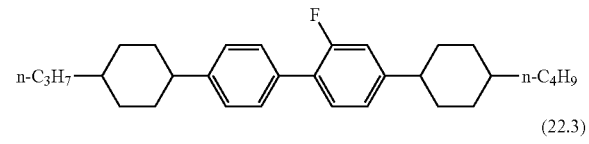

(22.3)
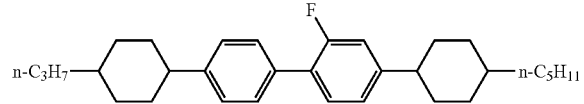

Further, the compound represented by the general formula (V) is preferably a compound represented by general formula (V-2).

[Chem. 83]

(V-2)
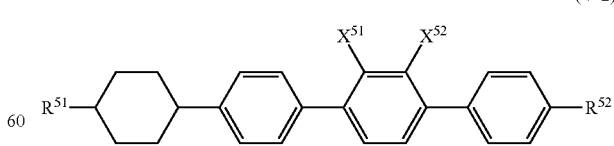

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, and $X^{51}$ and $X^{52}$ each independently represent a fluorine atom or a hydrogen atom.)

The types of compounds which can be combined are not particularly limited, but a plurality of compounds represented by the general formula (V-2) can be used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2 or more.

For example, according to an embodiment of the present invention, the content of the compound relative to the total mass of the liquid crystal composition of the present invention is 2% to 40% by mass. According to another embodiment of the present invention, the content of the compound is 4% to 40% by mass. According to still another embodiment of the present invention, the content of the compound is 7% to 40% by mass. According to a further embodiment of the present invention, the content of the compound is 10% to 40% by mass. According to a further embodiment of the present invention, the content of the compound is 12% to 40% by mass. According to a further embodiment of the present invention, the content of the compound is 15% to 40% by mass. According to a further embodiment of the present invention, the content of the compound is 17% to 40% by mass. According to a further embodiment of the present invention, the content of the compound is 18% to 40% by mass. According to a further embodiment of the present invention, the content of the compound is 20% to 40% by mass. According to a further embodiment of the present invention, the content of the compound is 22% to 40% by mass.

Also, for example, according to an embodiment of the present invention, the content of the compound relative to the total mass of the liquid crystal composition of the present invention is 2% to 40% by mass. According to another embodiment of the present invention, the content of the compound is 2% to 30% by mass. According to still another embodiment of the present invention, the content of the compound is 2% to 25% by mass. According to a further embodiment of the present invention, the content of the compound is 2% to 20% by mass. According to a further embodiment of the present invention, the content of the compound is 2% to 15% by mass. According to a further embodiment of the present invention, the content of the compound is 2% to 10% by mass. According to a further embodiment of the present invention, the content of the compound is 2% to 5% by mass. According to a further embodiment of the present invention, the content of the compound is 2% to 4% by mass.

When an embodiment in which the liquid crystal composition of the present invention has high Tni is desired, the content of the compound represented by the formula (V-2) is preferably slightly increased, while when an embodiment in which the liquid crystal composition of the present invention has low viscosity is desired, the content is preferably slightly decreased.

Further, the compound represented by the general formula (V-2) is preferably a compound represented by general formula (V-2-1).

[Chem. 84]

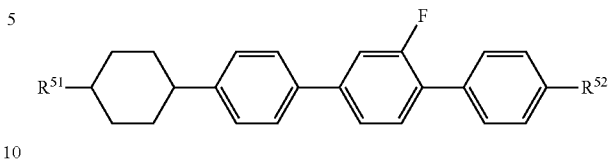

(V-2-1)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Further, preferred examples of the compound represented by the general formula (V-2-1) include compounds represented by formula (23.1) to formula (23.4), and a compound represented by formula (23.1) or formula (23.2) is particularly preferred.

[Chem. 85]

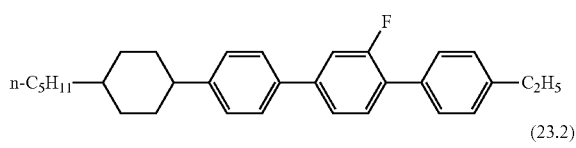

(23.1)

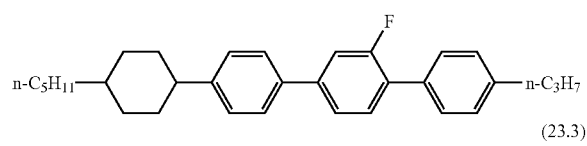

(23.2)

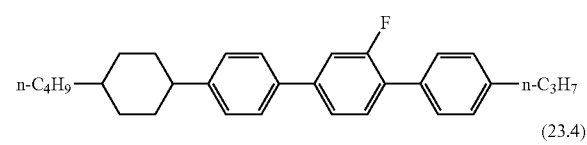

(23.3)

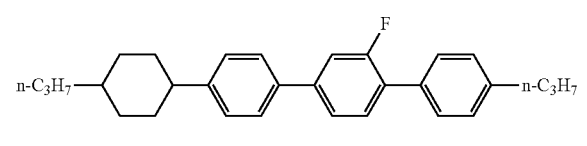

(23.4)

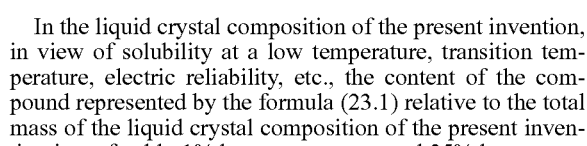

In the liquid crystal composition of the present invention, in view of solubility at a low temperature, transition temperature, electric reliability, etc., the content of the compound represented by the formula (23.1) relative to the total mass of the liquid crystal composition of the present invention is preferably 1% by mass or more and 25% by mass or less, more preferably 1% by mass or more and 15% by mass or less, still more preferably 1% by mass or more and 10% by mass or less, and particularly preferably 3% by mass or more and 8% by mass or less.

In the liquid crystal composition of the present invention, in view of solubility at a low temperature, transition temperature, electric reliability, etc., the content of the compound represented by the formula (23.2) relative to the total mass of the liquid crystal composition of the present invention is preferably 1% by mass or more and 25% by mass or less, more preferably 1% by mass or more and 15% by mass or less, still more preferably 1% by mass or more and 10% by mass or less, and particularly preferably 3% by mass or more and 8% by mass or less.

In the liquid crystal composition of the present invention, in view of solubility at a low temperature, transition temperature, electric reliability, etc., the total content of the compound represented by the formula (23.1) and the compound represented by the formula (23.2) relative to the total mass of the liquid crystal composition of the present invention is preferably 1% by mass or more and 25% by mass or less, more preferably 3% by mass or more and 20% by mass or less, still more preferably 6% by mass or more and 15% by mass or less, and particularly preferably 8% by mass or more and 12% by mass or less.

Further, the compound represented by the general formula (V-2) is preferably a compound represented by general formula (V-2-2).

[Chem. 86]

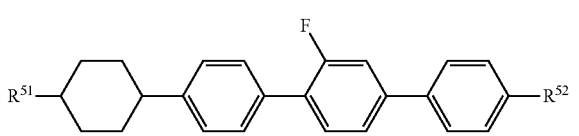
(V-2-2)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Further, preferred examples of the compound represented by the general formula (V-2-2) include compounds represented by formula (24.1) to formula (24.4), and a compound represented by formula (24.1) or formula (24.2) is particularly preferred.

[Chem. 87]

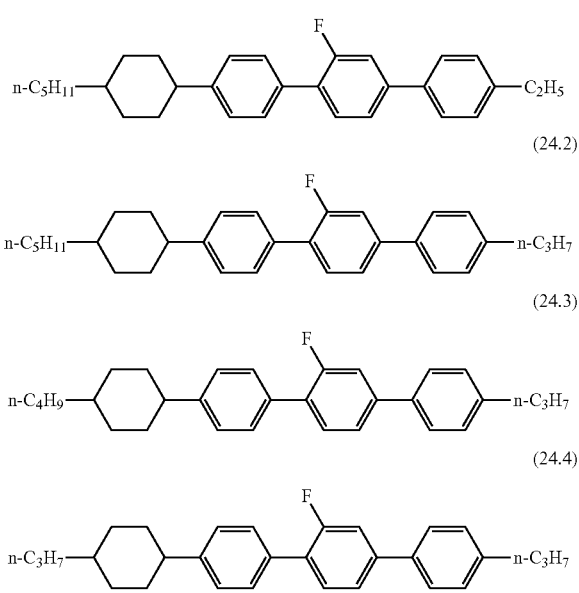

(24.1)
(24.2)
(24.3)
(24.4)

Further, the compound represented by the general formula (V) is preferably a compound represented by general formula (V-3).

[Chem. 88]

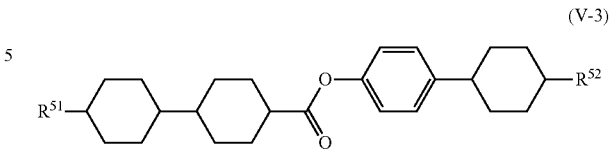
(V-3)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The types of compounds which can be combined are not particularly limited, but a plurality of compounds represented by the general formula (V-3) can be used in combination according to desired performance such as solubility at a low temperature, transition temperature, electric reliability, birefringence, etc. For example, according to an embodiment of the present invention, the number of the type of compound used is 1. According to still another embodiment of the present invention, the number of the types is 2. According to a further embodiment of the present invention, the number of the types is 3 or more.

The content of the compound represented by the general formula (V-3) relative to the total mass of the liquid crystal composition of the present invention is preferably 2% by mass or more and 16% by mass or less, more preferably 4% by mass or more and 16% by mass or less, still more preferably 7% by mass or more and 13% by mass or less, and particularly preferably 8% by mass or more and 11% by mass or less.

Further, preferred examples of the compound represented by the general formula (V-3) include compounds represented by formula (25.1) to formula (25.3).

[Chem. 89]

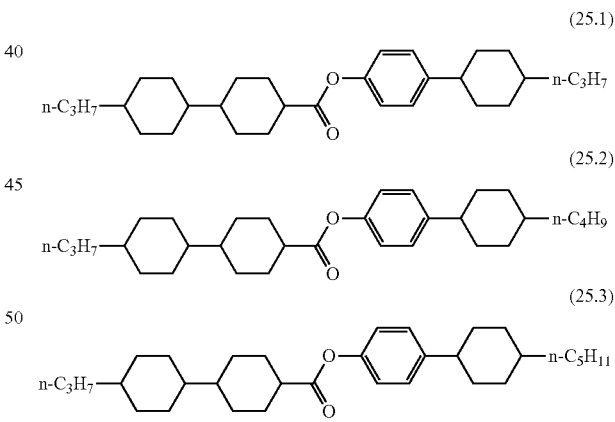

(25.1)
(25.2)
(25.3)

The liquid crystal composition of the present invention can further contain at least one compound represented by general formula (VI).

[Chem. 90]

(VI)

(In the formula, $R^{61}$ and $R^{62}$ each independently represent a linear alkyl group having 1 to 10 carbon atoms, a linear alkoxy group having 1 to 10 carbon atoms, or a linear alkenyl group having 2 to 10 carbon atoms.)

The types of compounds which can be combined are not particularly limited, but preferably one to three, more preferably one to four, and particularly preferably one to five or more, of a plurality of compounds represented by the general formula (VI) are contained according to desired performance such as solubility at a low temperature, transition temperature, electric reliability, birefringence, etc. In addition, the allowable maximum content is preferably 35% by mass or less, more preferably 25% by mass or less, and still more preferably 15% by mass or less.

Examples of a compound which can be preferably used as the compound represented by the general formula (VI) are given below.

[Chem. 91]

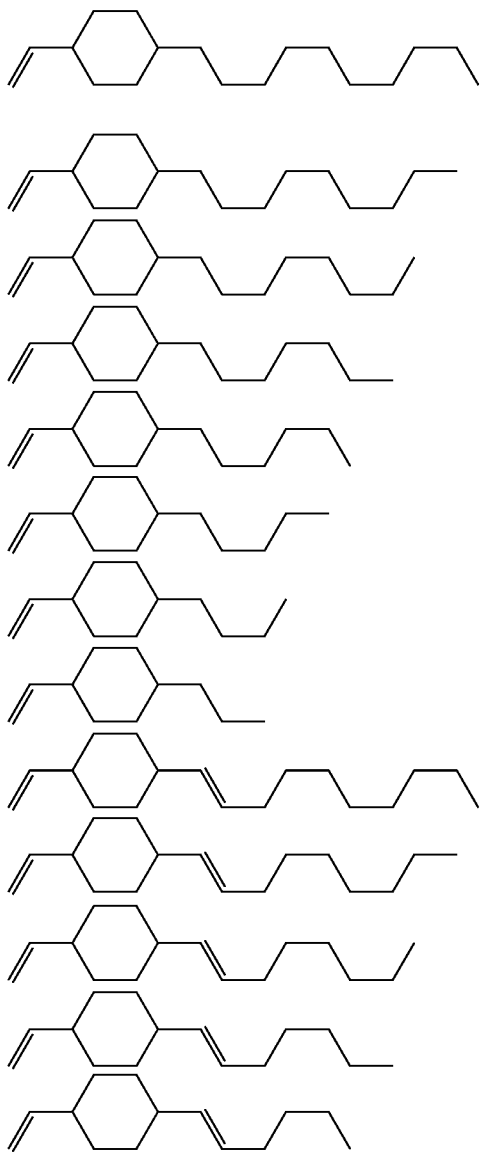

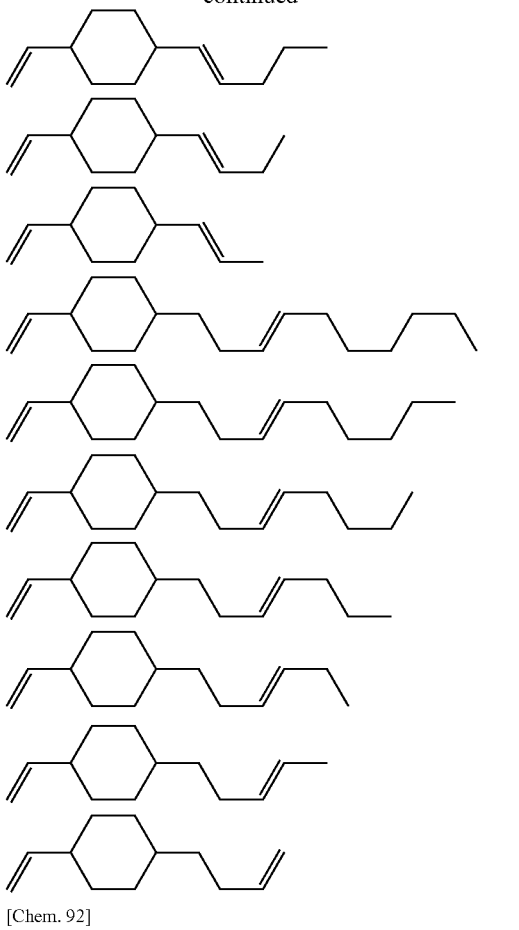

-continued

[Chem. 92]

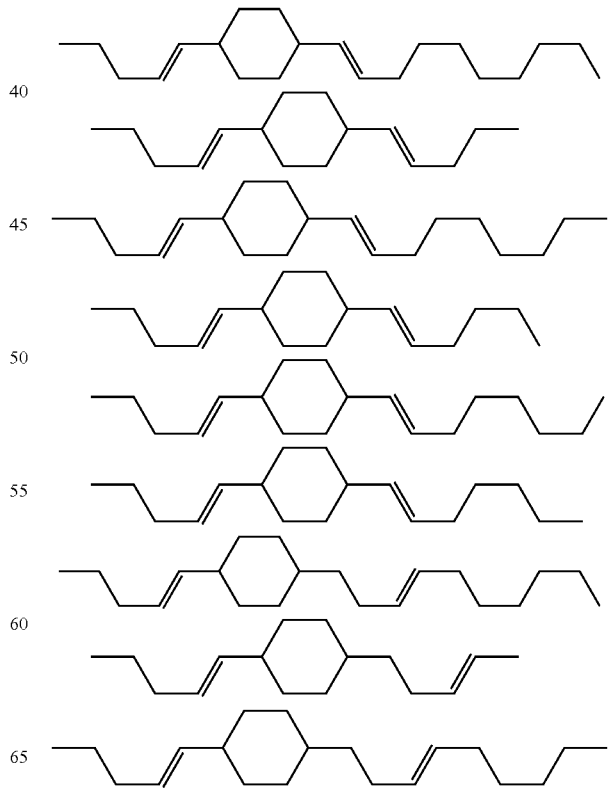

71
-continued
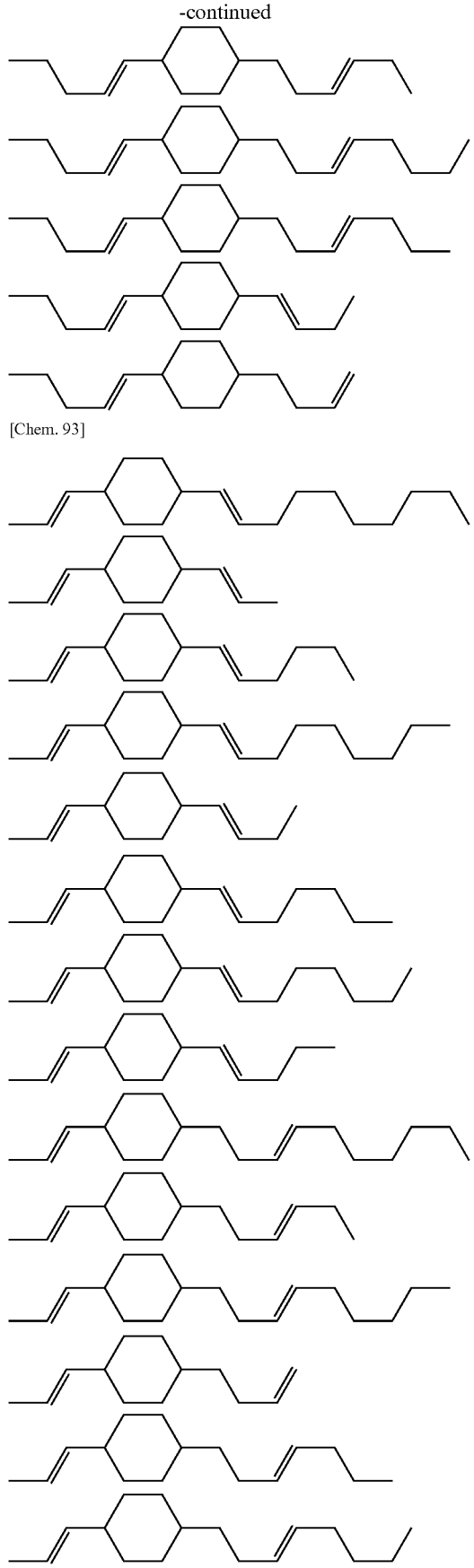
[Chem. 93]
72
-continued
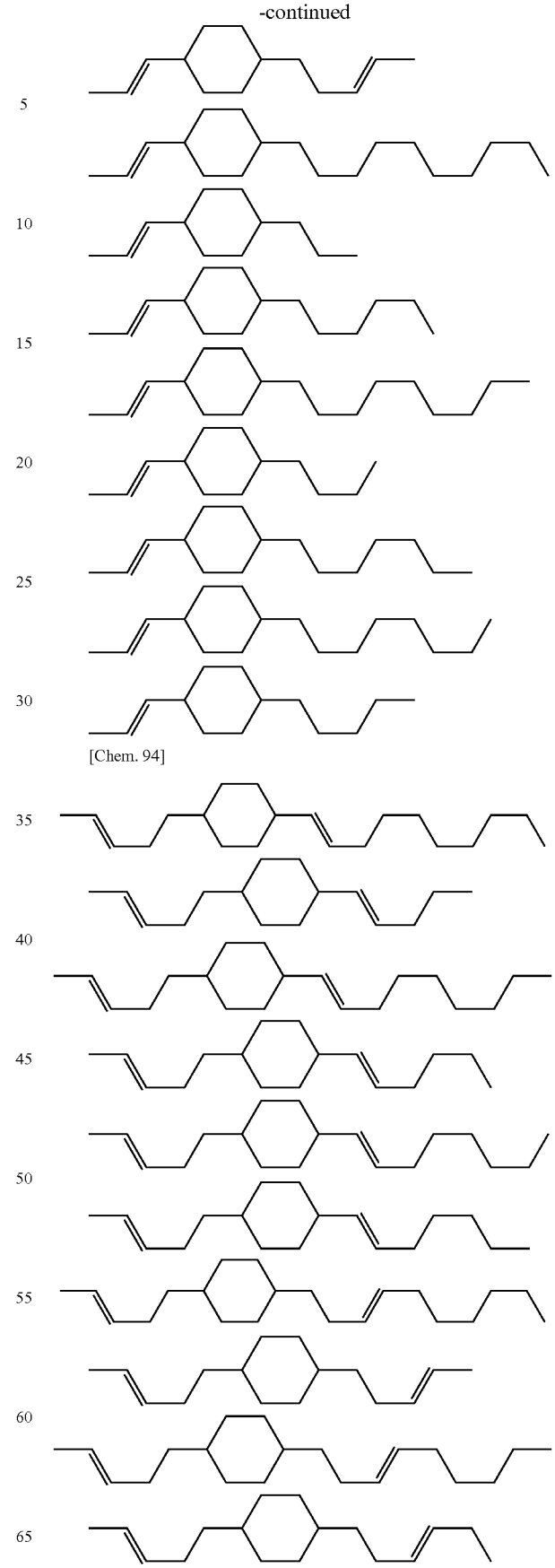
[Chem. 94]

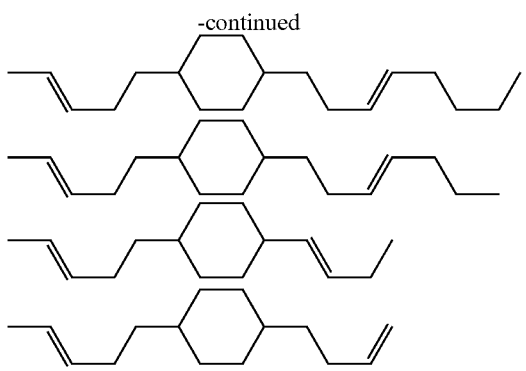

The liquid crystal composition of the present invention can further contain at least one compound represented by general formula (VII).

[Chem. 95]

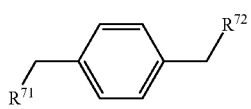

(VII)

(In the formula, $R^{71}$ and $R^{72}$ each independently represent a linear alkyl group having 1 to 10 carbon atoms, a linear alkoxy group having 1 to 10 carbon atoms, or a linear alkenyl group having 4 to 10 carbon atoms.)

The types of compounds which can be combined are not particularly limited, but preferably one to three, more preferably one to four, and particularly preferably one to five or more, of a plurality of compounds represented by the general formula (VII) are contained according to desired performance such as solubility at a low temperature, transition temperature, electric reliability, birefringence, etc. In addition, the allowable maximum content is preferably 35% by mass or less, more preferably 25% by mass or less, and still more preferably 15% by mass or less.

Examples of a compound which can be preferably used as the compound represented by the general formula (VII) are given below.

[Chem. 96]

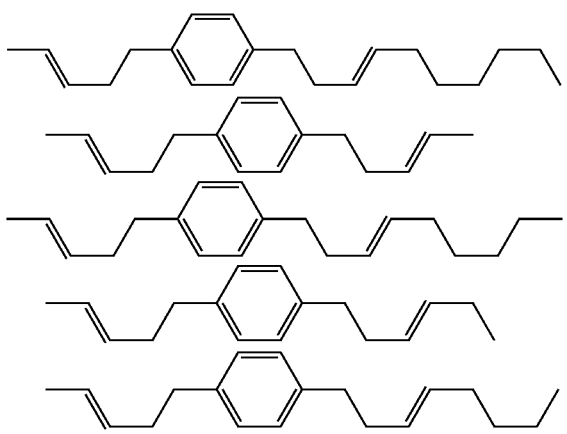

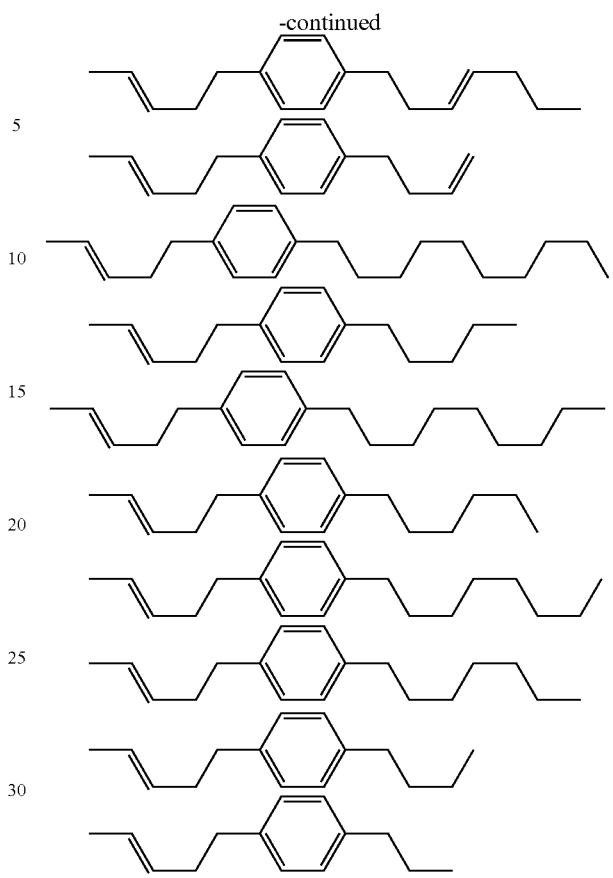

The liquid crystal composition of the present invention preferably further contains any one or more of compounds represented by general formula (M) below.

[Chem. 97]

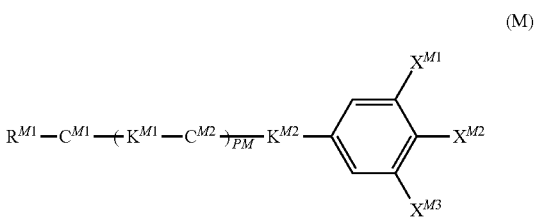

(M)

(In the formula, $R^{M1}$ an alkyl group having 1 to 8 carbon atoms; one or nonadjacent two or more —$CH_2$— in the alkyl group may be each independently substituted by —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of:

(d) a 1,4-cyclohexylene group (one —$CH_2$— or nonadjacent two or more —$CH_2$— present in the group may be substituted by —O— or —S—); and (e) a 1,4-phenylene group (one —CH= or nonadjacent two or more —CH= present in the group may be substituted by —N=), and the group (d) and the group (e) may be each independently substituted by a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

when PM is 2, 3, or 4, and a plurality of $K^{M1}$ are present, $K^{M1}$ may be the same or different, and when PM is 2, 3, or 4, and a plurality of $C^{M2}$ are present, $C^{M2}$ may be the same or different;

$X^{M1}$ and $X^{M3}$ each independently represent a hydrogen atom, a chlorine atom, or a fluorine atom; and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. However, compounds represented by the general formula (i) and general formula (ii) are excluded.)

The types of compounds which can be combined are not particularly limited, but a plurality of compounds represented by the general formula (M) can be used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6. According to a further embodiment of the present invention, the number of the types is 7 or more.

In the liquid crystal composition of the present invention, it is necessary to properly adjust the content of the compound represented by the general formula (M) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 1% to 95% by mass. For example, according to another embodiment of the present invention, the content of the compound is 10% to 95% by mass. For example, according to still another embodiment of the present invention, the content of the compound is 20% to 95% by mass. For example, according to a further embodiment of the present invention, the content of the compound is 30% to 95% by mass. For example, according to a further embodiment of the present invention, the content of the compound is 40% to 95% by mass. For example, according to a further embodiment of the present invention, the content of the compound is 45% to 95% by mass. For example, according to a further embodiment of the present invention, the content of the compound is 50% to 95% by mass. For example, according to a further embodiment of the present invention, the content of the compound is 55% to 95% by mass. For example, according to a further embodiment of the present invention, the content of the compound is 60% to 95% by mass. For example, according to a further embodiment of the present invention, the content of the compound is 65% to 95% by mass. For example, according to a further embodiment of the present invention, the content of the compound is 70% to 95% by mass. For example, according to a further embodiment of the present invention, the content of the compound is 75% to 95% by mass. For example, according to a further embodiment of the present invention, the content of the compound is 80% to 95% by mass.

Also, for example, according to an embodiment of the present invention, the content of the compound relative to the total mass of the liquid crystal composition of the present invention is 1% to 95% by mass. According to another embodiment of the present invention, the content of the compound is 1% to 85% by mass. According to still another embodiment of the present invention, the content of the compound is 1% to 75% by mass. According to a further embodiment of the present invention, the content of the compound is 1% to 65% by mass. According to a further embodiment of the present invention, the content of the compound is 1% to 55% by mass. According to a further embodiment of the present invention, the content of the compound is 1% to 45% by mass. According to a further embodiment of the present invention, the content of the compound is 1% to 35% by mass. According to a further embodiment of the present invention, the content of the compound is 1% to 25% by mass.

When the viscosity of the liquid crystal composition of the present invention is kept low, and the liquid crystal composition having fast response is required, both the lower limit value and the upper limit value are preferably slightly low. Further, when Tni of the liquid crystal composition of the present invention is kept high, and the liquid crystal composition having good temperature stability is required, both the lower limit value and the upper limit value are preferably slightly low. In addition, when it is desired to increase dielectric anisotropy for keeping the drive voltage low, both the lower limit value and the upper limit value are preferably slightly high.

When a ring structure to which $R^{M1}$ is bonded is a phenyl group (aromatic), $R^{M1}$ is preferably a linear alkyl group having 1 to 5 carbon atoms, a linear alkoxy group having 1 to 4 carbon atoms, or an alkenyl group having 4 to 5 carbon atoms, while when a ring structure to which $R^{M1}$ is bonded is a saturated ring structure, such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

When the liquid crystal composition is required to have chemical stability, a compound represented by the general formula (M) preferably does not contain a chlorine atom in its molecule. Further, the liquid crystal composition preferably contains 5% or less, preferably 3% or less, preferably 1% or less, preferably 0.5% or less, of a compound having a chlorine atom and preferably substantially does not contain the compound. The expression "substantially does not contain" represents that the liquid crystal composition is contaminated with only an unintentional compound having a chlorine atom such as a compound produced as impurities during production of the compound.

The compound represented by the general formula (M) is preferably, for example, a compound selected from a compound group represented by general formula (VIII).

[Chem. 98]

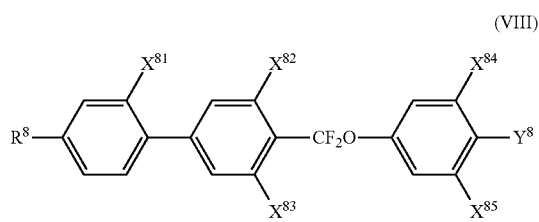

(VIII)

(In the formula, $R^8$ represents an alkyl group having 1 to 5 carbon atoms, an alkenyl group having 2 to 5 carbon atoms, or an alkoxy group having 1 to 4 carbon atoms, $X^{81}$ to $X^{85}$ each independently represent a hydrogen atom or a fluorine atom, and $Y^8$ represents a fluorine atom or —$OCF_3$.)

The types of compounds which can be combined are not particularly limited, but a plurality of compounds represented by the general formula (VIII) can be used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to a further embodiment of the present invention, the number of the types is 3 or more.

In the liquid crystal composition of the present invention, it is necessary to properly adjust the content of the compound represented by the general formula (VIII) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 2% to 40% by mass. For example, according to another embodiment of the present invention, the content of the compound is 4% to 40% by mass. For example, according to still another embodiment of the present invention, the content of the compound is 5% to 40% by mass. For example, according to a further embodiment of the present invention, the content of the compound is 6% to 40% by mass. For example, according to a further embodiment of the present invention, the content of the compound is 7% to 40% by mass. For example, according to a further embodiment of the present invention, the content of the compound is 8% to 40% by mass. For example, according to a further embodiment of the present invention, the content of the compound is 9% to 40% by mass. For example, according to a further embodiment of the present invention, the content of the compound is 10% to 40% by mass. For example, according to a further embodiment of the present invention, the content of the compound is 11% to 40% by mass. For example, according to a further embodiment of the present invention, the content of the compound is 12% to 40% by mass. For example, according to a further embodiment of the present invention, the content of the compound is 14% to 40% by mass. For example, according to a further embodiment of the present invention, the content of the compound is 15% to 40% by mass. For example, according to a further embodiment of the present invention, the content of the compound is 21% to 40% by mass. For example, according to a further embodiment of the present invention, the content of the compound is 23% to 40% by mass.

Also, for example, according to an embodiment of the present invention, the content of the compound relative to the total mass of the liquid crystal composition of the present invention is 2% to 40% by mass. According to another embodiment of the present invention, the content of the compound is 2% to 30% by mass. According to still another embodiment of the present invention, the content of the compound is 2% to 25% by mass. According to a further embodiment of the present invention, the content of the compound is 2% to 21% by mass. According to a further embodiment of the present invention, the content of the compound is 2% to 16% by mass. According to a further embodiment of the present invention, the content of the compound is 2% to 12% by mass. According to a further embodiment of the present invention, the content of the compound is 2% to 8% by mass. According to a further embodiment of the present invention, the content of the compound is 2% to 5% by mass.

When the viscosity of the liquid crystal composition of the present invention is kept low, and the liquid crystal composition having fast response is required, both the lower limit value and the upper limit value are preferably slightly low. Further, when Tni of the liquid crystal composition of the present invention is kept high, and the liquid crystal composition having good temperature stability is required, both the lower limit value and the upper limit value are preferably slightly low. In addition, when it is desired to increase dielectric anisotropy for keeping the drive voltage low, both the lower limit value and the upper limit value are preferably slightly high.

The compound represented by the general formula (VIII) is preferably a compound represented by general formula (VIII-1).

[Chem. 99]

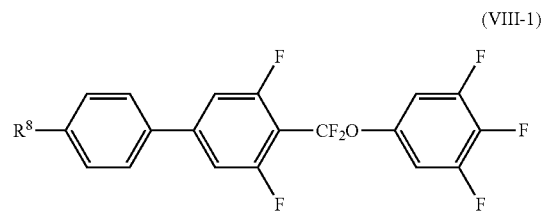

(VIII-1)

(In the formula, $R^8$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but a plurality of compounds represented by the general formula (VIII-1) can be used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2 or more.

Further, preferred examples of the compound represented by the general formula (VIII-1) include compounds represented by formula (26.1) to formula (26.4), a compound represented by formula (26.1) or formula (26.2) is preferred, and a compound represented by formula (26.2) is more preferred.

[Chem. 100]

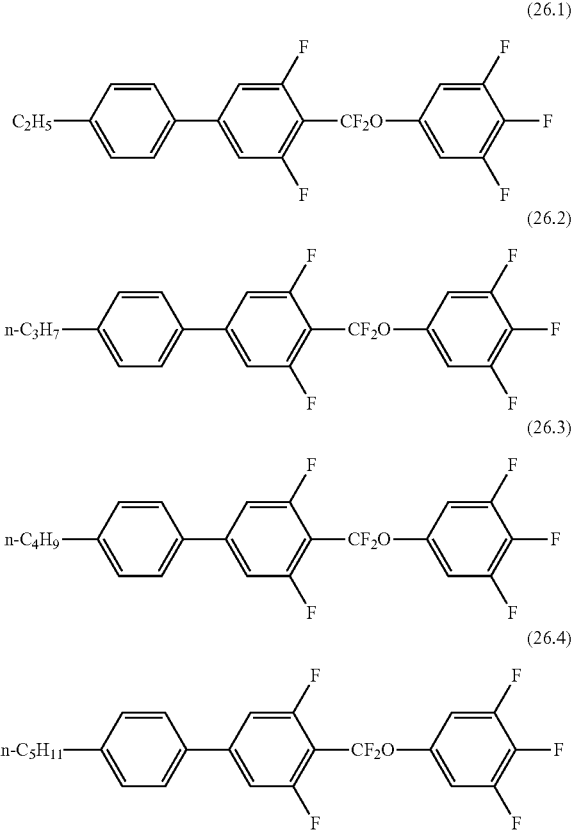

In view of solubility at a low temperature, transition temperature, electric reliability, birefringence, etc., the content of the compound represented by the formula (26.1) relative to the total mass of the liquid crystal composition of the present invention is preferably 1% by mass or more and 40% by mass or less, more preferably 1% by mass or more and 30% by mass or less, even more preferably 1% by mass or more and 20% by mass or less, even more preferably 2% by mass or more and 15% by mass or less, still more preferably 2% by mass or more and 10% by mass or less, and particularly preferably 2% by mass or more and 9% by mass or less. Examples of the content within the particularly preferred range include 2% by mass or more and 7% by mass or less, 2% by mass or more and 6% by mass or less, 2% by mass or more and 5% by mass or less, 2% by mass or more and 4% by mass or less, 2% by mass or more and 3% by mass or less, 3% by mass or more and 9% by mass or less, 4% by mass or more and 9% by mass or less, 5% by mass or more and 9% by mass or less, and 6% by mass or more and 9% by mass or less.

In view of solubility at a low temperature, transition temperature, electric reliability, birefringence, etc., the content of the compound represented by the formula (26.2) relative to the total mass of the liquid crystal composition of the present invention is preferably 2% by mass or more and 40% by mass or less, more preferably 4% by mass or more and 30% by mass or less, still more preferably 7% by mass or more and 20% by mass or less, and particularly preferably 7% by mass or more and 15% by mass or less.

Examples of the content within the particularly preferred range include 7% by mass or more and 12% by mass or less, 7% by mass or more and 10% by mass or less, 7% by mass or more and 8% by mass or less, 8% by mass or more and 15% by mass or less, 10% by mass or more and 15% by mass or less, and 12% by mass or more and 15% by mass or less.

The total content of the compound represented by the formula (26.1) and the compound represented by the formula (26.2) relative to the total mass of the liquid crystal composition of the present invention is preferably 5% to 40% by mass, more preferably 10% to 30% by mass, still more preferably 10% to 25% by mass, and particularly preferably 10% to 20% by mass.

Further, the compound represented by the general formula (VIII) is preferably a compound represented by general formula (VIII-2).

[Chem. 101]

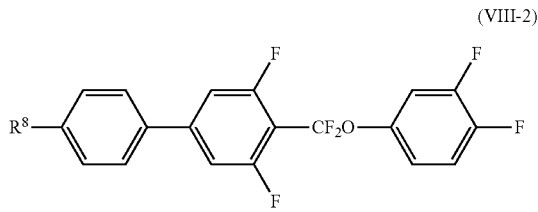

(In the formula, $R^8$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but a plurality of compounds represented by the general formula (VIII-2) can be used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to a further embodiment of the present invention, the number of the types is 3 or more.

In view of solubility at a low temperature, transition temperature, electric reliability, birefringence, etc., the content of the compound represented by the general formula (VIII-2) is preferably 2.5% by mass or more and 25% by mass or less, preferably 8% by mass or more and 25% by mass or less, more preferably 10% by mass or more and 20% by mass or less, and still more preferably 12% by mass or more and 15% by mass or less.

Further, preferred examples of the compound represented by the general formula (VIII-2) include compounds represented by formula (27.1) to formula (27.4), and a compound represented by formula (27.2) is more preferred.

[Chem. 102]

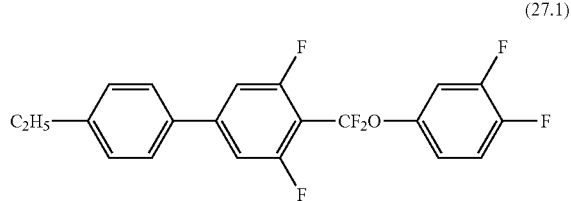
(27.1)

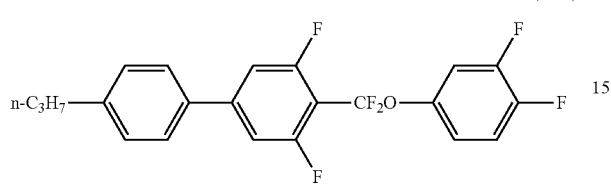
(27.2)

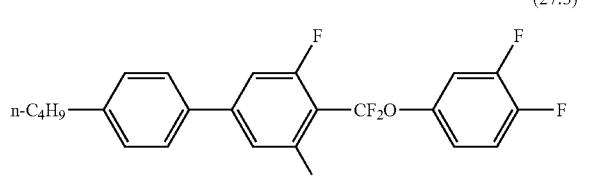
(27.3)

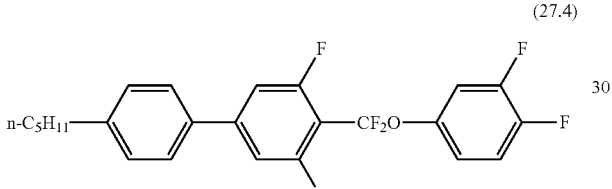
(27.4)

Further, the compound represented by the general formula (VIII) is preferably a compound represented by general formula (VIII-3).

[Chem. 103]

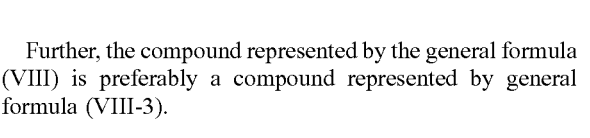
(VIII-3)

(In the formula, $R^8$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but a plurality of compounds represented by the general formula (VIII-3) can be used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2 or more.

Further, preferred examples of the compound represented by the general formula (VIII-3) include compounds represented by formula (26.11) to formula (26.14), a compound represented by formula (26.11) or formula (26.12) is preferred, and a compound represented by formula (26.12) is more preferred.

[Chem. 104]

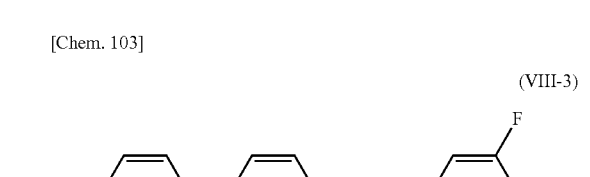
(26.11)

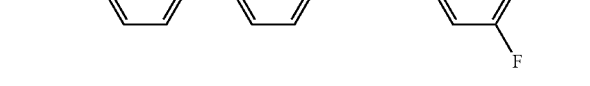
(26.12)

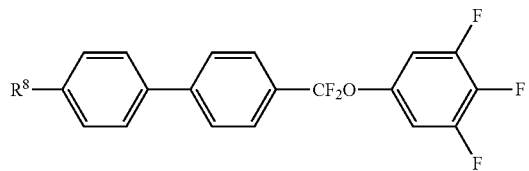
(26.13)

(26.14)

The compound represented by the general formula (M) is preferably, for example, a compound selected from a compound group represented by general formula (IX). However, compounds represented by the general formula (i) described above are excluded.

[Chem. 105]

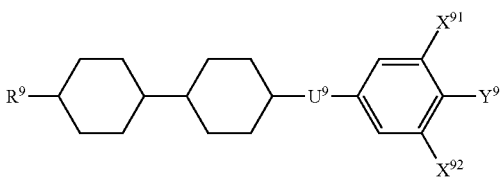
(IX)

(In the formula, $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, $Y^9$ represents a fluorine atom, a chlorine atom, or —$OCF_3$, and $U^9$ represents a single bond, —COO—, or —$CF_2O$—.)

The types of compounds which can be combined are not particularly limited, but a plurality of compounds represented by the general formula (IX) can be used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6 or more.

In the liquid crystal composition of the present invention, it is necessary to properly adjust the content of the compound represented by the general formula (Ix) according to desired performance such as solubility at a low temperature, transition temperature, electric reliability, birefringence, process adaptability, dropping marks, image sticking, dielectric anisotropy, etc.

For example, according to an embodiment of the present invention, the content of the compound relative to the total mass of the liquid crystal composition of the present invention is 3% to 70% by mass. For example, according to another embodiment of the present invention, the content of the compound is 5% to 70% by mass. For example, according to still another embodiment of the present invention, the content of the compound is 8% to 70% by mass. For example, according to a further embodiment of the present invention, the content of the compound is 10% to 70% by mass. For example, according to a further embodiment of the present invention, the content of the compound is 12% to 70% by mass. For example, according to a further embodiment of the present invention, the content of the compound is 15% to 70% by mass. For example, according to a further embodiment of the present invention, the content of the compound is 17% to 70% by mass. For example, according to a further embodiment of the present invention, the content of the compound is 20% to 70% by mass. For example, according to a further embodiment of the present invention, the content of the compound is 24% to 70% by mass. For example, according to a further embodiment of the present invention, the content of the compound is 28% to 70% by mass. For example, according to a further embodiment of the present invention, the content of the compound is 30% to 70% by mass. For example, according to a further embodiment of the present invention, the content of the compound is 34% to 70% by mass. For example, according to a further embodiment of the present invention, the content of the compound is 39% to 70% by mass. For example, according to a further embodiment of the present invention, the content of the compound is 40% to 70% by mass. For example, according to a further embodiment of the present invention, the content of the compound is 42% to 70% by mass. For example, according to a further embodiment of the present invention, the content of the compound is 45% to 70% by mass.

Also, for example, according to an embodiment of the present invention, the content of the compound relative to the total mass of the liquid crystal composition of the present invention is 3% to 70% by mass. According to another embodiment of the present invention, the content of the compound is 3% to 60% by mass. According to still another embodiment of the present invention, the content of the compound is 3% to 55% by mass. According to a further embodiment of the present invention, the content of the compound is 3% to 50% by mass. According to a further embodiment of the present invention, the content of the compound is 3% to 45% by mass. According to a further embodiment of the present invention, the content of the compound is 3% to 40% by mass. According to a further embodiment of the present invention, the content of the compound is 3% to 35% by mass. According to a further embodiment of the present invention, the content of the compound is 3% to 30% by mass. According to a further embodiment of the present invention, the content of the compound is 25% by mass. According to a further embodiment of the present invention, the content of the compound is 3% to 20% by mass. According to a further embodiment of the present invention, the content of the compound is 3% to 15% by mass. According to a further embodiment of the present invention, the content of the compound is 3% to 10% by mass.

When the viscosity of the liquid crystal composition of the present invention is kept low, and the liquid crystal composition having fast response is required, both the lower limit value and the upper limit value are preferably slightly low. Further, when Tni of the liquid crystal composition of the present invention is kept high, and the liquid crystal composition causing little image sticking is required, both the lower limit value and the upper limit value are preferably slightly low. In addition, when it is desired to increase dielectric anisotropy for keeping the drive voltage low, both the lower limit value and the upper limit value are preferably slightly high.

The compound represented by the general formula (IX) is preferably a compound represented by general formula (IX-1).

[Chem. 106]

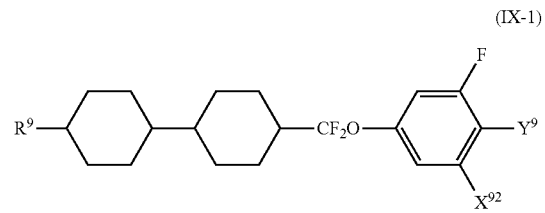

(IX-1)

(In the formula, $R^9$ represents an alkyl group having 1 to 5 carbon atoms, an alkenyl group having 2 to 5 carbon atoms, or an alkoxy group having 1 to 4 carbon atoms, $X^{92}$ represents a hydrogen atom or a fluorine atom, and $Y^9$ represents a fluorine atom or —$OCF_3$.)

The types of compounds which can be combined are not particularly limited, but a plurality of compounds represented by the general formula (IX-1) can be used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4 or more.

Further, the compound represented by the general formula (IX-1) is preferably a compound represented by general formula (IX-1-1).

[Chem. 107]

(IX-1-1)

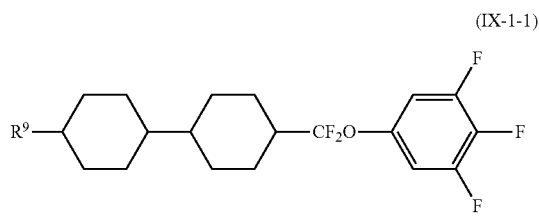

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but a plurality of compounds represented by the general formula (IX-1-1) can be used in combination according to desired performance such as solubility at a low temperature, transition temperature, electric reliability, birefringence, etc. For example, according to an embodiment of the present invention, the number of the type of compound used is 1. According to another embodiment of the present invention, the number of the types is 2.

In view of solubility at a low temperature, transition temperature, electric reliability, birefringence, etc., the content of the compound represented by the general formula (IX-1-1) relative to the total mass of the liquid crystal composition of the present invention has preferred upper limit and lower limit values according to an embodiment.

According to an embodiment, the content of the compound relative to the total mass is 1% to 40% by mass. According to another embodiment, the content of the compound is 1% to 35% by mass. According to still another embodiment, the content of the compound is 1% to 30% by mass. According to a further embodiment, the content of the compound is 1% to 25% by mass. According to a further embodiment, the content of the compound is 1% to 10% by mass. According to a further embodiment, the content of the compound is 1% to 7% by mass. According to a further embodiment, the content of the compound is 1% to 5% by mass.

Further, preferred examples of the compound represented by the general formula (IX-1-1) include compounds represented by formula (28.1) to formula (28.5). The liquid crystal composition preferably contains any one or two of the compounds represented by formula (28.3) and formula (28.5).

[Chem. 108]

(28.1)

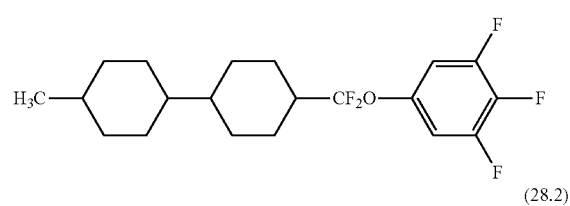

(28.2)

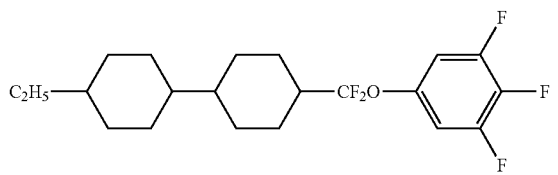

-continued (28.3)

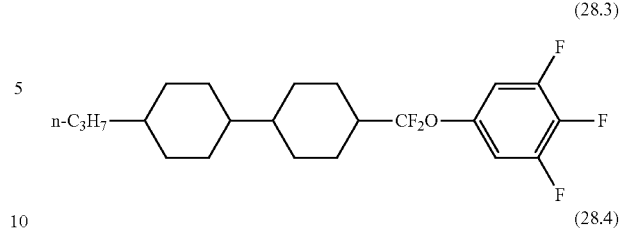

(28.4)

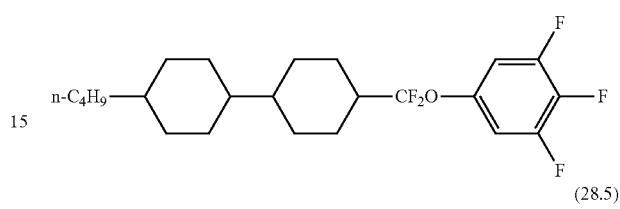

(28.5)

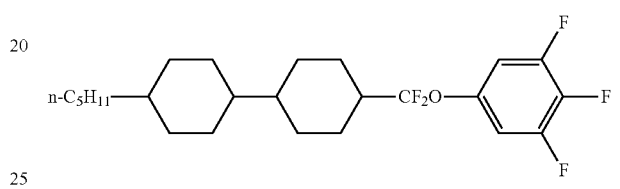

In the liquid crystal composition of the present invention, in view of solubility at a low temperature, transition temperature, electric reliability, etc., the content of the compound represented by the formula (28.3) relative to the total mass of the liquid crystal composition is preferably 1% by mass or more and 30% by mass or less, more preferably 2% by mass or more and 20% by mass or less, still more preferably 2% by mass or more and 15% by mass or less, particularly preferably 2% by mass or more and 12% by mass or less, and most preferably 2% by mass or more and 10% by mass or less.

Examples of the content within the most preferred range include 2% by mass or more and 8% by mass or less, 2% by mass or more and 6% by mass or less, 2% by mass or more and 4% by mass or less, 4% by mass or more and 10% by mass or less, 6% by mass or more and 10% by mass or less, and 8% by mass or more and 10% by mass or less.

In the liquid crystal composition of the present invention, in view of solubility at a low temperature, transition temperature, electric reliability, etc., the content of the compound represented by the formula (28.5) relative to the total mass of the liquid crystal composition is preferably 3% by mass or more and 25% by mass or less, more preferably 5% by mass or more and 20% by mass or less, still more preferably 5% by mass or more and 15% by mass or less, and particularly preferably 5% by mass or more and 12% by mass or less.

Examples of the content within the particularly preferred range include 5% by mass or more and 10% by mass or less, 5% by mass or more and 8% by mass or less, 5% by mass or more and 7% by mass or less, 7% by mass or more and 12% by mass or less, 8% by mass or more and 12% by mass or less, and 10% by mass or more and 12% by mass or less.

In the liquid crystal composition of the present invention, the total content of the compound represented by the formula (28.3) and the compound represented by the formula (28.5) relative to the total mass of the liquid crystal composition is preferably 5% by mass or more and 30% by mass or less, more preferably 7% by mass or more and 28% by mass or less, still more preferably 9% by mass or more and 26% by mass or less, particularly preferably 11% by mass or more and 24% by mass or less, and most preferably 13% by mass or more and 22% by mass or less.

Examples of the content within the most preferred range include 13% by mass or more and 20% by mass or less, 13% by mass or more and 18% by mass or less, 13% by mass or more and 16% by mass or less, 13% by mass or more and 14% by mass or less, 14% by mass or more and 22% by mass or less, 16% by mass or more and 22% by mass or less, 18% by mass or more and 22% by mass or less, 20% by mass or more and 22% by mass or less, and 21% by mass or more and 22% by mass or less.

When the liquid crystal composition contains the compound represented by the formula (28.3) and the compound represented by the formula (28.5), either the compound represented by the formula (28.3) or the compound represented by the formula (28.5) may have a higher relative content. However, from the viewpoint of increasing Tni of the liquid crystal composition, the compound represented by the formula (28.5) preferably has a higher content.

Further, the compound represented by the general formula (IX-1) is preferably a compound represented by general formula (IX-1-2).

[Chem. 109]

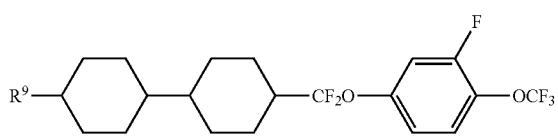

(IX-1-2)

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but a plurality of compounds represented by the general formula (IX-1-2) are preferably used alone or in combination of two or three, more two to four, in view of solubility at a low temperature, transition temperature, electric reliability, birefringence, etc.

In view of solubility at a low temperature, transition temperature, electric reliability, etc., the content of the compound represented by the general formula (IX-1-2) relative to the total mass of the liquid crystal composition of the present invention is preferably 1% by mass or more and 30% by mass or less, more preferably 5% by mass or more and 30% by mass or less, even more preferably 8% by mass or more and 30% by mass or less, still more preferably 10% by mass or more and 25% by mass or less, still more preferably 14% by mass or more and 22% by mass or less, and particularly preferably 16% by mass or more and 20% by mass or less.

Further, preferred examples of the compound represented by the general formula (IX-1-2) include compounds represented by formula (29.1) to formula (29.4), and a compound represented by formula (29.2) or formula (29.4) is preferred.

[Chem. 110]

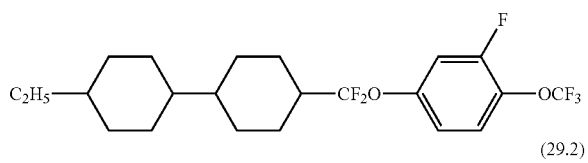

(29.1)

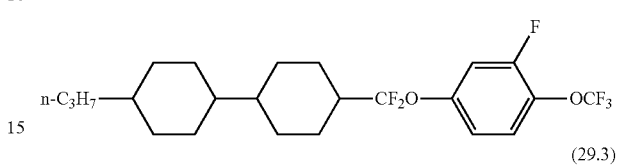

(29.2)

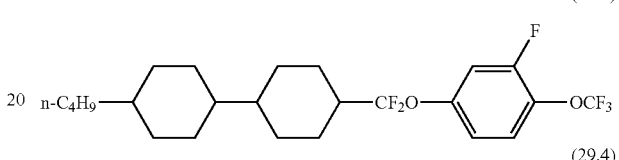

(29.3)

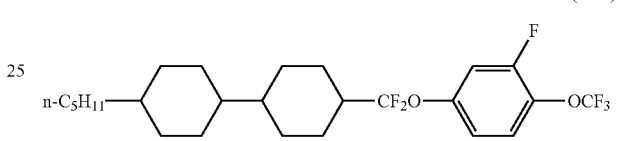

(29.4)

The compound represented by the general formula (IX) is preferably a compound represented by general formula (IX-2). However, compounds represented by the general formula (i) are excluded.

[Chem. 111]

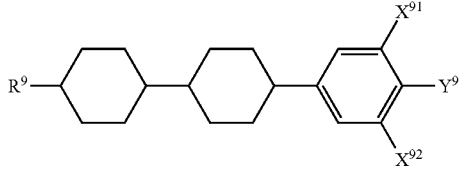

(IX-2)

(In the formula, $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, and $Y^9$ represents a fluorine atom, a chlorine atom, or —$OCF_3$.)

The types of compounds which can be combined are not particularly limited, but a plurality of compounds represented by the general formula (IX-2) can be used in combination according to each embodiment in view of solubility at a low temperature, transition temperature, electric reliability, birefringence, etc. For example, according to an embodiment of the present invention, the number of the type of compound used is 1; according to another embodiment, the number of the types combined is 2; according to still another embodiment, the number of the types combined is 3; according to a further embodiment, the number of the types combined is 4; according to a further embodiment, the number of the types combined is 5; and according to a further embodiment, the number of the types combined is 6 or more.

Further, the compound represented by the general formula (IX-2) is preferably a compound represented by general formula (IX-2-1).

[Chem. 112]

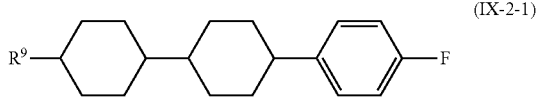
(IX-2-1)

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but a plurality of compounds represented by the general formula (IX-2-1) are preferably used alone or in combination of two or three in view of solubility at a low temperature, transition temperature, electric reliability, birefringence, etc.

In view of characteristics such as solubility at a low temperature, transition temperature, electric reliability, birefringence, etc., the content of the compound represented by the general formula (IX-2-1) has preferred upper limit and lower limit values according to each embodiment.

For example, according to an embodiment of the present invention, the content of the compound relative to the total mass of the liquid crystal composition of the present invention is 1% to 40% by mass. According to another embodiment, the content of the compound is 2% to 40% by mass. According to still another embodiment, the content of the compound is 4% to 40% by mass. According to a further embodiment, the content of the compound is 10% to 40% by mass. According to a further embodiment, the content of the compound is 14% to 40% by mass. According to a further embodiment, the content of the compound is 16% to 40% by mass. According to a further embodiment, the content of the compound is 21% to 40% by mass.

Also, for example, according to an embodiment of the present invention, the content of the compound relative to the total mass is 1% to 40% by mass; according to another embodiment, the content of the compound is 1% to 35% by mass; according to still another embodiment, the content of the compound is 1% to 30% by mass; according to a further embodiment, the content of the compound is 1% to 25% by mass; according to a further embodiment, the content of the compound is 1% to 22% by mass; according to a further embodiment, the content of the compound is 1% to 20% by mass; according to a further embodiment, the content of the compound is 1% to 10% by mass; according to a further embodiment, the content of the compound is 1% to 7% by mass; and according to a further embodiment, the content of the compound is 1% to 5% by mass.

Further, preferred examples of the compound represented by the general formula (IX-2-1) include compounds represented by formula (30.1) to formula (30.4), and compounds represented by formula (30.1) and formula (30.2) are preferred.

[Chem. 113]

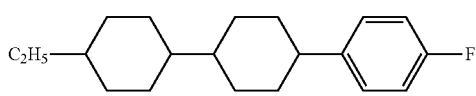
(30.1)

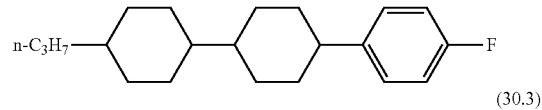
(30.2)

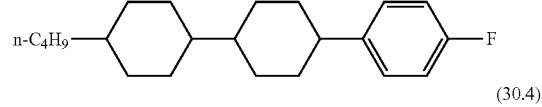
(30.3)

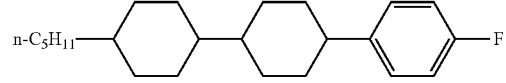
(30.4)

Further, the compound represented by the general formula (IX-2) is preferably a compound represented by general formula (IX-2-2).

[Chem. 114]

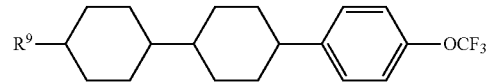
(IX-2-2)

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not limited, but a plurality of compounds represented by the general formula (IX-2-2) are preferably alone or in combination of two or three, more preferably two to four, in view of solubility at a low temperature, transition temperature, electric reliability, birefringence, etc.

In view of characteristics such as solubility at a low temperature, transition temperature, electric reliability, birefringence, etc., the content of the compound represented by the general formula (IX-2-2) has preferred upper limit and lower limit values according to each embodiment. For example, according to an embodiment of the present invention, the content of the compound relative to the total mass of the liquid crystal composition of the present invention is 1% to 40% by mass; according to another embodiment, the content of the compound is 2% to 40% by mass; according to still another embodiment, the content of the compound is 4% to 40% by mass; according to a further embodiment, the content of the compound is 10% to 40% by mass; according to a further embodiment, the content of the compound is 14% to 40% by mass; according to a further embodiment, the content of the compound is 16% to 40% by mass; and according to a further embodiment, the content of the compound is 21% to 40% by mass.

Also, for example, according to an embodiment of the present invention, the content of the compound relative to the total mass is 1% to 40% by mass; according to another embodiment, the content of the compound is 1% to 35% by mass; according to still another embodiment, the content of the compound is 1% to 30% by mass; according to a further embodiment, the content of the compound is 1% to 25% by mass; according to a further embodiment, the content of the compound is 1% to 22% by mass; according to a further embodiment, the content of the compound is 1% to 15% by mass; according to a further embodiment, the content of the compound is 1% to 12% by mass; according to a further embodiment, the content of the compound is 1% to 8% by mass; and according to a further embodiment, the content of the compound is 1% to 4% by mass.

Further, preferred examples of the compound represented by the general formula (IX-2-2) include compounds represented by formula (31.1) to formula (31.4), compounds represented by formula (31.2) to formula (31.4) are more preferred, and a compound represented by formula (31.2) is still more preferred.

[Chem. 115]

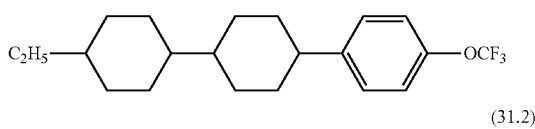
(31.1)

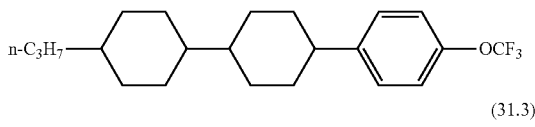
(31.2)

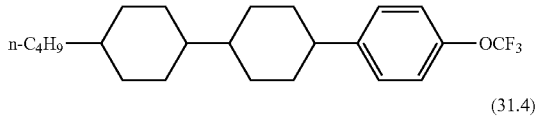
(31.3)

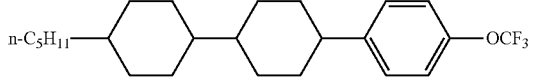
(31.4)

In the liquid crystal composition of the present invention, the content of the compound represented by the formula (31.2) relative to the total mass of the liquid crystal composition of the present invention is preferably 1% by mass or more and 35% by mass or less, more preferably 2% by mass or more and 25% by mass or less, still more preferably 3% by mass or more and 20% by mass or less, particularly preferably 3% by mass or more and 15% by mass or less, and most preferably 3% by mass or more and 11% by mass or less.

Examples of the content within the most preferred range include 3% by mass or more and 8% by mass or less, 3% by mass or more and 6% by mass or less, 3% by mass or more and 4% by mass or less, 4% by mass or more and 11% by mass or less, 6% by mass or more and 11% by mass or less, and 8% by mass or more and 11% by mass or less.

In the liquid crystal composition of the present invention, the content of the compound represented by the formula (31.4) relative to the total mass of the liquid crystal composition of the present invention is preferably 1% by mass or more and 35% by mass or less, more preferably 1% by mass or more and 25% by mass or less, even more preferably 1% by mass or more and 15% by mass or less, even more preferably 2% by mass or more and 10% by mass or less, even more preferably 3% by mass or more and 8% by mass or less, still more preferably 3% by mass or more and 6% by mass or less, and particularly preferably 3% by mass or more and 5% by mass or less.

Further, the compound represented by the general formula (IX-2) is preferably a compound represented by general formula (IX-2-3).

[Chem. 116]

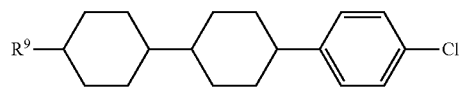
(IX-2-3)

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not limited, but a plurality of compounds represented by the general formula (IX-2-3) are preferably used alone or in combination of two in view of solubility at a low temperature, transition temperature, electric reliability, birefringence, etc.

In view of solubility at a low temperature, transition temperature, electric reliability, etc., the content of a compound represented by the general formula (IX-2-3) relative to the total mass of the liquid crystal composition of the present invention is preferably 1% by mass or more and 30% by mass or less, more preferably 3% by mass or more and 20% by mass or less, even more preferably 6% by mass or more and 15% by mass or less, and still more preferably 8% by mass or more and 10% by mass or less.

Further, preferred examples of the compound represented by the general formula (IX-2-3) include compounds represented by formula (32.1) to formula (32.4), and a compound represented by formula (32.2) and/or a compound represented by formula (32.4) is more preferred.

[Chem. 117]

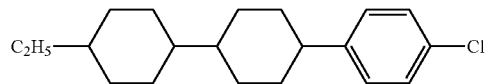
(32.1)

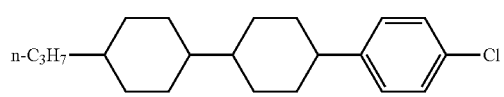
(32.2)

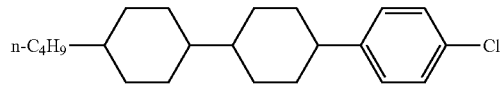
(32.3)

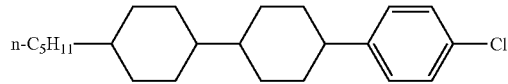
(32.4)

Further, the compound represented by the general formula (IX-2) is preferably a compound represented by general formula (IX-2-4).

[Chem. 118]

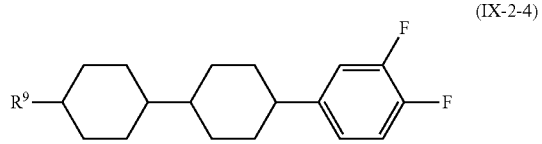

(IX-2-4)

(In the formula, $R^9$ represents an alkyl group having 1 to 5 carbon atoms, an alkenyl group having 2 to 5 carbon atoms, or an alkoxy group having 1 to 4 carbon atoms.)

In view of solubility at a low temperature, transition temperature, electric reliability, etc., the content of a compound represented by the general formula (IX-2-4) relative to the total mass of the liquid crystal composition of the present invention is preferably 1% by mass or more and 30% by mass or less, more preferably 3% by mass or more and 20% by mass or less, still more preferably 6% by mass or more and 15% by mass or less, and particularly preferably 8% by mass or more and 10% by mass or less.

Further, preferred examples of the compound represented by the general formula (IX-2-4) include compounds represented by formula (33.1) to formula (33.5), and a compound represented by formula (33.1) and/or a compound represented by formula (33.3) is more preferred.

[Chem. 119]

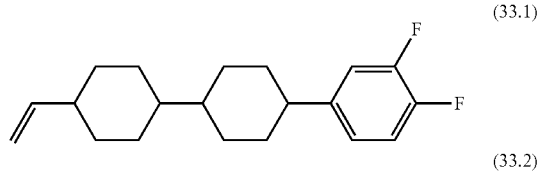

(33.1)

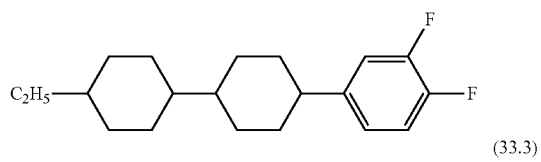

(33.2)

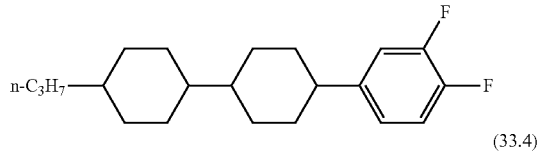

(33.3)

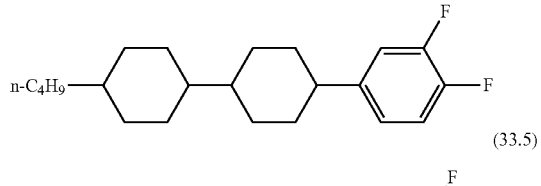

(33.4)

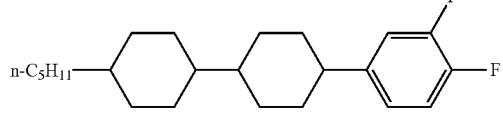

(33.5)

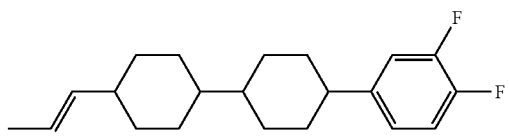

(33.6)

Further, the compound represented by the general formula (IX-2) is preferably a compound represented by general formula (IX-2-5).

[Chem. 120]

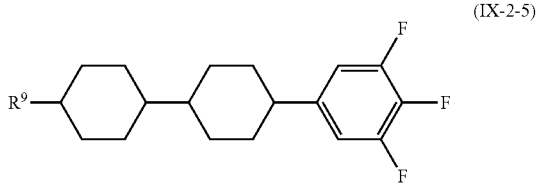

(IX-2-5)

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not limited, but a plurality of compounds represented by the general formula (IX-2-5) can be properly used in combination according to each embodiment in view of solubility at a low temperature, transition temperature, electric reliability, birefringence, etc. For example, according to an embodiment of the present invention, the number of type used is 1; according to another embodiment, the number the types is 2; according to still another embodiment, the number of type used is 3; and according to a further embodiment, the number of type used is 4 or more.

In view of characteristics such as solubility at a low temperature, transition temperature, electric reliability, birefringence, etc., the content of the compound represented by the general formula (IX-2-5) has upper limit and lower limit values according to each embodiment. For example, according to an embodiment of the present invention, the content of the compound relative to the total mass of the liquid crystal composition of the present invention is 4% to 45% by mass; according to another embodiment, the content of the compound is 8% to 45% by mass; according to still another embodiment, the content of the compound is 12% to 45% by mass; according to a further embodiment, the content of the compound is 21% to 45% by mass; according to a further embodiment, the content of the compound is 30% to 45% by mass; according to a further embodiment, the content of the compound is 31% to 45% by mass; and according to a further embodiment, the content of the compound is 34% to 45% by mass. Also, for example, according to an embodiment of the present invention, the content of the compound relative to the total mass is 4% to 45% by mass; according to another embodiment, the content of the compound is 4% to 40% by mass; according to still another embodiment, the content of the compound is 4% to 35% by mass; according to a further embodiment, the content of the compound is 4% to 32% by mass; according to a further embodiment, the content of the compound is 4% to 22% by mass; according to a further embodiment, the content of the compound is 4% to 13% by mass; according to a further embodiment, the content of the compound is 4% to 9% by mass; according to a further embodiment, the content of the compound is 4% to 8% by mass; and according to a further embodiment, the content of the compound is 4% to 5% by mass.

When the viscosity of the liquid crystal composition of the present invention is kept low, and the liquid crystal composition having fast response is required, both the lower limit value and the upper limit value are preferably slightly low. Further, when Tni of the liquid crystal composition of the present invention is kept high, and the liquid crystal composition causing little image sticking is required, both the lower limit value and the upper limit value are preferably slightly low. In addition, when it is desired to increase dielectric anisotropy for keeping the drive voltage low, both the lower limit value and the upper limit value are preferably slightly high.

Further, preferred examples of the compound represented by the general formula (IX-2-5) include compounds represented by formula (34.1) to formula (34.5), and a compound represented by formula (34.1), formula (34.2), formula (34.3), and/or formula (34.5) is more preferred.

[Chem. 121]

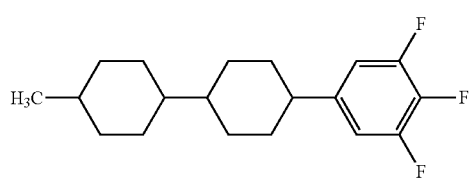
(34.1)

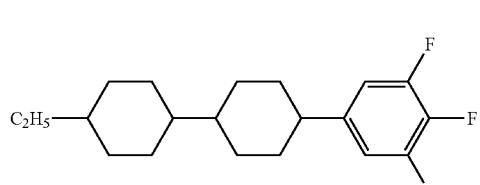
(34.2)

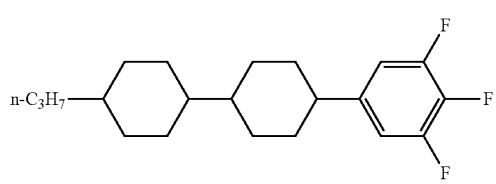
(34.3)

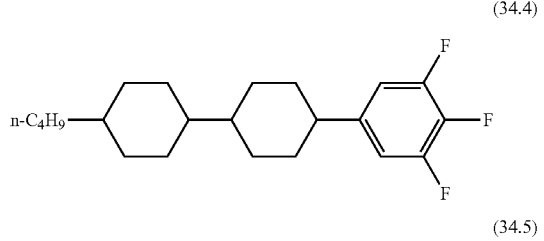
(34.4)

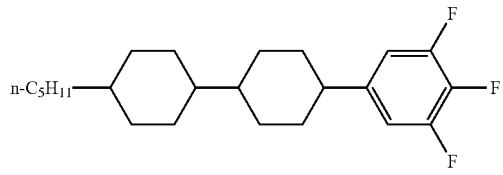
(34.5)

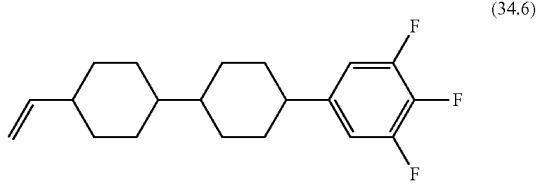
(34.6)

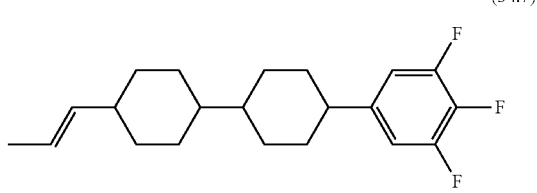
(34.7)

The compound represented by the general formula (IX) is preferably a compound represented by general formula (IX-3).

[Chem. 122]

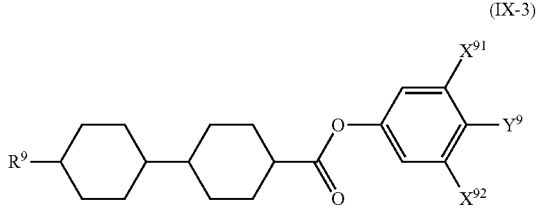
(IX-3)

(In the formula, $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, and $Y^9$ represents a fluorine atom, a chlorine atom, or —$OCF_3$.)

Further, the compound represented by the general formula (IX-3) is preferably a compound represented by general formula (IX-3-1).

[Chem. 123]

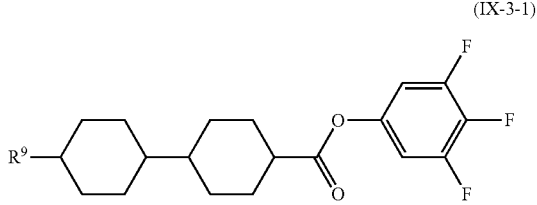
(IX-3-1)

(In the formula, $R^9$ represents an alkyl group having 1 to 5 carbon atoms, an alkenyl group having 2 to 5 carbon atoms, or an alkoxy group having 1 to 4 carbon atoms.)

The types of compounds which can be combined are not limited, but a plurality of compounds represented by the general formula (IX-3-1) are preferably used alone or in combination of two in view of solubility at a low temperature, transition temperature, electric reliability, birefringence, etc.

In view of solubility at a low temperature, transition temperature, electric reliability, etc., the content of a compound represented by the general formula (IX-3-1) relative to the total mass of the liquid crystal composition of the present invention is preferably 3% by mass or more and 30% by mass or less, more preferably 7% by mass or more and 30% by mass or less, still more preferably 13% by mass or more and 20% by mass or less, and particularly preferably 15% by mass or more and 18% by mass or less.

Further, preferred examples of the compound represented by the general formula (IX-3-1) include compounds represented by formula (35.1) to formula (35.4), and a compound represented by formula (35.1) and/or formula (35.2) is preferred.

[Chem. 124]

(35.1)

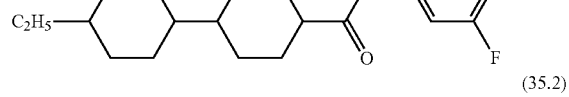
(35.2)

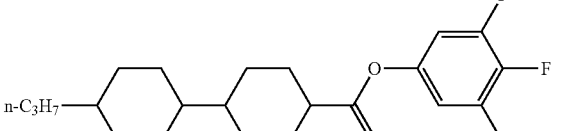
(35.3)

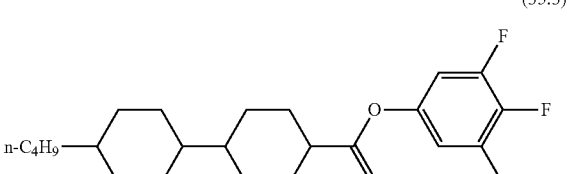
(35.4)

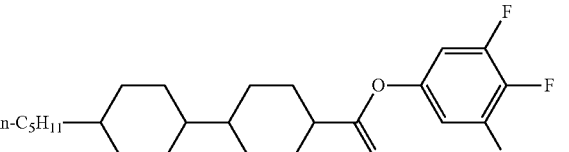

The compound represented by the general formula (M) is preferably a compound represented by general formula (X). However, compounds represented by the general formula (i) and compounds represented by the general formula (ii) described above are excluded.

[Chem. 125]

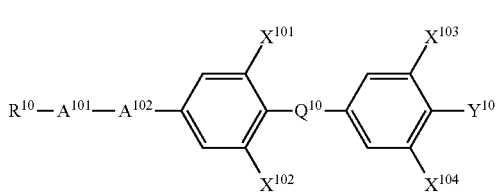
(X)

(In the formula, $X^{101}$ to $X^{104}$ each independently represent a fluorine atom or a hydrogen atom, $Y^{10}$ represents a fluorine atom, a chlorine atom, or —$OCF_3$, $Q^{10}$ represents a single bond or —$CF_2O$—, R″ represents an alkyl group having 1 to 5 carbon atoms, an alkenyl group having 2 to 5 carbon atoms, or an alkoxy group having 1 to 4 carbon atoms, and $A^{101}$ and $A^{102}$ each independently represent a 1,4-cyclohexylene group, a 1,4-phenylene group, or

[Chem. 126]

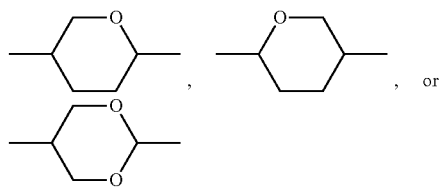
, or wherein a hydrogen atom on a 1,4-phenylene group may be substituted by a fluorine atom.)

Compounds which can be combined are not particularly limited, but a plurality of compounds represented by the general formula (X) can be properly used in combination according to each embodiment in view of solubility at a low temperature, transition temperature, electric reliability, birefringence, etc. For example, according to an embodiment of the present invention, the number of the type of compound used is 1. According t another embodiment of the present invention, the number of the types is 2. According to still another embodiment, the number of the types is 3. According to a further embodiment, the number of the types is 4. According to a further embodiment, the number of the types is 5 or more.

In view of characteristics such as solubility at a low temperature, transition temperature, electric reliability, birefringence, etc., the content of a compound represented by the general formula (X) has an upper limit value and a lower limit value according to each embodiment. For example, according to an embodiment of the present invention, the content of the compound relative to the total mass of the liquid crystal composition of the present invention is 2% to 45% by mass; according to another embodiment, the content of the compound is 3% to 45% by mass; according to still another embodiment, the content of the compound is 6% to 45% by mass; according to a further embodiment, the content of the compound is 8% to 45% by mass; according to a further embodiment, the content of the compound is 9% to 45% by mass; according to a further embodiment, the content of the compound is 11% to 45% by mass; according to a further embodiment, the content of the compound is 12% to 45% by mass; according to a further embodiment, the content of the compound is 18% to 45% by mass; according to a further embodiment, the content of the compound is 19% to 45% by mass; according to a further embodiment, the content of the compound is 23% to 45% by mass; and according to a further embodiment, the content of the compound is 25% to 45% by mass. Also, for example, according to an embodiment of the present invention, the content of the compound relative to the total mass is 2% to 45% by mass; according to another embodiment, the content of the compound is 2% to 35% by mass; according to still another embodiment, the content of the compound is 2% to 30% by mass; according to a further embodiment, the content of the compound is 2% to 25% by mass; according to a further embodiment, the content of the compound is 2% to 20% by mass; according to a further embodiment, the content of the compound is 2% to 13% by mass; according to a further embodiment, the content of the compound is 2% to 9% by mass; according to a further embodiment, the content of the compound is 2% to 6% by mass; and according to a further embodiment, the content of the compound is 2% to 3% by mass.

When the viscosity of the liquid crystal composition of the present invention is kept low, and the liquid crystal composition having fast response is required, both the lower limit value and the upper limit value are preferably slightly low. Further, when the liquid crystal composition causing little image sticking is required, both the lower limit value and the upper limit value are preferably slightly low. In addition, when it is desired to increase dielectric anisotropy for keeping the drive voltage low, both the lower limit value and the upper limit value are preferably slightly high.

The compound represented by the general formula (X) is preferably a compound represented by general formula (X-3).

[Chem. 127]

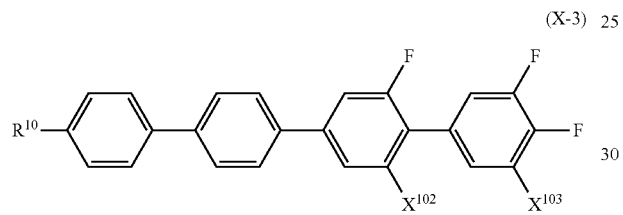

(X-3)

(In the formula, $X^{102}$ and $X^{103}$ each independently represent a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-3) are preferably used alone or in combination of two or more in view of solubility at a low temperature, transition temperature, electric reliability, birefringence, etc.

Further, the compound represented by the general formula (X-3) and used in the liquid crystal composition of the present invention is preferably a compound represented by general formula (X-3-1).

[Chem. 128]

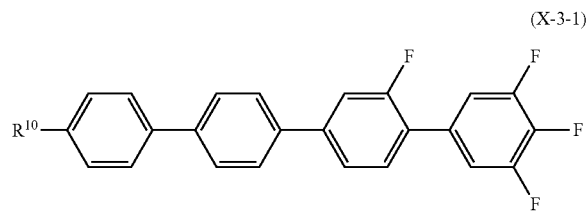

(X-3-1)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-3-1) are preferably used alone or in combination of two or more in view of solubility at a low temperature, transition temperature, electric reliability, birefringence, etc.

The content of a compound represented by the general formula (X-3-1) relative to the total mass of the liquid crystal composition of the present invention is preferably 1% by mass or more, more preferably 2% by mass or more, and still more preferably 3% by mass or more. In addition, in view of solubility at a low temperature, transition temperature, electric reliability, etc., the maximum ratio is preferably limited to 10% by mass or less, more preferably 8% by mass or less, still more preferably 6% by mass or less, and particularly preferably 4% by mass or less.

Preferred examples of the compound represented by the general formula (X-3-1) and used in the liquid crystal composition of the present invention include compounds represented by formula (41.1) to formula (41.4), and particularly a compound represented by formula (41.2) is preferably contained.

[Chem. 129]

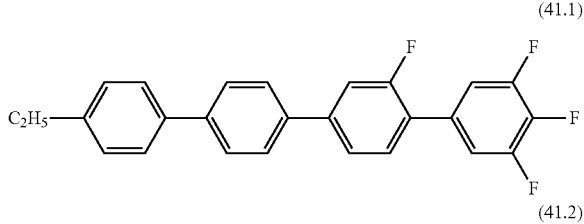

(41.1)

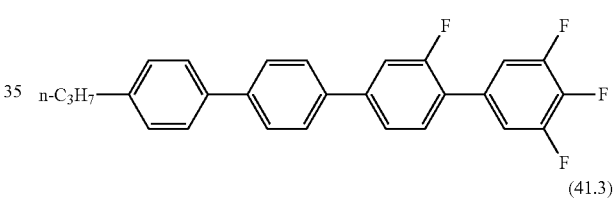

(41.2)

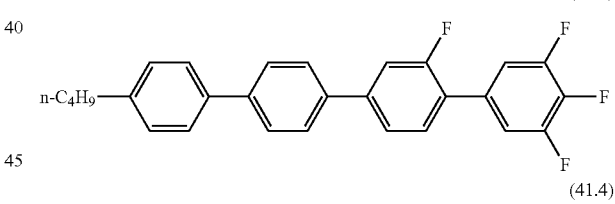

(41.3)

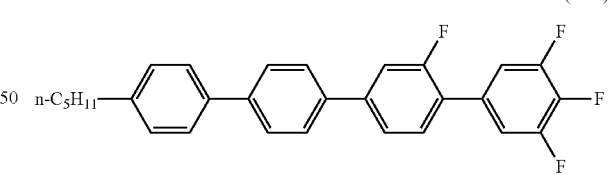

(41.4)

In the liquid crystal composition of the present invention, the content of the compound represented by the formula (41.2) relative to the total mass of the liquid crystal composition of the present invention is preferably 0.5% by mass or more and 15% by mass or less, more preferably 1% by mass or more and 10% by mass or less, still more preferably 1% by mass or more and 7% by mass or less, particularly preferably 1% by mass or more and 5% by mass or less, and most preferably 1% by mass or more and 3% by mass or less.

The compound represented by the general formula (X) is preferably a compound represented by general formula (X-4).

[Chem. 130]

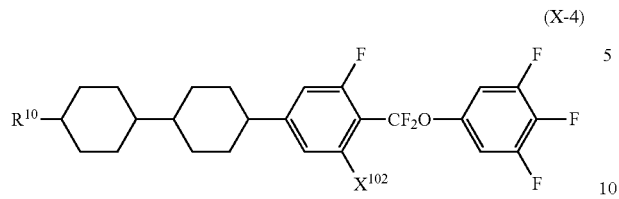

(X-4)

(In the formula, $X^{102}$ represents a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-4) are preferably used alone or in combination of two or more and more preferably used alone or in combination of two or three or more in view of solubility at a low temperature, transition temperature, electric reliability, birefringence, etc.

Further, the compound represented by the general formula (X-4) and used in the liquid crystal composition of the present invention is preferably a compound represented by general formula (X-4-1).

[Chem. 131]

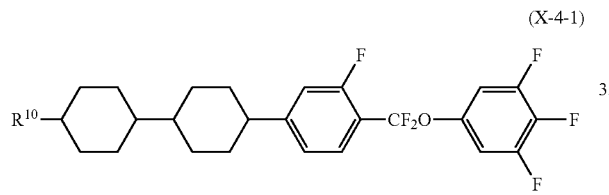

(X-4-1)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-4-1) are preferably used alone or in combination of two or more and more preferably used alone or in combination of two or three or more in view of solubility at a low temperature, transition temperature, electric reliability, birefringence, etc.

In view of solubility at a low temperature, transition temperature, electric reliability, etc., the content of a compound represented by the general formula (X-4-1) relative to the total mass of the liquid crystal composition of the present invention is preferably 2% by mass or more and 20% by mass or less, more preferably 5% by mass or more and 17% by mass or less, still more preferably 10% by mass or more and 15% by mass or less, and particularly preferably 10% by mass or more and 13% by mass or less.

Further, preferred examples of the compound represented by the general formula (X-4-1) and used in the liquid crystal composition of the present invention include compounds represented by formula (42.1) to formula (42.4), and particularly a compound represented by formula (42.3) is preferably contained.

[Chem. 132]

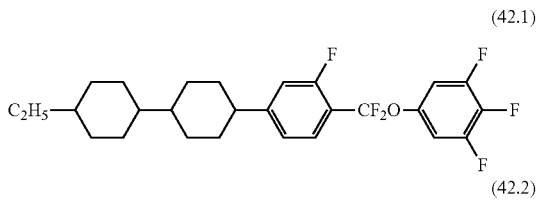

(42.1)

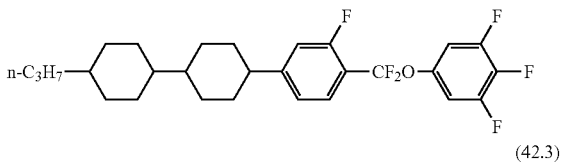

(42.2)

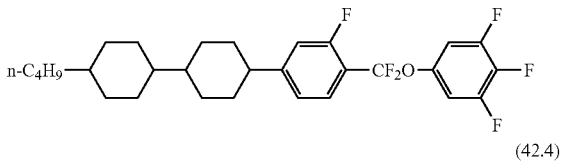

(42.3)

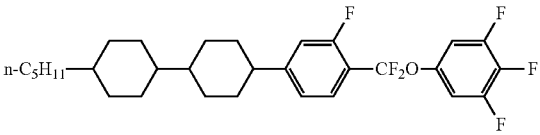

(42.4)

Further, the compound represented by the general formula (X) and used in the liquid crystal composition of the present invention is preferably a compound represented by general formula (X-4-2).

[Chem. 133]

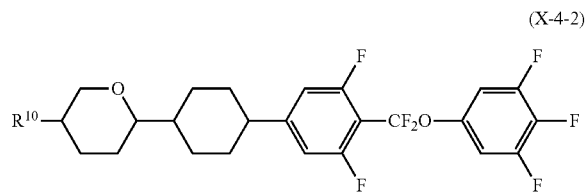

(X-4-2)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-4-2) are preferably used alone or in combination of two or more and more preferably used alone or in combination of two or three or more in view of solubility at a low temperature, transition temperature, electric reliability, birefringence, etc.

In view of solubility at a low temperature, transition temperature, electric reliability, etc., the content of a compound represented by general formula (X-4-2) relative to the total mass of the liquid crystal composition of the present invention is preferably 2% by mass or more and 20% by mass or less, more preferably 5% by mass or more and 17% by mass or less, still more preferably 10% by mass or more and 15% by mass or less, and particularly preferably 10% by mass or more and 13% by mass or less.

Further, preferred examples of the compound represented by the general formula (X-4-2) and used in the liquid crystal composition of the present invention include compounds represented by formula (42.11) to formula (42.14), and particularly a compound represented by formula (42.13) or formula (42.14) is preferably contained.

[Chem. 134]

(42.11)

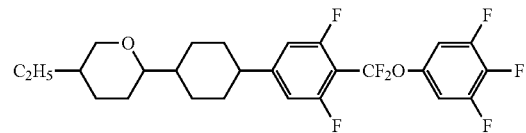

(42.12)

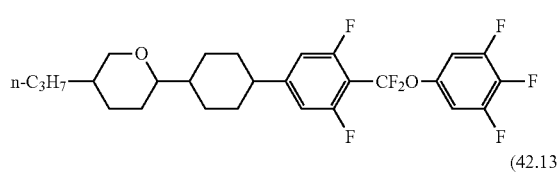

(42.13)

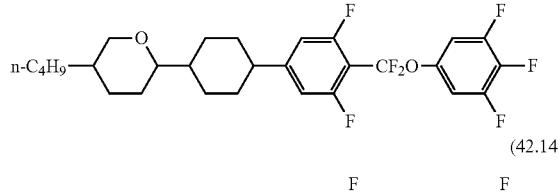

(42.14)

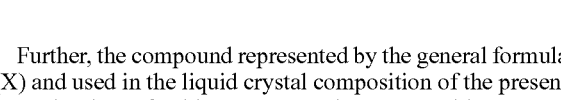

Further, the compound represented by the general formula (X) and used in the liquid crystal composition of the present invention is preferably a compound represented by general formula (X-4-3).

[Chem. 135]

(X-4-3)

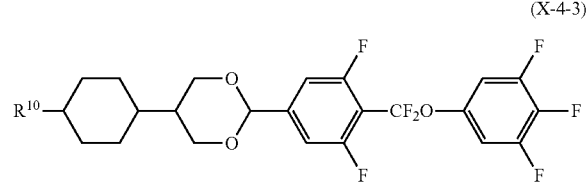

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-4-3) are preferably used alone or in combination of two or more and more preferably used alone or in combination of two or three or more in view of solubility at a low temperature, transition temperature, electric reliability, birefringence, etc.

In view of solubility at a low temperature, transition temperature, electric reliability, etc., the content of a compound represented by general formula (X-4-3) relative to the total mass of the liquid crystal composition of the present invention is preferably 2% by mass or more and 20% by mass or less, more preferably 5% by mass or more and 17% by mass or less, still more preferably 10% by mass or more and 15% by mass or less, and particularly preferably 10% by mass or more and 13% by mass or less.

Further, preferred examples of the compound represented by the general formula (X-4-3) and used in the liquid crystal composition of the present invention include compounds represented by formula (42.21) to formula (42.24), and particularly a compound represented by formula (42.22) is more preferred.

[Chem. 136]

(42.21)

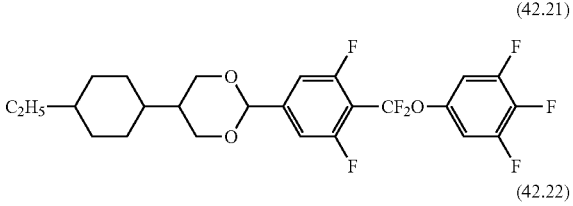

(42.22)

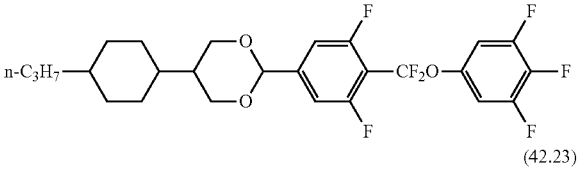

(42.23)

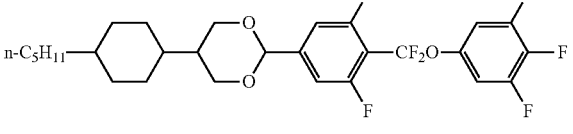

(42.24)

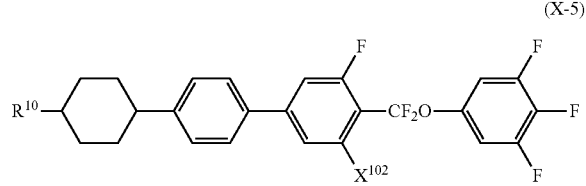

Further, the compound represented by the general formula (X) is preferably a compound represented by general formula (X-5).

[Chem. 137]

(X-5)

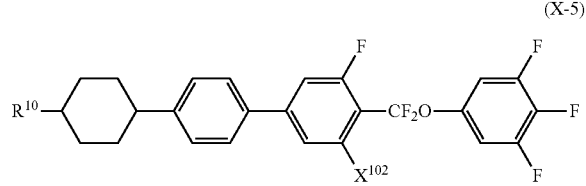

(In the formula, $X^{102}$ represents a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-5) are preferably used alone or in combination of two or more and more preferably used alone or in combination of two or three or more in view of solubility at a low temperature, transition temperature, electric reliability, birefringence, etc.

Further, the compound represented by the general formula (X-5) and used in the liquid crystal composition of the present invention is preferably a compound represented by general formula (X-5-1).

[Chem. 138]

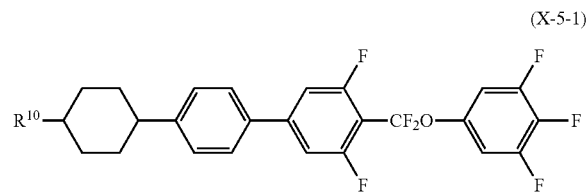

(X-5-1)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X-5-1) are preferably used alone or in combination of two or more and more preferably used alone or in combination of two or three or more in view of solubility at a low temperature, transition temperature, electric reliability, birefringence, etc.

Further, preferred examples of the compound represented by the general formula (X-5-1) and used in the liquid crystal composition of the present invention include compounds represented by formula (43.1) to formula (43.4), and a compound represented by formula (43.2) is particularly preferred.

[Chem. 139]

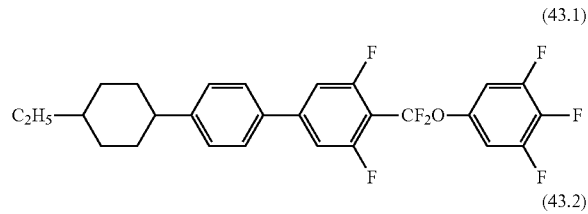

(43.1)

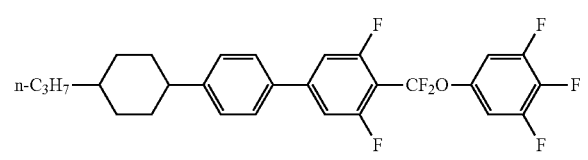

(43.2)

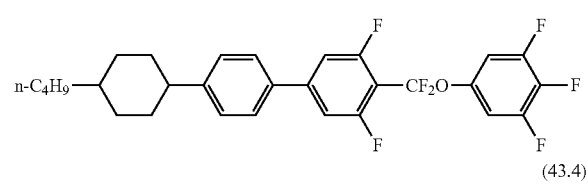

(43.3)

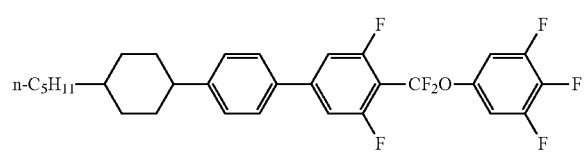

(43.4)

Further, the liquid crystal composition of the present invention may further contain a compound represented by general formula (X'-7) similar to the compound represented by the general formula (X).

[Chem. 140]

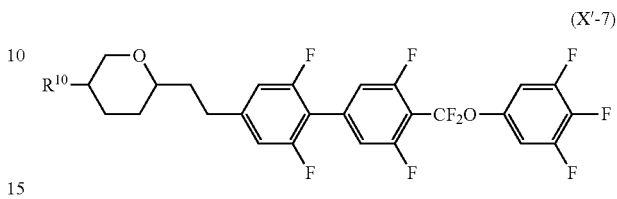

(X'-7)

(In the formula, $R^{10}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (X'-7) are preferably used alone or in combination of two or more in view of solubility at a low temperature, transition temperature, electric reliability, birefringence, etc.

In view of characteristics such as solubility at a low temperature, transition temperature, electric reliability, birefringence, etc., the content of the compound represented by the general formula (X'-7) has upper limit and lower limit values according to each embodiment.

For example, according to an embodiment of the present invention, the content of the compound relative to the total mass of the liquid crystal composition of the present invention is 4% to 30% by mass; according to another embodiment, the content of the compound is 5% to 30% by mass; according to still another embodiment, the content of the compound is 6% to 30% by mass; according to a further embodiment, the content of the compound is 8% to 30% by mass; according to a further embodiment, the content of the compound is 9% to 30% by mass; according to a further embodiment, the content of the compound is 11% to 30% by mass; according to a further embodiment, the content of the compound is 14% to 30% by mass; and according to a further embodiment, the content of the compound is 18% to 30% by mass.

Also, for example, according to an embodiment of the present invention, the content of the compound relative to the total mass is 4% to 30% by mass; according to another embodiment, the content of the compound is 4% to 20% by mass; according to still another embodiment, the content of the compound is 4% to 13% by mass; according to a further embodiment, the content of the compound is 4% to 10% by mass; and according to a further embodiment, the content of the compound is 4% to 7% by mass.

Further, preferred examples of the compound represented by the general formula (X'-7) and used in the liquid crystal composition of the present invention include compounds represented by formula (44.11) to formula (44.14), and particularly a compound represented by formula (44.13) is more preferred.

[Chem. 141]

(44.11)

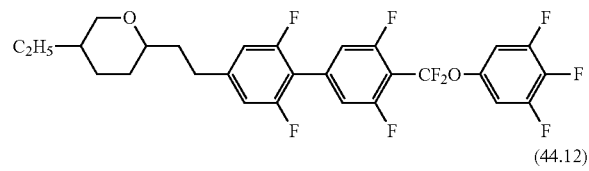
(44.12)

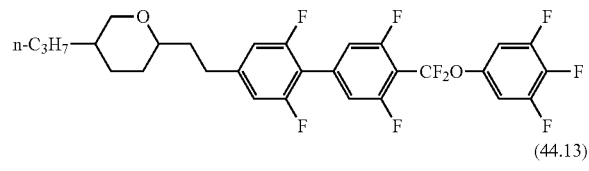
(44.13)

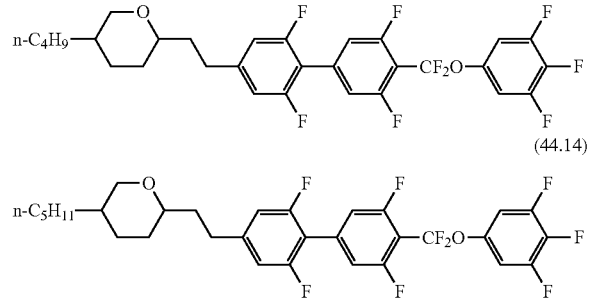
(44.14)

Further, the compound represented by the general formula (X) is preferably a compound selected from a group represented by general formula (XI).

[Chem. 142]

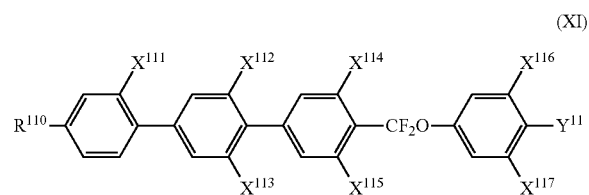
(XI)

(In the formula, $X^{111}$ to $X^{117}$ each independently represent a fluorine atom or a hydrogen atom, at least one of $X^{111}$ to $X^{117}$ represents a fluorine atom, $R^{110}$ represents an alkyl group having 1 to 5 carbon atoms, an alkenyl group having 2 to 5 carbon atoms, or an alkoxy group having 1 to 4 carbon atoms, and $Y^{11}$ represents a fluorine atom or —$OCF_3$.)

Compounds which can be combined are not particularly limited, but a plurality of compounds represented by the general formula (XI) are preferably used alone or in combination of two to three or more in view of solubility at a low temperature, transition temperature, electric reliability, birefringence, etc.

In view of characteristics such as solubility at a low temperature, transition temperature, electric reliability, birefringence, etc., the content of a compound represented by the general formula (XI) has an upper limit value and a lower limit value according to each embodiment. For example, according to an embodiment of the present invention, the content of the compound relative to the total mass of the liquid crystal composition of the present invention is 2% to 30% by mass; according to another embodiment, the content of the compound is 4% to 30% by mass; according to still another embodiment, the content of the compound is 5% to 30% by mass; according to a further embodiment, the content of the compound is 7% to 30% by mass; according to a further embodiment, the content of the compound is 9% to 30% by mass; according to a further embodiment, the content of the compound is 10% to 30% by mass; according to a further embodiment, the content of the compound is 12% to 30% by mass; according to a further embodiment, the content of the compound is 13% to 30% by mass; according to a further embodiment, the content of the compound is 15% to 30% by mass; and according to a further embodiment, the content of the compound is 18% to 30% by mass.

Also, for example, according to an embodiment of the present invention, the content of the compound relative to the total mass is 2% to 30% by mass; according to another embodiment, the content of the compound is 2% to 25% by mass; according to still another embodiment, the content of the compound is 2% to 20% by mass; according to a further embodiment, the content of the compound is 2% to 15% by mass; according to a further embodiment, the content of the compound is 2% to 10% by mass; and according to a further embodiment, the content of the compound is 2% to 5% by mass.

When the liquid crystal composition of the present invention is used for a liquid crystal display device having a small cell gap, it is desired to slightly increase the content of the compound represented by the general formula (XI). When the liquid crystal composition of the present invention is used for a liquid crystal display device having a low drive voltage, it is desired to slightly increase the content of the compound represented by the general formula (XI). When the liquid crystal composition of the present invention is used for a liquid crystal display device used in a low-temperature environment, it is desired to slightly decrease the content of the compound represented by the general formula (XI). When the liquid crystal composition of the present invention is used for a liquid crystal display device having fast response, it is desired to slightly decrease the content of the compound represented by the general formula (XI).

Further, the compound represented by the general formula (XI) and used in the liquid crystal composition of the present invention is preferably a compound represented by general formula (XI-1).

[Chem. 143]

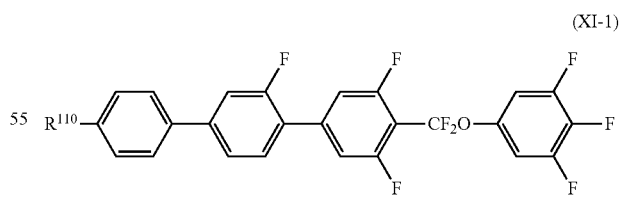
(XI-1)

(In the formula, $R^{110}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by general formula (XI-1) can be properly used in combination according to each embodiment in view of solubility at a low temperature, transition temperature, electric reliability, birefringence, etc. For example, according to an embodiment of the present invention, the number of the type of compound used is 1; according to another embodiment of the present invention, the number of the types is 2; and according to a further embodiment, the number of the types is 3 or more.

In view of solubility at a low temperature, transition temperature, electric reliability, birefringence, etc., the content of a compound represented by the general formula (XI-1) relative to the total mass of the liquid crystal composition of the present invention is preferably 1% by mass or more and 20% by mass or less, more preferably 3% by mass or more and 20% by mass or less, even more preferably 4% by mass or more and 20% by mass or less, still more preferably 6% by mass or more and 15% by mass or less, and particularly preferably 9% by mass or more and 12% by mass or less.

Further, preferred examples of the compound represented by the general formula (XI-1) and used in the liquid crystal composition of the present invention include compounds represented by formula (45.1) to formula (45.4), and particularly compounds represented by formula (45.2) to formula (45.4) are preferably contained, and a compound represented by formula (45.2) is more preferably contained.

[Chem. 144]

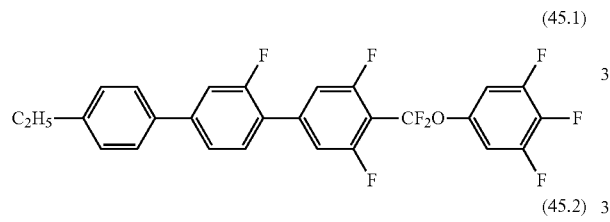

(45.1)

(45.2)

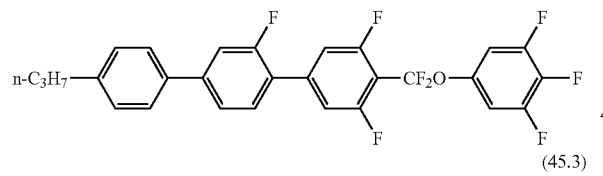

(45.3)

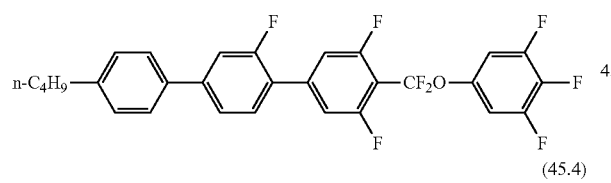

(45.4)

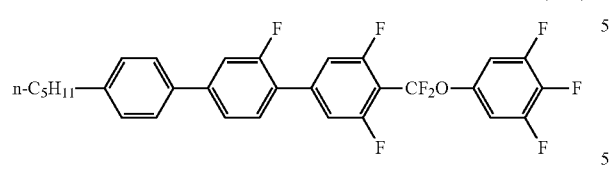

In the liquid crystal composition of the present invention, in view of solubility at a low temperature, transition temperature, electric reliability, etc., the content of the compound represented by the formula (45.2) relative to the total mass of the liquid crystal composition of the present invention is preferably 1% by mass or more and 25% by mass or less, more preferably 2% by mass or more and 20% by mass or less, still more preferably 3% by mass or more and 15% by mass or less, particularly preferably 4% by mass or more and 10% by mass or less, and most preferably 4% by mass or more and 5% by mass or less.

In the liquid crystal composition of the present invention, in view of solubility at a low temperature, transition temperature, electric reliability, etc., the content of the compound represented by the formula (45.3) relative to the total mass of the liquid crystal composition of the present invention is preferably 1% by mass or more and 25% by mass or less, more preferably 3% by mass or more and 20% by mass or less, still more preferably 3% by mass or more and 15% by mass or less, and particularly preferably 3% by mass or more and 10% by mass or less.

Examples of the content within the particularly preferred range include 3% by mass or more and 6% by mass or less, 7% by mass or more and 10% by mass or less, 5% by mass or more and 8% by mass or less, and 6% by mass or more and 7% by mass or less.

In the liquid crystal composition of the present invention, in view of solubility at a low temperature, transition temperature, electric reliability, etc., the content of the compound represented by the formula (45.4) relative to the total mass of the liquid crystal composition of the present invention is preferably 1% by mass or more and 25% by mass or less, more preferably 2% by mass or more and 20% by mass or less, still more preferably 3% by mass or more and 15% by mass or less, particularly preferably 3% by mass or more and 10% by mass or less, and most preferably 3% by mass or more and 5% by mass or less.

Further, the compound represented by the general formula (XI) and used in the liquid crystal composition of the present invention is preferably a compound represented by general formula (XI-2).

[Chem. 145]

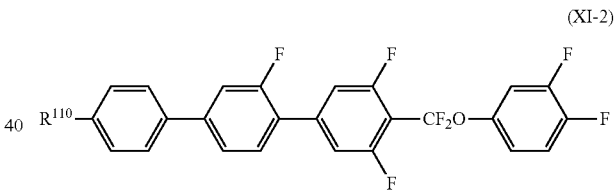

(XI-2)

(In the formula, $R^{110}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (XI-2) can be properly used in combination according to each embodiment in view of solubility at a low temperature, transition temperature, electric reliability, birefringence, etc. For example, according to an embodiment of the present invention, the number of the type of compound used is 1; according to another embodiment of the present invention, the number of the types is 2; and according to a further embodiment, the number of the types is 3 or more.

In view of solubility at a low temperature, transition temperature, electric reliability, etc., the content of the compound represented by the general formula (XI-2) relative to the total mass of the liquid crystal composition of the present invention is preferably 1% by mass or more and 20% by mass or less, more preferably 3% by mass or more and 20% by mass or less, even more preferably 4% by mass or more and 20% by mass or less, still more preferably 6% by mass or more and 15% by mass or less, and particularly preferably 9% by mass or more and 12% by mass or less.

Further, preferred examples of the compound represented by the general formula (XI-2) and used in the liquid crystal composition of the present invention include compounds represented by formula (45.11) to formula (45.14), and particularly compounds represented by formula (45.12) to formula (45.14) are preferably contained, and a compound represented by formula (45.12) is more preferably contained.

[Chem. 146]

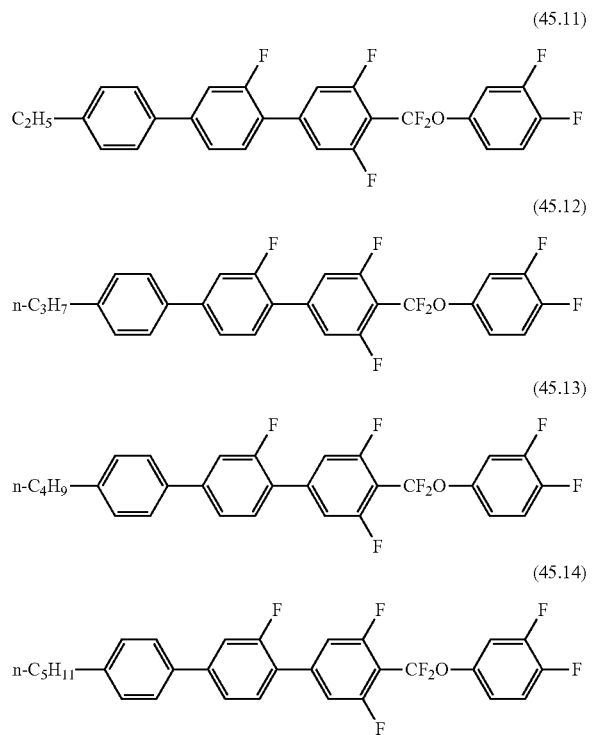

Further, the compound represented by the general formula (X) is preferably a compound selected from a group represented by general formula (XII).

[Chem. 147]

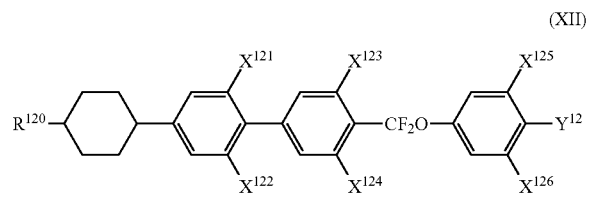

(In the formula, $X^{121}$ to $X^{126}$ each independently represent a fluorine atom or a hydrogen atom, $R^{120}$ represents an alkyl group having 1 to 5 carbon atoms, an alkenyl group having 2 to 5 carbon atoms, or an alkoxy group having 1 to 4 carbon atoms, and $Y^{12}$ represents a fluorine atom or —OCF$_3$.)

Compounds which can be combined are not particularly limited, but a plurality of compounds represented by the general formula (XII) are preferably used alone or in combination of two to three or more and more preferably used alone or in combination of two to four or more in view of solubility at a low temperature, transition temperature, electric reliability, birefringence, etc.

Further, the compound represented by the general formula (XII) and used in the liquid crystal composition of the present invention is preferably a compound represented by general formula (XII-1).

[Chem. 148]

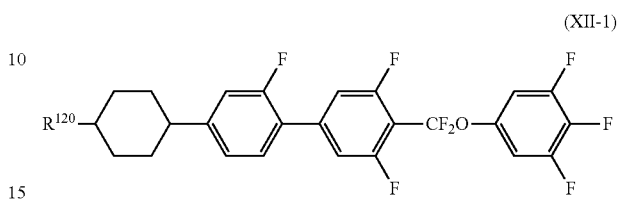

(In the formula, $R^{120}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (XII-1) are preferably used alone or in combination of two or more and more preferably used alone or in combination of two to three or more in view of solubility at a low temperature, transition temperature, electric reliability, birefringence, etc.

In view of solubility at a low temperature, transition temperature, electric reliability, etc., the content of a compound represented by the general formula (XII-1) relative to the total mass of the liquid crystal composition of the present invention is preferably 1% by mass or more and 15% by mass or less, more preferably 2% by mass or more and 10% by mass or less, still more preferably 3% by mass or more and 8% by mass or less, and particularly preferably 4% by mass or more and 6% by mass or less.

Further, preferred examples of the compound represented by the general formula (XII-1) and used in the liquid crystal composition of the present invention include compounds represented by formula (46.1) to formula (46.4), and particularly compounds represented by formula (46.2) to formula (46.4) are preferably contained.

[Chem. 149]

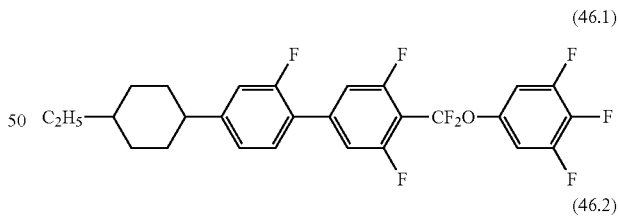

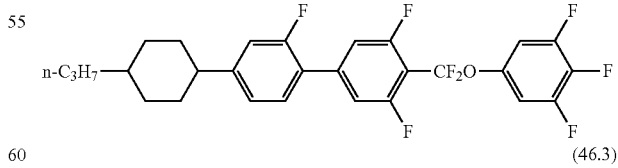

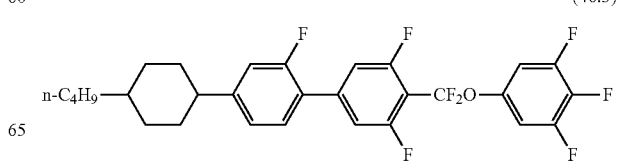

-continued (46.4)
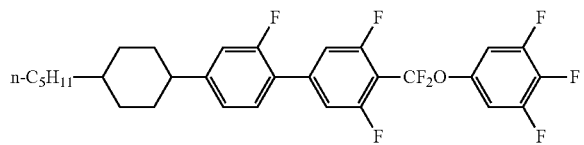

Further, the compound represented by the general formula (XII) is preferably a compound represented by general formula (XII-2).

[Chem. 150]

(XII-2)
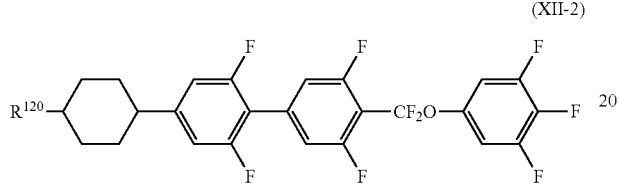

(In the formula, $R^{120}$ represents an alkyl group having 1 to 5 carbon atoms, an alkenyl group having 2 to 5 carbon atoms, or an alkoxy group having 1 to 4 carbon atoms.)

Compounds which can be combined are not particularly limited, but a plurality of compounds represented by the general formula (XII-2) are preferably used alone or in combination of two or more and more preferably used alone or in combination of two to three or more in view of solubility at a low temperature, transition temperature, electric reliability, birefringence, etc.

In view of solubility at a low temperature, transition temperature, electric reliability, etc., the content of a compound represented by the general formula (XII-2) relative to the total mass of the liquid crystal composition of the present invention is preferably 1% by mass or more and 20% by mass or less, more preferably 3% by mass or more and 20% by mass or less, even more preferably 4% by mass or more and 17% by mass or less, still more preferably 6% by mass or more and 15% by mass or less, and particularly preferably 9% by mass or more and 13% by mass or less.

Further, preferred examples of the compound represented by the general formula (XII-2) and used in the liquid crystal composition of the present invention include compounds represented by formula (47.1) to formula (47.4), and particularly compounds represented by formula (47.2) to formula (47.4) are preferably contained.

[Chem. 151]

(47.1)

C₂H₅—⟨cyclohexyl⟩—⟨F,F⟩—⟨F,F⟩—CF₂O—⟨F,F,F⟩—F (47.2)

n-C₃H₇—⟨cyclohexyl⟩—⟨F,F⟩—⟨F,F⟩—CF₂O—⟨F,F,F⟩—F

-continued (47.3)

n-C₄H₉—⟨cyclohexyl⟩—⟨F,F⟩—⟨F,F⟩—CF₂O—⟨F,F,F⟩—F (47.4)

n-C₅H₁₁—⟨cyclohexyl⟩—⟨F,F⟩—⟨F,F⟩—CF₂O—⟨F,F,F⟩—F

Further, the compound represented by the general formula (M) is preferably a compound selected from a compound group represented by general formula (XIII).

[Chem. 152]

(XIII)
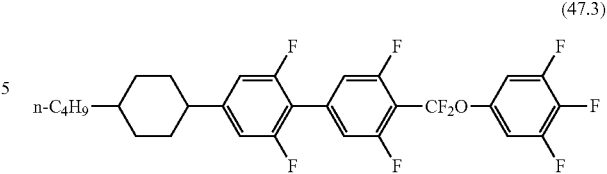

(In the formula, $X^{131}$ to $X^{135}$ each independently represent a fluorine atom or a hydrogen atom, $R^{130}$ represents an alkyl group having 1 to 5 carbon atoms, an alkenyl group having 2 to 5 carbon atoms, or an alkoxy group having 1 to 4 carbon atoms, and $Y^{13}$ represents a fluorine atom or —OCF₃.)

The types of compounds which can be combined are not particularly limited, but preferably one or two, more preferably one to three, and still more preferably one to four of a plurality of compounds represented by the general formula (XIII) are contained.

In view of characteristics such as solubility at a low temperature, transition temperature, electric reliability, birefringence, etc., the content of a compound represented by the general formula (XIII) has upper limit and lower limit values according to each embodiment.

For example, according to an embodiment of the present invention, the content of the compound relative to the total mass of the liquid crystal composition of the present invention is 2% to 30% by mass; according to another embodiment, the content of the compound is 4% to 30% by mass; according to still another embodiment, the content of the compound is 5% to 30% by mass; according to a further embodiment, the content of the compound is 7% to 30% by mass; according to a further embodiment, the content of the compound is 9% to 30% by mass; according to a further embodiment, the content of the compound is 11% to 30% by mass; according to a further embodiment, the content of the compound is 13% to 30% by mass; according to a further embodiment, the content of the compound is 14% to 30% by mass; according to a further embodiment, the content of the compound is 16% to 30% by mass; and according to a further embodiment, the content of the compound is 20% to 30% by mass.

Also, for example, according to an embodiment of the present invention, the content of the compound relative to the total mass is 2% to 30% by mass; according to another embodiment, the content of the compound is 2% to 25% by mass; according to still another embodiment, the content of the compound is 2% to 20% by mass; according to a further embodiment, the content of the compound is 2% to 15% by mass; according to a further embodiment, the content of the compound is 2% to 10% by mass; and according to a further embodiment, the content of the compound is 2% to 5% by mass.

When the liquid crystal composition of the present invention is used for a liquid crystal display device having a small cell gap, it is desired to slightly increase the content of the compound represented by the general formula (XIII). When the liquid crystal composition of the present invention is used for a liquid crystal display device having a low drive voltage, it is desired to slightly increase the content of the compound represented by the general formula (XIII). When the liquid crystal composition of the present invention is used for a liquid crystal display device used in a low-temperature environment, it is desired to slightly decrease the content of the compound represented by the general formula (XIII). When the liquid crystal composition of the present invention is used for a liquid crystal display device having fast response, it is desired to slightly decrease the content of the compound represented by the general formula (XIII).

Further, the compound represented by the general formula (XIII) is preferably a compound represented by general formula (XIII-1).

[Chem. 153]

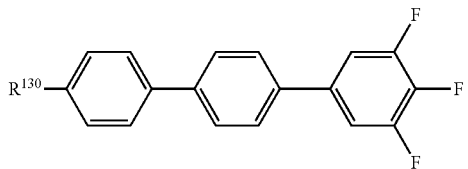

(XIII-1)

(In the formula, $R^{130}$ represents an alkyl group having 1 to 5 carbon atoms, an alkenyl group having 2 to 5 carbon atoms, or an alkoxy group having 1 to 4 carbon atoms.)

The content of the compound represented by the general formula (XIII-1) relative to the total mass of the liquid crystal composition of the present invention is preferably 1% by mass or more and 25% by mass or less, more preferably 3% by mass or more and 25% by mass or less, still more preferably 5% by mass or more and 20% by mass or less, and particularly preferably 10% by mass or more and 15% by mass or less.

Further, preferred examples of the compound represented by the general formula (XIII-1) include compounds represented by formula (48.1) to formula (48.4), and particularly a compound represented by formula (48.2) is preferred.

[Chem. 154]

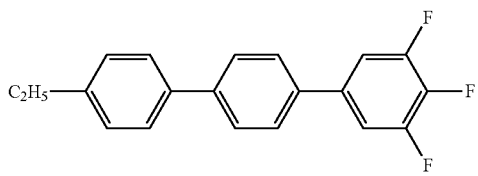

(48.1)

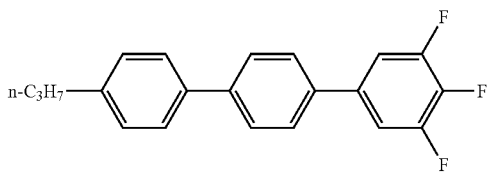

(48.2)

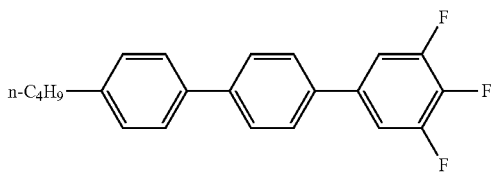

(48.3)

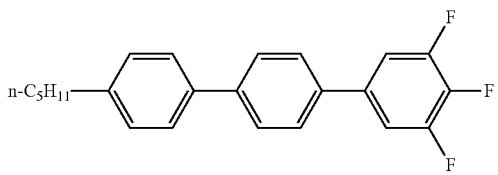

(48.4)

Further, the compound represented by the general formula (XIII) is preferably a compound represented by general formula (XIII-2).

[Chem. 155]

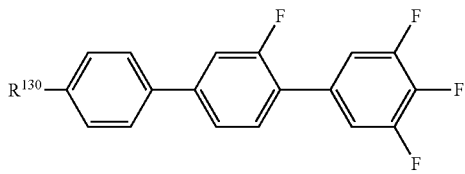

(XIII-2)

(In the formula, $R^{130}$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but at least one of a plurality of compounds represented by the general formula (XIII-2) is preferably contained.

The content of the compound represented by the general formula (XIII-2) relative to the total mass of the liquid crystal composition of the present invention is preferably 5% by mass or more and 25% by mass or less, more preferably 6% by mass or more and 25% by mass or less, still more preferably 8% by mass or more and 20% by mass or less, and particularly preferably 10% by mass or more and 15% by mass or less.

Further, preferred examples of the compound represented by the general formula (XIII-2) include compounds represented by formula (49.1) to formula (49.4), and particularly a compound represented by formula (49.2) is preferred.

[Chem. 156]

(49.1)
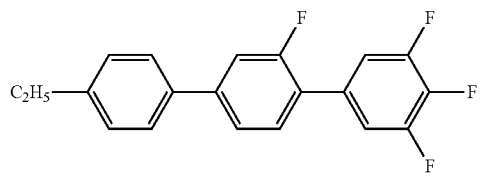

(49.2)
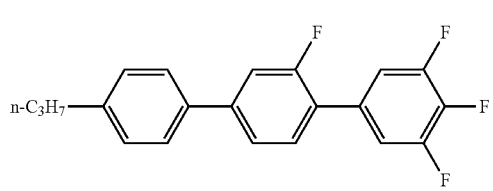

(49.3)
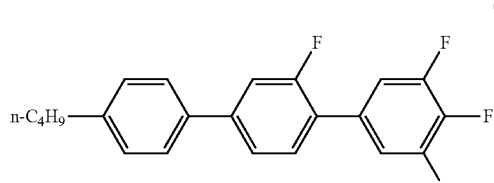

(49.4)
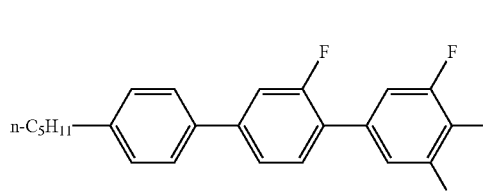

Further, the compound represented by the general formula (XIII) is preferably a compound represented by general formula (XIII-3).

[Chem. 157]

(XIII-3)
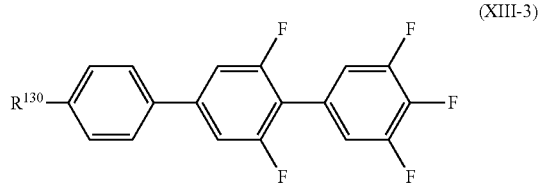

(In the formula, $R^{130}$ represents an alkyl group having 1 to 5 carbon atoms, an alkenyl group having 2 to 5 carbon atoms, or an alkoxy group having 1 to 4 carbon atoms.)

The types of compounds which can be combined are not particularly limited, but preferably one or two of a plurality of compounds represented by the general formula (XIII-3) is preferably contained.

The content of the compound represented by the general formula (XIII-3) relative to the total mass of the liquid crystal composition of the present invention is preferably 2% by mass or more and 20% by mass or less, more preferably 4% by mass or more and 20% by mass or less, still more preferably 9% by mass or more and 17% by mass or less, and particularly preferably 11% by mass or more and 14% by mass or less.

Further, preferred examples of the compound represented by the general formula (XIII-3) include compounds represented by formula (50.1) to formula (50.4), and particularly a compound represented by formula (50.1) or formula (50.2) is preferred.

[Chem. 158]

(50.1)
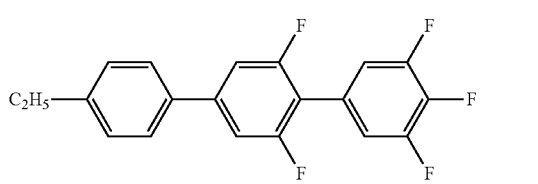

(50.2)
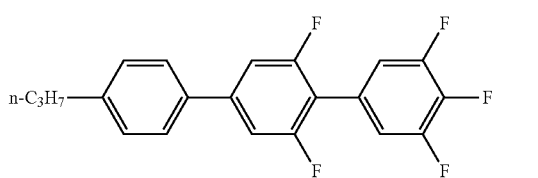

(50.3)
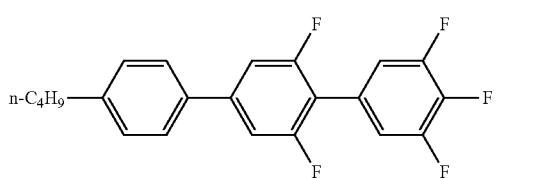

(50.4)
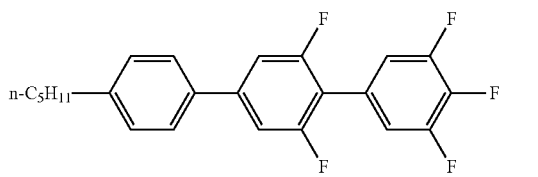

The compound represented by the general formula (M) is preferably a compound selected from a compound group represented by general formula (XIV). However, compounds represented by the general formula (i) are excluded.

[Chem. 159]

(XIV)
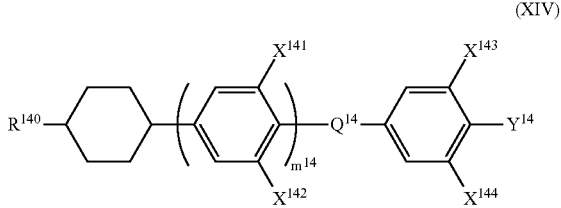

(In the formula, $R^{140}$ represents an alkyl group having 1 to 7 carbon atoms, an alkenyl group having 2 to 7 carbon atoms, or an alkoxy group having 1 to 7 carbon atoms, $X^{141}$ to $X^{144}$ each independently represent a fluorine atom or a hydrogen atom, $Y^{14}$ represents a fluorine atom, a chlorine atom, or —$OCF_3$, $Q^{14}$ represents a single bond, —COO—, or —$CF_2O$—, and $m^{14}$ represents 0 or 1.)

The types of compounds which can be combined are not limited, but a plurality of compounds represented by the general formula (XIV) can be properly used in combination according to each embodiment in view of solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6 or more.

In view of characteristics such as solubility at a low temperature, transition temperature, electric reliability, birefringence, etc., the content of a compound represented by the general formula (XIV) has an upper limit value and a lower limit value according to each embodiment.

For example, according to an embodiment of the present invention, the content of the compound relative to the total mass of the liquid crystal composition of the present invention is 3% to 40% by mass; according to another embodiment, the content of the compound is 7% to 40% by mass; according to still another embodiment, the content of the compound is 8% to 40% by mass; according to a further embodiment, the content of the compound is 11% to 40% by mass; according to a further embodiment, the content of the compound is 12% to 40% by mass; according to a further embodiment, the content of the compound is 16% to 40% by mass; according to a further embodiment, the content of the compound is 18% to 40% by mass; according to a further embodiment, the content of the compound is 19% to 40% by mass; according to a further embodiment, the content of the compound is 22% to 40% by mass; and according to a further embodiment, the content of the compound is 25% to 40% by mass.

Also, for example, according to an embodiment of the present invention, the content of the compound relative to the total mass is 3% to 40% by mass; according to another embodiment, the content of the compound is 3% to 35% by mass; according to still another embodiment, the content of the compound is 3% to 30% by mass; according to a further embodiment, the content of the compound is 3% to 25% by mass; according to a further embodiment, the content of the compound is 3% to 20% by mass; and according to a further embodiment, the content of the compound is 3% to 15% by mass.

When the liquid crystal composition of the present invention is used for a liquid crystal display device having a low drive voltage, it is desired to slightly increase the content of the compound represented by the general formula (XIV). When the liquid crystal composition of the present invention is used for a liquid crystal display device having fast response, it is desired to slightly decrease the content of the compound represented by the general formula (XIV).

Further, the compound represented by the general formula (XIV) is preferably a compound represented by general formula (XIV-1).

[Chem. 160]

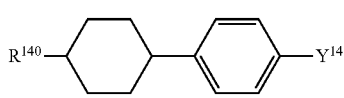

(XIV-1)

(In the formula, $R^{140}$ represents an alkyl group having 1 to 7 carbon atoms, an alkenyl group having 2 to 7 carbon atoms, or an alkoxy group having 1 to 7 carbon atoms, and $Y^{14}$ represents a fluorine atom, a chlorine atom, or —OCF$_3$.)

The type of compounds which can be combined are not limited, but a plurality of compounds represented by the general formula (XIV-1) can be properly used alone or in combination of two to three in view of solubility at a low temperature, transition temperature, electric reliability, birefringence, etc.

Further, the compound represented by the general formula (XIV-1) is preferably a compound represented by general formula (XIV-1-1).

[Chem. 161]

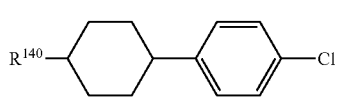

(XIV-1-1)

(In the formula, $R^{140}$ represents an alkyl group having 1 to 7 carbon atoms, an alkenyl group having 2 to 7 carbon atoms, or an alkoxy group having 1 to 7 carbon atoms.)

The content of the compound represented by the general formula (XIV-1) relative to the total mass of the liquid crystal composition of the present invention is preferably 2% by mass or more, more preferably 4% by mass or more, even more preferably 7% by mass or more, still more preferably 10% by mass or more, and particularly preferably 18% by mass or more. In addition, in view of solubility at a low temperature, transition temperature, electric reliability, etc., the maximum ratio is preferably limited to 30% by mass or less, more preferably 27% by mass or less, still more preferably 24% by mass or less, and particularly preferably less than 21% by mass.

Further, preferred examples of the compound represented by the general formula (XIV-1-1) include compounds represented by formula (51.1) to formula (51.4), and particularly a compound represented by formula (51.1) is preferred.

[Chem. 162]

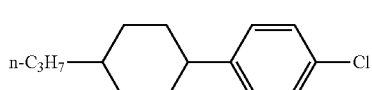

(51.1)

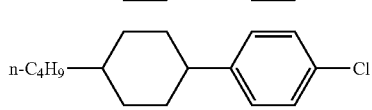

(51.2)

(51.3)

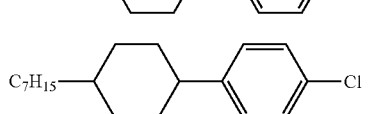

(51.4)

Further, the compound represented by the general formula (XIV-1) is preferably a compound represented by general formula (XIV-1-2).

[Chem. 163]

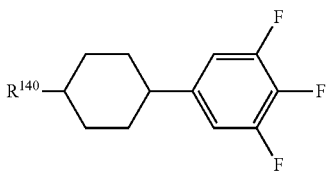

(XIV-1-2)

(In the formula, $R^{140}$ represents an alkyl group having 1 to 7 carbon atoms, an alkenyl group having 2 to 7 carbon atoms, or an alkoxy group having 1 to 7 carbon atoms.)

In view of solubility at a low temperature, transition temperature, electric reliability, etc., the content of the compound represented by the general formula (XIV-1-2) relative to the total mass of the liquid crystal composition of the present invention is preferably 1% by mass or more and 15% by mass or less, more preferably 3% by mass or more and 13% by mass or less, still more preferably 5% by mass or more and 11% by mass or less, and particularly preferably 7% by mass or more and 9% by mass or less.

Further, preferred examples of the compound represented by the general formula (XIV-1-2) include compounds represented by formula (52.1) to formula (52.4), and particularly a compound represented by formula (52.4) is preferably contained.

[Chem. 164]

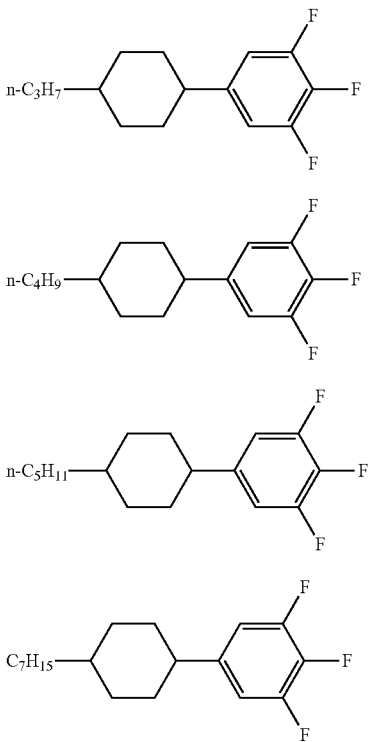

(52.1)

(52.2)

(52.3)

(52.4)

Further, the compound represented by the general formula (XIV) is preferably a compound represented by general formula (XIV-2). However, compounds represented by the general formula (i) are excluded.

[Chem. 165]

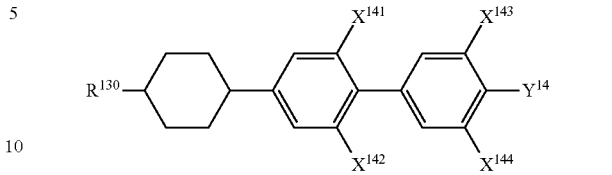

(XIV-2)

(In the formula, $R^{140}$ represents an alkyl group having 1 to 5 carbon atoms, an alkenyl group having 2 to 5 carbon atoms, or an alkoxy group having 1 to 4 carbon atoms, $X^{141}$ to $X^{144}$ each independently represent a fluorine atom or a hydrogen atom, and $Y^{14}$ represents a fluorine atom, a chlorine atom, or —$OCF_3$.)

The type of compounds which can be combined are not limited, but a plurality of compounds represented by the general formula (XIV-2) can be properly used in combination according to each embodiment in view of solubility at a low temperature, transition temperature, electric reliability, birefringence, etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5 or more.

In view of characteristics such as solubility at a low temperature, transition temperature, electric reliability, birefringence, etc., the content of a compound represented by the general formula (XIV-2) has an upper limit value and a lower limit value according to each embodiment.

For example, according to an embodiment of the present invention, the content of the compound relative to the total mass of the liquid crystal composition of the present invention is 3% to 40% by mass; according to another embodiment, the content of the compound is 7% to 40% by mass; according to still another embodiment, the content of the compound is 8% to 40% by mass; according to a further embodiment, the content of the compound is 10% to 40% by mass; according to a further embodiment, the content of the compound is 11% to 40% by mass; according to a further embodiment, the content of the compound is 12% to 40% by mass; according to a further embodiment, the content of the compound is 18% to 40% by mass; according to a further embodiment, the content of the compound is 19% to 40% by mass; according to a further embodiment, the content of the compound is 21% to 40% by mass; and according to a further embodiment, the content of the compound is 22% to 40% by mass.

Also, for example, according to an embodiment of the present invention, the content of the compound relative to the total mass is 3% to 40% by mass; according to another embodiment, the content of the compound is 3% to 35% by mass; according to still another embodiment, the content of the compound is 3% to 25% by mass; according to a further embodiment, the content of the compound is 3% to 20% by mass; according to a further embodiment, the content of the compound is 3% to 15% by mass; and according to a further embodiment, the content of the compound is 3% to 10% by mass.

When the liquid crystal composition of the present invention is used for a liquid crystal display device having a low drive voltage, it is desired to slightly increase the content of the compound represented by the general formula (XIV-2). When the liquid crystal composition of the present invention is used for a liquid crystal display device having fast response, it is desired to slightly decrease the content of the compound represented by the general formula (XIV-2).

Further, the compound represented by the general formula (XIV-2) is preferably a compound represented by general formula (XIV-2-1).

[Chem. 166]

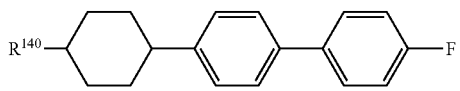

(XIV-2-1)

(In the formula, $R^{140}$ represents an alkyl group having 1 to 5 carbon atoms, an alkenyl group having 2 to 5 carbon atoms, or an alkoxy group having 1 to 4 carbon atoms.)

In view of solubility at a low temperature, transition temperature, electric reliability, etc., the content of the compound represented by the general formula (XIV-2-1) relative to the total mass of the liquid crystal composition of the present invention is preferably 1% by mass or more and 15% by mass or less, more preferably 3% by mass or more and 13% by mass or less, still more preferably 5% by mass or more and 11% by mass or less, and particularly preferably 7% by mass or more and 9% by mass or less.

Further, preferred examples of the compound represented by the general formula (XIV-2-1) include compounds represented by formula (53.1) to formula (53.4), and particularly a compound represented by formula (53.4) is preferably contained.

[Chem. 167]

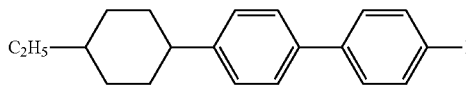

(53.1)

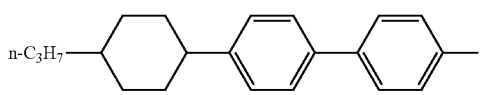

(53.2)

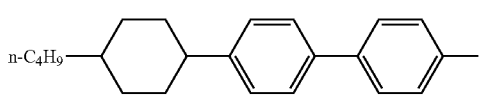

(53.3)

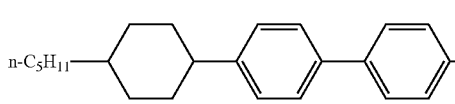

(53.4)

Each of the compounds used in the present invention does not have a peroxy acid (—CO—OO—) structure in its molecule. Also, when reliability and long-terms stability of the liquid crystal composition are regarded as important, it is desired not to use a compound having a carbonyl group.

In addition, when UV irradiation stability is regarded as important, it is desired not to use a compound substituted by a chlorine atom. It is also desired to use only compounds in which all ring structures in a molecule are six-member rings.

The liquid crystal composition of the present invention preferably does not contain a compound having, in its molecule, a structure, such as a peroxy acid (—CO—OO—) structure or the like, in which oxygen atoms are bonded to each other.

When reliability and long-term stability of the liquid crystal composition are regarded as important, the content of a compound having a carbonyl group is preferably 5% by mass or less, more preferably 3% by mass or less, still more preferably 1% by mass or less, and most preferably substantially zero, relative to the total mass of the composition.

When UV irradiation stability is regarded as important, the content of a compound substituted by a chlorine atom is preferably 15% by mass or less, more preferably 10% by mass or less, still more preferably 5% by mass or less, and most preferably substantially zero, relative to the total mass of the composition.

It is desired to increase the content of a compound in which all ring structures in its molecule are six-member rings, and the content of a compound in which all ring structures in its molecule are six-member rings is preferably 80% by mass or more, more preferably 90% by mass or more, and still more preferably 95% by mass or more relative to the total mass of the composition, and most preferably the liquid crystal composition includes substantially only compounds in which all ring structures in a molecule are six-member rings.

In order to suppress deterioration due to oxidation of the liquid crystal composition, it is preferred to decrease the content of a compound having a cyclohexenylene group as a ring structure, and the content of a compound having a cyclohexenylene group is preferably 10% by mass or less, more preferably 5% by mass or less, and still more preferably substantially zero, relative to the total mass of the composition.

When improvements in viscosity and Tni are regarded as important, it is preferred to decrease the content of a compound having, in its molecule, a 2-methylbenzene-1,4-diyl group which may be substituted by a halogen for a hydrogen atom, and the content of the compound having a 2-methylbenzene-1,4-diyl group in its molecule is preferably 10% by mass or less, more preferably 5% by mass or less, and still more preferably substantially zero, relative to the total mass of the composition.

When the composition according to the first embodiment of the present invention contains a compound having as a side chain an alkenyl group bonded to cyclohexane, the alkenyl group preferably has 2 to 5 carbon atoms, and when the alkenyl group is bonded to benzene, the alkenyl group preferably has 4 to 5 carbon atoms, and an unsaturated bond of the alkenyl group is preferably not directly bonded to benzene.

The liquid crystal composition of the present invention can contain a polymerizable compound in order to manufacture a liquid crystal display device of a PS mode, a horizontal electric field-type PSA mode, or a horizontal electric field-type PSVA mode. A photopolymerizable monomer subjected to polymerization that proceeds by energy rays such as light can be used as the polymerizable compound, and a polymerizable compound having as a structure a liquid crystal skeleton in which a plurality of six-member rings are connected together, for example, a biphenyl derivative, a terphenyl derivative, or the like, can be used. Preferred examples thereof include difunctional monomers represented by general formula (XX).

[Chem. 168]

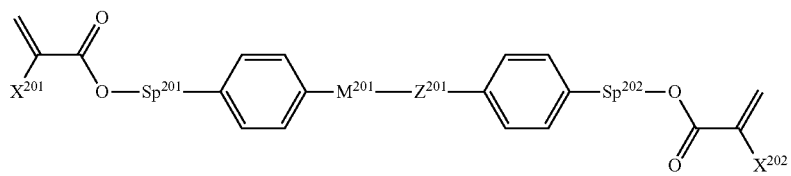

(XX)

(In the formula, $X^{201}$ and $X^{202}$ each independently represent a hydrogen atom or a methyl group, $Sp^{201}$ and $Sp^{202}$ each independently represent a single bond, an alkylene group having 1 to 8 carbon atoms, or —O—$(CH_2)_s$— (wherein s represents an integer of 2 to 7, and an oxygen atom is bonded to an aromatic ring), $Z^{201}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$—

(wherein $Y^1$ and $Y^2$ each independently represent a fluorine atom or a hydrogen atom), —C≡C—, or a single bond, $M^{201}$ represents a 1,4-phenylene group, a trans-1,4-cyclohexylene group, or a single bond, and all 1,4-phenylene groups in the formula may have a fluorine atom substituted for any desired hydrogen atom.)

Either a diacrylate derivative in which $X^{201}$ and $X^{202}$ both represent hydrogen atoms or a dimethacrylate derivative in which $X^{201}$ and $X^{202}$ both represent methyl groups is preferred, and a compound in which one of $X^{201}$ and $X^{202}$ represents a hydrogen atom, and the other represents a methyl group is also preferred. Among these compounds, the diacrylate derivative has the highest polymerization rate, the dimethacrylate derivative has a lower polymerization rate, and an asymmetric compound has a medium polymerization rate between them. A preferred form can be used according to application. The dimethacrylate derivative is particularly preferred for a PSA display device.

$Sp^{201}$ and $Sp^{202}$ each independently represent a single bond, an alkylene group having 1 to 8 carbon atoms, or —O—$(CH_2)_s$—, but at least one of $Sp^{201}$ and $Sp^{202}$ is preferably a single bond for a PSA display device. Specifically, a compound in which $Sp^{201}$ and $Sp^{202}$ both represent single bonds or a form in which one represents a single bond, and the other represents an alkylene group having 1 to 8 carbon atoms, or —O—$(CH_2)_s$— is preferred. In this case, a 1-4 alkyl group is preferred, and s is preferably 1 to 4.

$Z^{201}$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, and particularly preferably a single bond.

$M^{201}$ represents a 1,4-phenylene group in which any hydrogen atom may be substituted by a fluorine atom, a trans-1,4-cyclohexylene group, or a single bond, but a 1,4-phenylene group or a single bond is preferred. When $M^{201}$ represents a ring structure other than a single bond, $Z^{201}$ is also preferably a linkage group other than a single bond, and when $M^{201}$ is a single bond, $Z^{201}$ is preferably a single bond.

In view of the above, specifically, a ring structure between $Sp^{201}$ and $Sp^{202}$ in the general formula (XX) is preferably a structure described below.

In the general formula (XX), when $M^{201}$ represents a single bond, and the ring structure includes two rings, formula (XXa-1) to formula (XXa-5) are preferred, formula (XXa-1) to formula (XXa-3) are more preferred, and formula (XXa-1) is particularly preferred.

[Chem. 169]

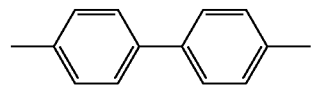

(XXa-1)

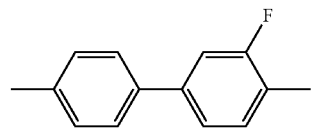

(XXa-2)

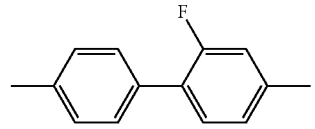

(XXa-3)

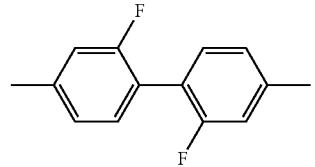

(XXa-4)

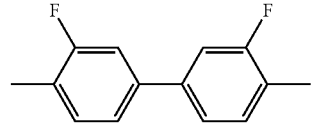

(XXa-5)

(In the formulae, each end is bonded to $Sp^{201}$ or $Sp^{202}$.)

A polymerizable compound having such a skeleton has, after polymerization, alignment regulating force optimum for a PSA-mode liquid crystal display device, and thus a good alignment state can be achieved, thereby suppressing display unevenness or causing no display unevenness.

In view of the above, polymerizable monomers of general formula (XX-1) to general formula (XX-4) are particularly preferred, and general formula (XX-2) is most preferred.

[Chem. 170]

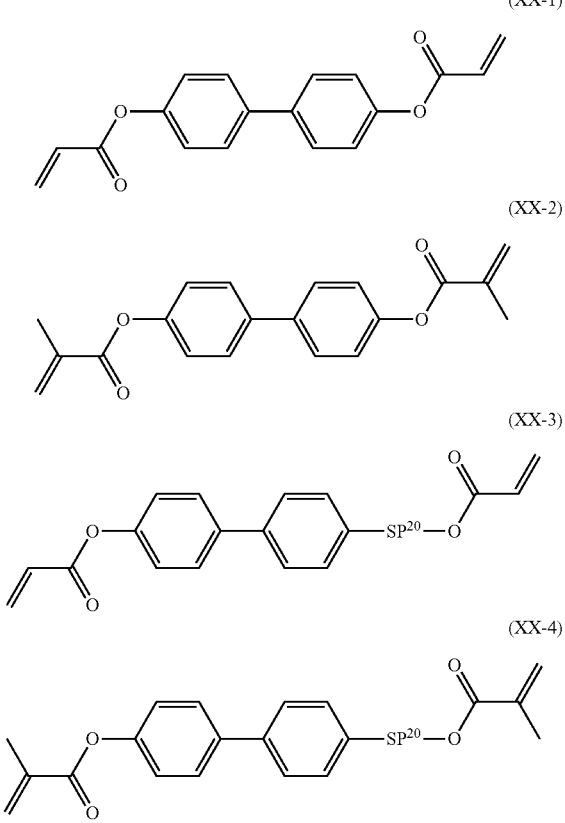

(XX-1)

(XX-2)

(XX-3)

(XX-4)

(In the formulae, Sp$^{20}$ represents an alkylene group having 2 to 5 carbon atoms.)

When the monomer is added to the liquid crystal composition of the present invention, polymerization proceeds even in the absence of a polymerization initiator, but the polymerization initiator may be added for accelerating polymerization. Examples of the polymerization initiator include benzoin ethers, benzophenones, acetophenones, benzylketals, acylphosphine oxides, and the like.

The liquid crystal composition of the present invention can further contain a compound represented by general formula (Q).

[Chem. 171]

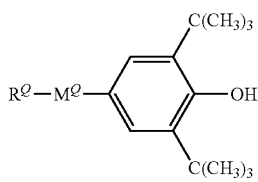

(Q)

(In the formula, R$^Q$ represents a linear alkyl or branched alkyl group having 1 to 22 carbon atoms, one or two or more CH$_2$ groups in the alkyl group may be substituted by —O—, —CH═CH—, —CO—, —OCO—, —COO—, —C≡C—, —CF$_2$O—, or OCF$_2$— so that oxygen atoms do not directly adjacent to each other, and M$^Q$ represents a trans-1,4-cyclohexylene group, a 1,4-phenylene group, or a single bond.)

R$^Q$ represents a linear alkyl or branched alkyl group having 1 to 22 carbon atoms, and one or two or more CH$_2$ groups in the alkyl group may be substituted by —O—, —CH═CH—, —CO—, —OCO—, —COO—, —C≡C—, —CF$_2$O—, or OCF$_2$— so that oxygen atoms do not directly adjacent to each other. However, a linear alkyl group having 1 to 10 carbon atoms, a linear alkoxy group, a linear alkyl group in which one CH$_2$ group is substituted by —OCO— or —COO—, a branched alkyl group, a branched alkoxy group, and a branched alkyl group in which one CH$_2$ group is substituted by —OCO— or —COO— are preferred, and a linear alkyl group having 1 to 20 carbon atoms, a linear alkyl group in which one CH$_2$ group is substituted by —OCO— or —COO—, a branched alkyl group, a branched alkoxy group, and a branched alkyl group in which one CH$_2$ group is substituted by —OCO— or —COO— are more preferred. M$^Q$ represents a trans-1,4-cyclohexylene group, a 1,4-phenylene group, or a single bond, but a trans-1,4-cyclohexylene group or a 1,4-phenylene group is preferred.

Preferred examples of the compound represented by the general formula (Q) include compounds represented by general formula (Q-a) to general formula (Q-d) below.

[Chem. 172]

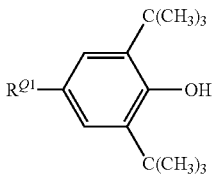

(Q-a)

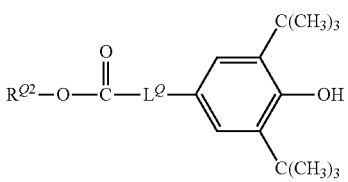

(Q-b)

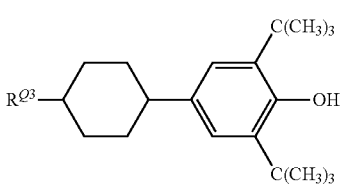

(Q-c)

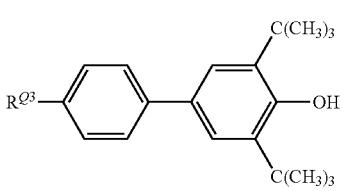

(Q-d)

In the formulae, R$^{Q1}$ is preferably a linear alkyl or branched alkyl group having 1 to 10 carbon atoms, R$^{Q2}$ is preferably a linear alkyl or branched alkyl group having 1 to 20 carbon atoms, R$^{Q3}$ is preferably a linear alkyl or branched alkyl group having 1 to 8 carbon atoms, a linear alkoxy group, or a branched alkoxy group, L$^Q$ is preferably a linear alkylene or branched alkylene group having 1 to 8 carbon atoms. Among compounds represented by the general formula (Q-a) to the general formula (Q-d), compounds represented by the general formula (Q-c) and the general formula (Q-d) are more preferred.

The liquid crystal composition of the present invention preferably contains one or two compounds and more preferably one to five compounds represented by the general formula (Q), and the content thereof is preferably 0.001% to 1% by mass, more preferably 0.001% to 0.1% by mass, and particularly preferably 0.001% to 0.05% by mass.

<Liquid Crystal Display Device>

The liquid crystal composition containing the polymerizable compound of the present invention is imparted with a liquid crystal alignment ability when the polymerizable compound contained is polymerized by irradiation with ultraviolet light, and is used for a liquid crystal display device in which a quantity of light transmitted is controlled by using birefringence of the liquid crystal composition. The liquid crystal composition is useful for liquid crystal display devices, such as ECB-LCD, VA-LCD, FFS-LCD, AM-LCD (active matrix liquid crystal display device), TN (nematic liquid crystal display device), STN-LCD (super twisted nematic liquid crystal display device), OCB-LCD, and IPS-LCD (in-plane switching liquid crystal display device), particularly useful for AM-LCD, and can be used for transmissive or reflective liquid crystal display devices.

Two substrates of a liquid crystal cell used in a liquid crystal display device can be formed by using a transparent material with flexibility, such as glass or plastic, and one of the two substrates may be made of an opaque material such as silicon or the like. A transparent substrate including a transparent electrode layer can be formed by, for example, sputtering indium tin oxide (ITO) on a transparent substrate such as a glass plate or the like.

A color filter can be formed by, for example, a pigment dispersion method, a printing method, an electrodeposition method, a dyeing method, or the like. The method for forming a color filter by the pigment dispersion method is described as an example. A curable colored composition for a color filter is applied on the transparent substrate, patterned, and then cured by heating or light irradiation. This process is performed for each of the three colors of red, green, and blue, thereby forming a pixel portion for a color filter. In addition, a pixel electrode provided with an active element such as TFT, a thin-film diode, or the like may be installed on the substrate.

The substrates are opposed to each other so that the transparent electrode layers face inward. In this case, the gap between the substrates may be adjusted through spacers. The resulting light control layer is preferably adjusted to have a thickness of 1 to 100 μm. The thickness is more preferably 1.5 to 10 μm, and when a polarizing plate is used, the product of refractive index anisotropy Δn of a liquid crystal and cell thickness d is preferably adjusted to maximize contrast. When two polarizing plates are used, an angle of view and contrast can be improved by adjusting the polarizing axis of each of the polarizing plates. Further, a retardation film can be used for widening the angle of view. Examples of the spacers include glass particles, plastic particles, alumina particles, columnar spacers made of a photoresist material, and the like. Then, a sealing agent such as an epoxy-based heat-curable composition or the like is screen-printed in a form having a liquid crystal inlet on each of the substrates, the substrates are bonded together, and then the sealing agent is thermally cured by heating.

A usual vacuum injection method or ODF method can be used as a method for holding the liquid crystal composition containing the polymerizable compound between the substrates. However, the vacuum injection method has the problem of leaving injection marks, instead of causing dropping marks. The present invention can preferably use the ODF method in a process for manufacturing a liquid crystal display device. In the process for manufacturing a liquid crystal display device using the ODF method, the liquid crystal display device can be manufactured by applying an epoxy-based light/heat curable sealing agent on a substrate of either a back plane or a front plane by using a dispenser to draw a closed loop bank-like shape, dropping a predetermined amount of the liquid crystal composition in the shape under deaeration, and then bonding together the front plane and the back plane are bonded. The liquid crystal composition of the present invention can be stably dropped in the ODF step and thus can be preferably used.

Since an appropriate polymerization rate is desired for achieving good liquid crystal-aligning performance, a preferred method of polymerizing the polymerizable compound is a polymerization method in which the compound is polymerized by irradiation with one or combination of two or more of active energy rays such as ultraviolet light, electron beams, and the like, or by sequential irradiation with these active energy rays. When ultraviolet light is used, either a polarized light source or an unpolarized light source may be used. When the liquid crystal composition containing the polymerizable compound is polymerized in a state of being held between the two substrates, at least the substrate on the irradiation surface side must be imparted with proper transparency to the active energy rays. In addition, another method may be used, in which only a specified portion is polymerized by using a mask during light irradiation, and then the alignment state of an unpolymerized portion is changed by changing a condition such as an electric field, a magnetic field, or a temperature, followed by further polymerization by irradiation with active energy rays. In particular, ultraviolet exposure is preferably performed by applying an alternating-current electric field to the liquid crystal composition containing the polymerizable compound. The alternating-current electric field is preferably applied with an alternating current at a frequency of 10 Hz to 10 kHz, more preferably a frequency of 60 Hz to 10 kHz, and a voltage selected depending on a desired pre-tilt angle of the liquid crystal display device. That is, the pre-tilt angle of the liquid crystal display device can be controlled by the voltage applied. In a horizontal electric field-type MVA-mode liquid crystal display device, the pre-tilt angle is preferably controlled to 80 degrees to 89.9 degrees from the viewpoint of alignment stability and contrast.

The temperature during irradiation preferably falls in a temperature range in which the liquid crystal state of the liquid crystal composition of the present invention can be maintained. Polymerization is preferably performed at a temperature close to room temperature, typically a temperature of 15° C. to 35° C. A metal halide lamp, a high-pressure mercury lamp, a superhigh-pressure mercury lamp, or the like can be used as a lamp which generates ultraviolet light. With respect to a wavelength of irradiating ultraviolet light, irradiation with ultraviolet light within a wavelength region which is not an absorption wavelength region of the liquid crystal composition is preferred, and if required, ultraviolet light is preferably partially cut off. The intensity of irradiating ultraviolet light is preferably 0.1 mW/cm$^2$ to 100 W/cm$^2$ and more preferably 2 mW/cm$^2$ to 50 W/cm$^2$. A quantity of irradiating ultraviolet light energy can be appropriately adjusted, but it is preferably 10 mJ/cm$^2$ to 500 J/cm$^2$, and more preferably 100 mJ/cm$^2$ to 200 J/cm$^2$. During ultraviolet irradiation, the intensity may be changed. The time required for ultraviolet irradiation is appropriately selected according to the intensity of irradiating ultraviolet light, but is preferably 10 seconds to 3600 seconds and more preferably 10 seconds to 600 seconds.

The liquid crystal display device using the liquid crystal composition of the present invention satisfies both fast response and the suppression of display defects and is useful, particularly useful for liquid crystal display devices for active matrix driving, and can be used for liquid crystal display devices for a VA mode, a PSVA mode, a PAS-mode, an IPS (in-plane switching) mode, a FFS (fringe field switching) mode, or an ECB mode.

A liquid crystal display device (liquid crystal display) according to a preferred embodiment of the present invention is described in detail below with reference to the drawings.

FIG. 1 is a sectional view showing a liquid crystal display device including two opposed substrates, a sealing material provided between the substrates, and a liquid crystal sealed in a sealing region surrounded by the sealed material.

Specifically, the liquid crystal display device shown has a specified form in which a back plane formed by providing thereon a TFT layer 102 and a pixel electrode 103 on a first substrate 100 and further providing a passivation film 104 and a first alignment film 105 is opposed to a front plane formed by providing on a second substrate 200 a black matrix 202, a color filter 203, a planarization film (overcoat film) 201, and a transparent electrode 204 and then providing a second alignment film 205 thereon. Further, a sealing material 301 is provided between the substrates, a liquid crystal layer 303 is provided to be sealed in a sealed region surrounded by the sealing material, and projections (columnar spacers) 302 and 304 are provided on the substrate surface in contact with the sealing material 301.

The material of the first substrate or the second substrate is not particularly limited as long as it is substantially transparent, and glass, ceramics, plastics, and the like can be used. Materials which can be used for a plastic substrate include cellulose derivatives such as cellulose, triacetyl cellulose, diacetyl cellulose, and the like; polycycloolefin derivatives; polyesters such as polyethylene terephthalate, polyethylene naphthalate, and the like; polyolefins such as polypropylene, polyethylene, and the like; polycarbonate, polyvinyl alcohol, polyvinyl chloride, polyvinylidene chloride, polyamide, polyimide, polyimide-amide, polystyrene, polyacrylate, polymethyl methacrylate, polyether sulfone, polyarylate, inorganic-organic composite materials such as glass fiber-epoxy resin, glass fiber-acrylic resin, and the like.

When a plastic substrate is used, a barrier film is preferably provided. The function of the barrier film is to decrease the moisture permeability possessed by the plastic substrate to improve the reliability of electric characteristics of the liquid crystal display device. The barrier film is not particularly limited as long as it has high transparency and low water-vapor permeability, and a thin film formed by vapor deposition, sputtering, or chemical vapor deposition (CVD method) using an inorganic material such as silicon dioxide or the like is generally used.

In the present invention, the materials used for the first substrate and the second substrate are not particularly limited and may be the same or different. A glass substrate is preferred because the liquid crystal display device having excellent heat resistance and dimensional stability can be manufactured. Also, a plastic substrate is preferred because it is suitable for a manufacturing method by a roll-to-roll method and also suitable for weight lightening or flexibilizing. In addition, for the purpose of imparting flatness and heat resistance, good results can be obtained by a combination of a plastic substrate and a glass substrate.

In examples described below, a substrate is used as a material of the first substrate 100 or the second substrate 200.

The back plane includes the TFT layer 102 and the pixel electrode 103 provided on the first substrate 100. These are produced by a usual array process. The passivation film 104 and the first alignment film 105 are provided thereon to produce the back plane.

The passivation film 104 (also referred to as the inorganic protective film) is a film for protecting the TFT layer, and a nitride film ($SiN_x$), an oxide film ($SiO_x$), or the like is generally formed by a chemical vapor deposition (CVD) technique or the like.

The first alignment film 105 is a film having the function to align a liquid crystal, and a polymer material such as polyimide is generally used in many cases. An alignment agent solution including a polymer material and a solvent is used as a coating solution. The alignment film may inhibit adhesive force with the sealing material, and is thus formed by pattern application within the sealed region. The application is performed by using a printing method such as a flexographic printing method or a droplet discharge method such as ink jet. The applied alignment agent solution is pre-dried to evaporate the solvent, and then cross-linked and cured by baking. Then, alignment treatment is performed for causing an alignment function.

The alignment treatment is generally performed by a rubbing method. The polymer film formed as described above is rubbed in one direction with a rubbing cloth composed of fibers such as rayon to cause a liquid crystal aligning function.

Also, an optical alignment method may be used. The optical alignment method is a method of producing the alignment function by irradiating an alignment film containing an organic material having photosensitivity with polarized light without causing flaws or dust on the substrate due to rubbing. An example of the organic material used in the optical alignment method is a material containing a dichroic dye. A dye which can be used as the dichroic dye is a dye having a group (hereinafter abbreviated as an "optical alignment group") which produces photoreaction serving as an origin of the liquid crystal alignment function, such as molecular alignment induction or isomerization reaction by a Weigert effect due to photodichroism (for example, an azobenzene group), dimerization reaction (for example, a cinnamoyl group), photo-crosslinking reaction (for example, a benzophenone group), or photodecomposition reaction (for example, a polyimide group). The applied alignment agent solution is pre-dried to evaporate the solvent and then irradiated with light (polarized light) having any desired polarization to produce an alignment film having the alignment function in a desired direction.

On the other hand, the front plane includes the black matrix 202, the color filter 203, the planarization film 201, the transparent electrode 204, and the second alignment film 205 which are provided on the second substrate 200.

The black matrix 202 is formed by, for example, a pigment dispersion method. Specifically, a color resin solution containing a black colorant uniformly dispersed therein for forming the black matrix is applied to the second substrate 200 provided with the barrier film 201 to form a color layer. Then, the color layer is cured by baking. Then, photoresist is applied to the color layer and then pre-baked. The photoresist is exposed to light through a mask pattern, and then the color layer is patterned by development. Then, the photoresist layer is removed, and the color layer is baked to complete the black matrix 202.

Alternatively, a photoresist-type pigment dispersion may be used. In this case, the photoresist-type pigment dispersion is applied, pre-baked, and then exposed to light through a mask pattern, and then the color layer is patterned by development. Then, the photoresist layer is removed, and the color layer is baked to complete the black matrix 202.

The color filter 203 is formed by a pigment dispersion method, an electrodeposition method, a printing method, or a dyeing method. For example, in the pigment dispersion method, a color resin solution containing a (for example, red) pigment uniformly dispersed therein is applied to the second substrate 200 and cured by baking, and then a photoresist is applied thereon and pre-baked. The photoresist is exposed to light through a mask pattern and patterned by development. Then, the photoresist layer is removed, and baking is again performed to complete the (red) color filter 203. The order of the colors to be formed is not particularly limited. Similarly, a green color filter 203 and a blue color filter 203 are formed.

The transparent electrode 204 is provided on the color filter 203 (if required, the overcoat layer (201) is provided on the color filter 203 in order to planarize the surface). The transparent electrode 204 preferably has as high transmittance as possible and as low electric resistance as possible. The transparent electrode 204 is formed by a sputtering method of forming an oxide film such as ITO or the like.

Also, for the purpose of protecting the transparent electrode 204, the passivation film may be provided on the transparent electrode 204.

The second alignment film 205 is the same as the first alignment film 105 described above.

The specific configurations of the back plane and the front plane used in the present invention are described above, but the present invention is not limited to the specific configurations, and modification in the configurations can be freely made according to a desired liquid crystal display device.

The shape of the columnar spacers is not particularly limited, and the horizontal section thereof can be formed in any one of various shapes such as a circular shape, polygonal shapes, e.g., a tetragonal shape, and the like. However, in view of a misalignment margin in a process, the horizontal section particularly preferably has a circular shape or a regular polygonal shape. Also, the projection shape is preferably a truncated conical shape or a truncated pyramidal shape.

The material of the columnar spacers is not particularly limited as long as it is undissolved in the sealing material, the organic solvent used in the sealing material, or the liquid crystal, but a synthetic resin (curable resin) is preferred from the viewpoint of processing and weight lightening. On the other hand, the projections can be provided on the surface of the first substrate in contact with the sealing material by a photolithography method or a droplet discharge method. For this reason, a photocurable resin suitable for the photolithography method or droplet discharge method is preferably used.

Figure 2:
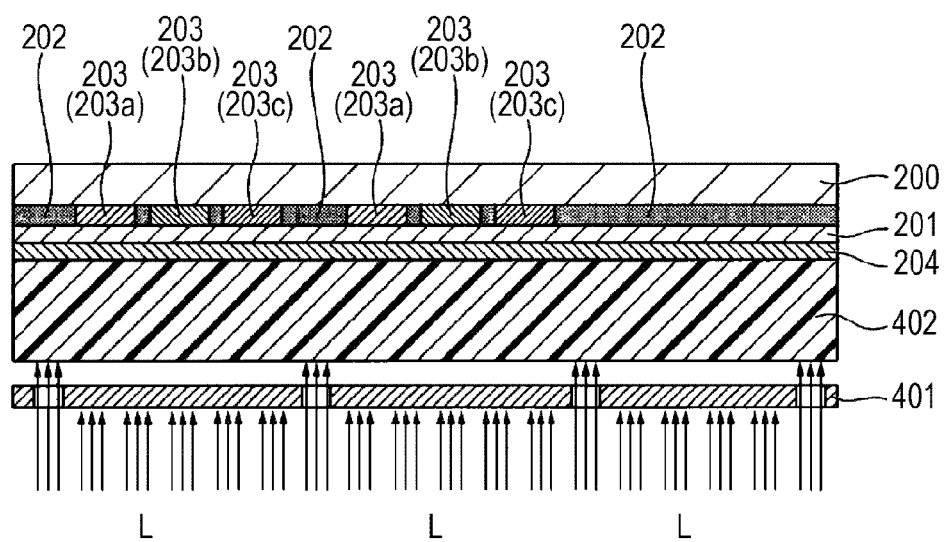
FIG. 2 is a drawing of an exposure step using, as a photomask pattern, a pattern for forming columnar spacers on a black matrix.

A case where the columnar spacers are formed by the photolithography method is described as an example. FIG. 2 is a drawing of an exposure step using, as a photomask pattern, a pattern for forming columnar spacers on a black matrix.

A resin solution (not containing a colorant) for forming the columnar spacers is applied to the transparent electrode 204 of the front plane. Then, a resin layer 402 is cured by baking. Then, a photoresist is applied to the resin layer and pre-baked. The photoresist is exposed to light through a mask pattern 401, and then the resin layer is patterned by development. Then, the photoresist layer is removed, and the resin layer is baked to complete columnar spacers (302 and 304 in FIG. 1).

The formation positions of the columnar spacers can be determined to desired positions by the mask pattern. Therefore, both the inside of the sealed region and the outside (sealing material applied portion) of the sealing region of the liquid crystal display device can be simultaneously formed. Also, the columnar spacers are preferably formed at positions on the black matrix so as not to degrade the quality of the sealed region. The columnar spacers formed by the photolithography method may be referred to as "column spacers" or "photo-spacers".

A mixture containing a negative water-soluble resin, such as a PVA-stilbazo photosensitive resin or the like, a polyfunctional acrylic monomer, an acrylic acid copolymer, a triazole-based initiator, etc. is used as the material of the columnar spacers. Another method uses a color resin prepared by dispersing a colorant in a polyimide resin. In the present invention, the material is not particularly limited, and the spacers can be formed by using a known material according to compatibility with the liquid crystal and sealing material used.

After the columnar spacers are provided on the surface serving as the sealed region on the front plane as described above, the sealing material (301 in FIG. 1) is applied to the surface of the back plane which comes in contact with the sealing material.

The material of the sealing material is not particularly limited, and a curable resin composition prepared by adding a polymerization initiator to an epoxy-based or acrylic photo-curable, heat-curable, or photo-heat-curable resin is used. Also, in order to control moisture permeability, elastic modulus, and viscosity, a filler composed of an inorganic or organic substance may be added. Examples of the shape of the filler include, but not particularly limited to, a spherical shape, a fibrous shape, an amorphous shape, and the like. Further, a spherical or fibrous gap material having a monodisperse diameter may be mixed for controlling a good cell gap, or a fibrous material which is easily entangled with projections on the substrate may be mixed for more enhancing the adhesive force to the substrate. In this case, the diameter of the fibrous material used is preferably about $1/5$ to $1/10$ or less of the cell gap, and the length of the fibrous material is preferably shorter than the width of the seal applied.

The material of the fibrous material is not particularly limited as long as a predetermined shape can be formed, and can be properly selected from synthetic fibers such as cellulose, polyamide, polyester, and like, and inorganic materials such as glass, carbon, and the like.

The method for applying the sealing material is a printing method or a dispensing method, and the dispensing method is preferred because of a small amount of the sealing material used. The application position of the sealing material is generally a position on the black matrix so as to avoid an adverse effect on the sealed region. In order to form a liquid crystal dropping region in the next step (to avoid leakage of the liquid crystal), the shape of the sealing material applied is a closed-loop shape.

The liquid crystal is dropped in the closed-loop shape (sealed region) of the front plane to which the sealing material has been applied. Usually, a disperser is used. In order to allow the amount of the liquid crystal dropped to coincide with the volume of a liquid crystal cell, the amount of the liquid crystal dropped is basically the same as the volume determined by multiplying the height of the columnar spacers by the area of the seal applied. In order to optimize a liquid crystal leakage in a cell bonding step and display characteristics, the amount of the liquid crystal dropped may be properly adjusted, or liquid crystal dropping positions may be dispersed.

Next, the back plane is bonded to the front plane on which the sealing material has been applied, and the liquid crystal has been dropped. Specifically, the front plane and the back plane are attracted to a stage having a mechanism of attracting a substrate, such as an electrostatic chuck, to be arranged at a position (distance) where the second alignment film of the front plane faces the first alignment film of the back plane, and the sealing agent does not contact the other substrate. In this state, the pressure in the system is reduced. After the completion of pressure reduction, the positions of both substrates are adjusted (alignment operation) while the bonding position between the front plane and the back plane is confirmed. After the adjustment of the bonding position is completed, the substrates are brought near to each other to a position where the sealing material on the front plane is in contact with the back plane. In this state, the system is filled with inert gas to return the pressure to atmospheric pressure while gradually releasing the reduced pressure. In this case, the front plane and the back plane are bonded together by the atmospheric pressure to form a cell gap corresponding to the height of the columnar spacers. In this state, the sealing material is cured by irradiation with ultraviolet light to form a liquid crystal cell. Then, in some cases, a heating step is added to accelerate curing of the sealing material. In order to enhance adhesion of the sealing material and improve reliability of electric characteristics, the heating step is often added.

EXAMPLES

The present invention is described in further detail below by way of examples, but the present invention is not limited to these examples. In the examples and comparative examples below, "%" in a composition represents "% by mass".

The characteristics measured in the examples are as follows.

Tni: nematic-isotropic liquid phase transition temperature (° C.)

Δn: refractive index anisotropy at 295K (sometimes called birefringence)

Δ∈: dielectric anisotropy at 295K

η: viscosity at 295K (mPa·s)

γ1: rotational viscosity at 295K (mPa·s)

Initial voltage holding ratio (initial VHR); voltage holding ratio (%) at 50° C. under the conditions of a frequency of 60 Hz and an applied voltage of 4 V Voltage holding ratio after heating (VHR after heating); voltage holding ratio (%) measured under the same conditions as for initial VHR after heating in an atmosphere of 150° C. for 1 hour <Evaluation of Image Sticking>

Image sticking of a liquid crystal display device was evaluated by display of a predetermined fixed pattern within a display area for 1440 hours and then uniform display over the entire screen to visually observe the level of residual image of the fixed pattern based on the following four levels:

A: No residual image
B: Slight residual image at an allowable level
C: Residual image at an unallowable level
D: Significant residual image <Evaluation of Volatility (Contamination of Manufacturing Apparatus)>

Volatility of a liquid crystal material was evaluated by observing operating conditions of a vacuum stirring-defoaming mixer under lighting with a stroboscope and visually observing foaming of the liquid crystal material. Specifically, 0.15 kg of the liquid crystal material was placed in a dedicated vessel of the vacuum stirring-defoaming mixer with a volume of 0.5 L, and the vacuum stirring defoaming mixer was operated at a revolution speed of 15 $S^{-1}$ and a rotation speed of 7.5 $S^{-1}$ under deaeration at 4 kPa to determine a time required until the start of foaming based on the following four levels.

A: Three minutes or more were required until foaming, causing the low possibility of apparatus contamination by evaporation B: One minute or more and less than 3 minutes were required until foaming, causing the possibility of slight apparatus contamination by evaporation C: Thirty seconds or more and less than 1 minute were required until foaming, causing the occurrence of apparatus contamination by evaporation D: Less than thirty seconds were required until foaming, causing the possibility of significant apparatus contamination by evaporation <Evaluation of Process Adaptability>

Process adaptability was evaluated by, in the ODF process, dropping 40 pL of liquid crystal each 100000 times using a constant-volume measuring pump to measure a change in amount of the liquid crystal dropped 200 times during each of 0 to 200 times, 201 to 400 times, 401 to 600 times, . . . 99801 to 100000 times dropping based on the following four levels:

A: Very small change (enabling stable manufacture of a liquid crystal display device)

B: Slight change at an allowable level

C: Change at an unallowable level (degrading yield due to the occurrence of spots)

D: Significant change (causing liquid crystal leakage or vacuum foaming)

<Evaluation of Solubility at Low Temperature>

Solubility at a low temperature was evaluated by, after preparing a liquid crystal composition, weighing 0.5 g of the liquid crystal composition in a 1-mL sample bottle, and continuously changing the temperature in a cycle of −20° C. (kept for 1 hour), temperature rise (0.2° C./min), 0° C. (kept for 1 hour), temperature rise (0.2° C./min) 20° C. (kept for 1 hour), temperature drop (−0.2° C./min), 0° C. (kept for 1 hour), temperature drop (−0.2° C./min), and −20° C. to visually observe the occurrence of precipitates of the liquid crystal composition based on the following four levels:

A: No precipitates were observed for 600 hours or more
B: No precipitates were observed for 300 hours or more
C: Precipitates were observed within 150 hours
D: Precipitates were observed within 75 hours Example 1 and Comparative Examples 1 and 2

Compositions were prepared by using compounds represented by chemical formulae below, and physical properties thereof were measured. The results are shown in Table 1.

[Chem. 173]

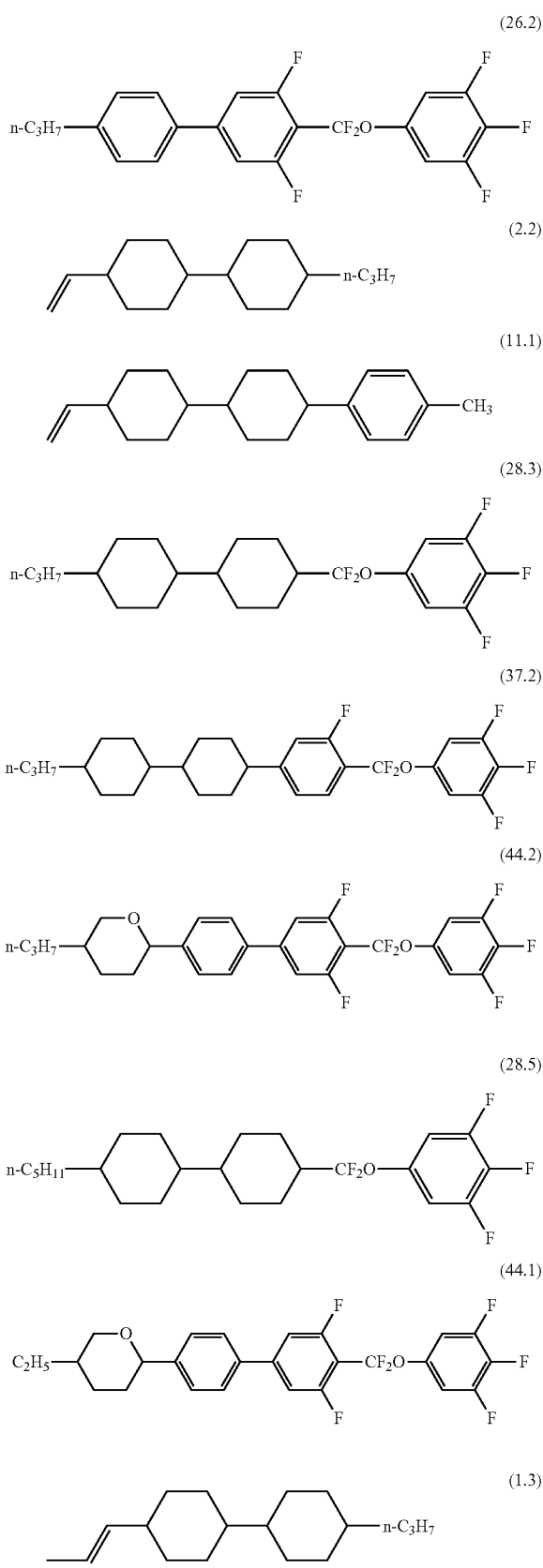

TABLE 1

|  | Example 1 | Comparative Example 1 | Comparative Example 2 |
|---|---|---|---|
| Tni (° C.) | 85.0 | 79.2 | 79.4 |
| Δn | 0.098 | 0.094 | 0.100 |
| Δε | 10.1 | 9.9 | 10.7 |
| η (mPa · s) | 17 | 16 | 17 |
| γ1 (mPa · s) | 99 | 92 | 100 |
| Formula (26.2) | 15 | 15 | 15 |
| Formula (2.2) | 30 | 30 | 30 |
| Formula (11.1) | 20 | 20 | 20 |
| Formula (28.3) | 5 | 10 | 5 |
| Formula (37.2) | 5 | 0 | 5 |
| Formula (44.2) | 5 | 5 | 0 |
| Formula (28.5) | 10 | 10 | 10 |
| Formula (44.1) | 5 | 5 | 0 |
| Formula (1.3) | 5 | 5 | 5 |
| Formula (45.2) | 0 | 0 | 10 |

In Table 1, a numerical value of each of the formulae represents a ratio (unit: % by mass) of each of the compounds contained in each composition.

Comparative Example 1 is a liquid crystal composition containing a compound represented by the formula (28.3) substituted for a compound (compound represented by the formula (37.2)) contained in a liquid crystal composition of Example 1 and represented by the general formula (i). Comparing physical property values of Example 1 with those of Comparative Example 1, Tni is decreased by removing the compound represented by the general formula (i). Therefore, Example 1 has a higher Tni temperature and can be used over a wider temperature range.

Comparative Example 2 is a liquid crystal composition containing a compound represented by the formula (45.2) substituted for compounds (compounds represented by the formula (44.1) and the formula (44.2)) contained in the liquid crystal composition of Example 1 and represented by the general formula (ii). Comparing the results of Example 1 with those of Comparative Example 2, Tni is greatly decreased by removing the compounds represented by the general formula (ii), and further Δn and Δε are increased, while a value of γ1 is increased.

Examples 2 to 4

Compositions were prepared by using compounds represented by chemical formulae below, and physical properties thereof were measured. The results are shown in Table 2.

[Chem. 174]

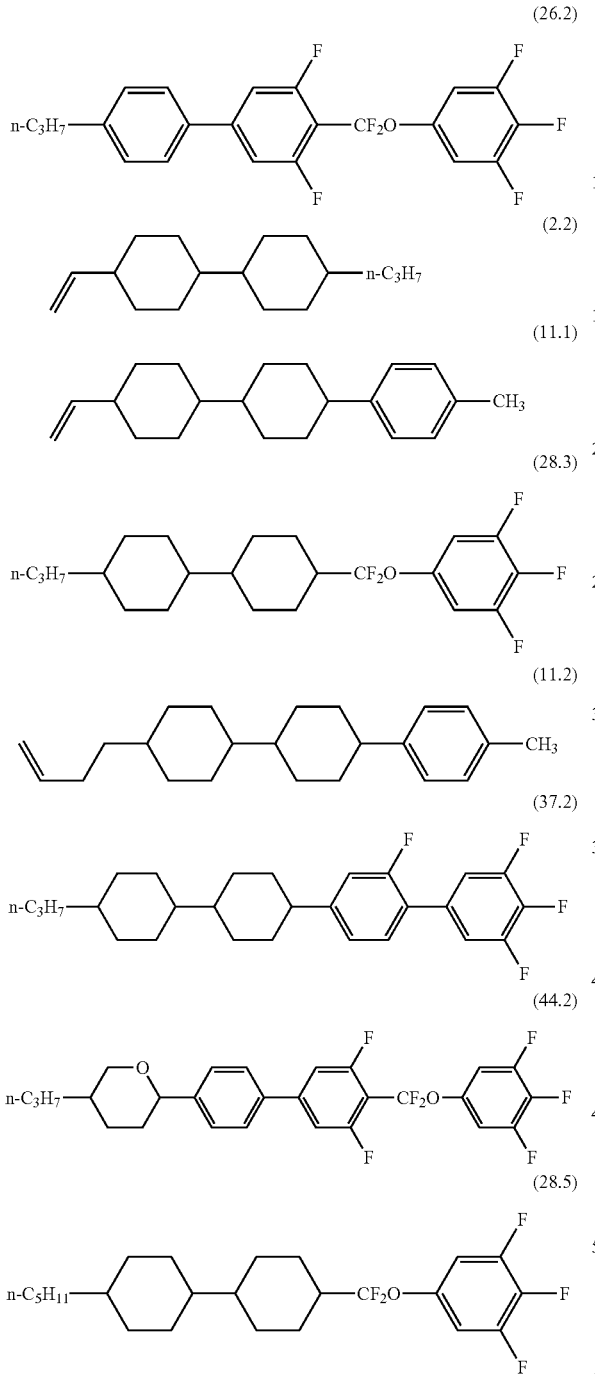

TABLE 2-continued

| | Example 2 | Example 3 | Example 4 |
|---|---|---|---|
| Formula (11.1) | 20 | 20 | 20 |
| Formula (28.3) | 10 | 10 | 8 |
| Formula (11.2) | 5 | 5 | 5 |
| Formula (37.2) | 5 | 5 | 5 |
| Formula (44.2) | 5 | 3 | 7 |
| Formula (28.5) | 10 | 12 | 10 |

In Table 2, a numerical value of each of the formulae represents a ratio (unit: % by mass) of each of the compounds contained in each composition.

Example 5 and Comparative Examples 3 and 4

Compositions were prepared by using compounds represented by chemical formulae below, and physical properties thereof were measured. The results are shown in Table 3.

[Chem. 175]

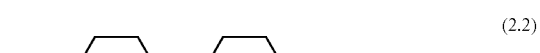
(2.2)

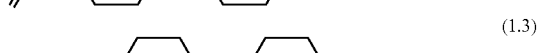
(1.3)

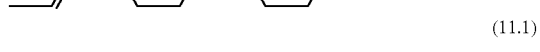
(11.1)

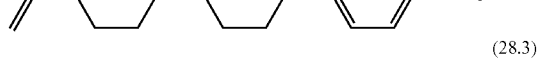
(28.3)

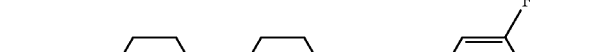
(26.2)

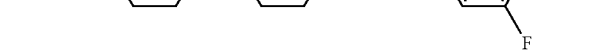
(45.2)

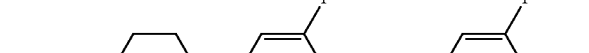
(44.1)

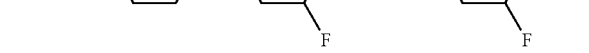

TABLE 2

| | Example 2 | Example 3 | Example 4 |
|---|---|---|---|
| Tni (° C.) | 87.9 | 87.6 | 88.3 |
| Δn | 0.095 | 0.094 | 0.097 |
| Δε | 9.4 | 8.9 | 9.7 |
| η (mPa · s) | 15 | 15 | 16 |
| γ1 (mPa · s) | 88 | 81 | 95 |
| Formula (26.2) | 15 | 15 | 15 |
| Formula (2.2) | 30 | 30 | 30 |

-continued

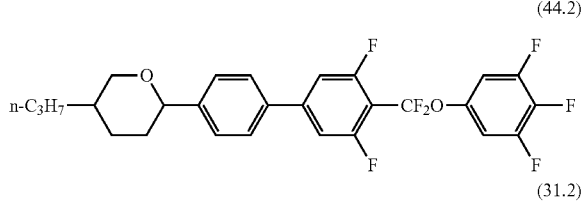

(44.2)

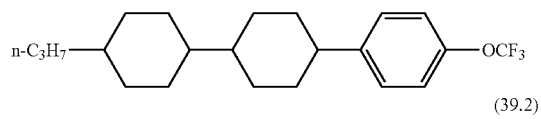

(31.2)

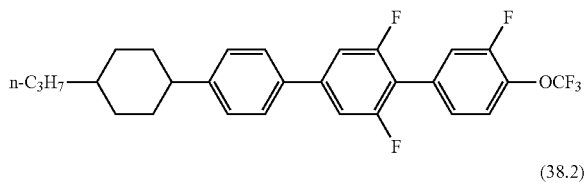

(39.2)

(38.2)

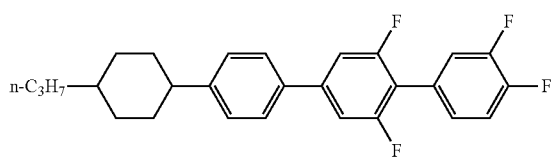

TABLE 3

|  | Example 5 | Comparative Example 3 | Comparative Example 4 |
|---|---|---|---|
| Tni (° C.) | 93.9 | 96.8 | 90.9 |
| Δn | 0.125 | 0.130 | 0.121 |
| Δε | 21.7 | 26.5 | 20.6 |
| η (mPa·s) | 44 | 62 | 39 |
| γ1 (mPa·s) | 230 | 289 | 198 |
| Formula (2.2) | 35 | 35 | 35 |
| Formula (1.3) | 15 | 15 | 15 |
| Formula (11.1) | 5 | 5 | 5 |
| Formula (28.3) | 5 | 5 | 10 |
| Formula (26.2) | 10 | 10 | 10 |
| Formula (45.2) | 5 | 10 | 10 |
| Formula (44.1) | 5 | 5 | 0 |
| Formula (44.2) | 5 | 5 | 0 |
| Formula (31.2) | 5 | 10 | 5 |
| Formula (39.2) | 5 | 0 | 5 |
| Formula (38.2) | 5 | 0 | 5 |

In Table 3, a numerical value of each of the formulae represents a ratio (unit: % by mass) of each of the compounds contained in each composition.

Comparative Example 3 is a liquid crystal composition containing compounds represented by the formula (45.2) and the formula (31.2) substituted for compounds (compounds represented by the formula (39.2) and the formula (38.2)) contained in a liquid crystal composition of Example 5 and represented by the general formula (i). Comparing physical property values of Example 5 with those of Comparative Example 3, a value of η and a value or γ1 are significantly increased by removing the compounds represented by the general formula (i). Therefore, Example 5 has lower viscosity and can achieve fast response when used in a liquid crystal display device.

Comparative Example 4 is a liquid crystal composition containing compounds represented by the formula (28.3) and the formula (45.2) substituted for compounds (compounds represented by the formula (44.1) and the formula (44.2)) contained in the liquid crystal composition of Example 5 and represented by the general formula (ii). Comparing the results of Example 5 with those of Comparative Example 4, Tni is decreased by removing the compounds represented by the general formula (ii), and further Δn and Δε are also decreased.

Examples 6 to 8

Compositions were prepared by using compounds represented by chemical formulae below, and physical properties thereof were measured. The results are shown in Table 4.

[Chem. 176]

(2.2)

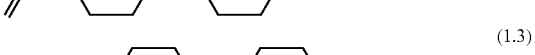

(1.3)

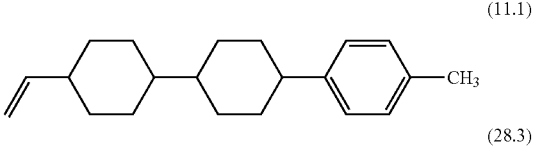

(11.1)

(28.3)

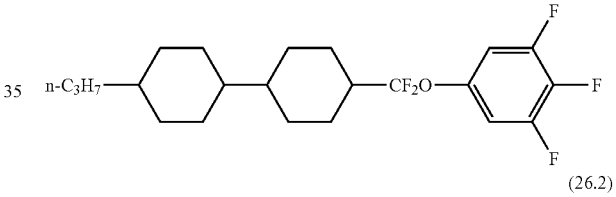

(26.2)

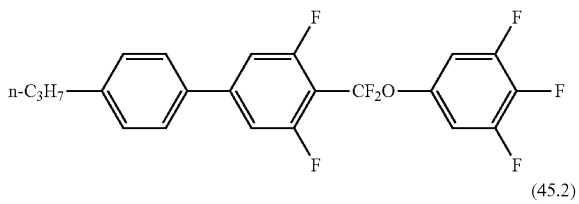

(45.2)

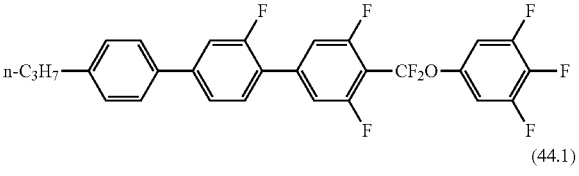

(44.1)

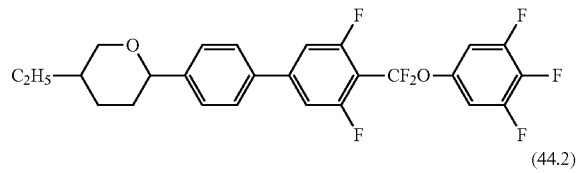

(44.2)

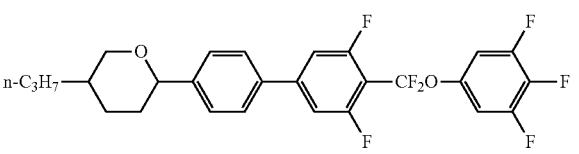

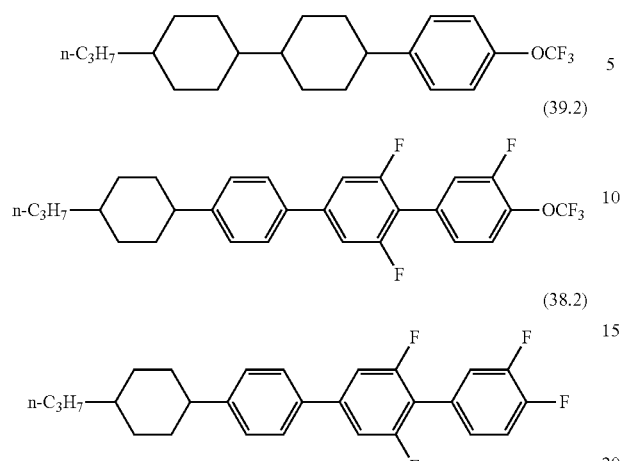

TABLE 4

|  | Example 6 | Example 7 | Example 8 |
| --- | --- | --- | --- |
| Tni (° C.) | 94.8 | 95.1 | 96.5 |
| Δn | 0.121 | 0.123 | 0.126 |
| Δε | 17.1 | 19.2 | 21.0 |
| η (mPa · s) | 35 | 40 | 46 |
| γ1 (mPa · s) | 190 | 222 | 245 |
| Formula (2.2) | 39 | 40 | 35 |
| Formula (1.3) | 17 | 15 | 15 |
| Formula (11.1) | 5 | 5 | 5 |
| Formula (28.3) | 2 | 2 | 2 |
| Formula (26.2) | 8 | 8 | 8 |
| Formula (45.2) | 4 | 4 | 5 |
| Formula (44.1) | 4 | 6 | 6 |
| Formula (44.2) | 4 | 6 | 6 |
| Formula (31.2) | 6 | 6 | 6 |
| Formula (39.2) | 6 | 4 | 6 |
| Formula (38.2) | 5 | 4 | 6 |

In Table 4, a numerical value of each of the formulae represents a ratio (unit: % by mass) of each of the compounds contained in each composition.

Example 9 and Comparative Examples 5 and 6

Compositions were prepared by using compounds represented by chemical formulae below, and physical properties thereof were measured. The results are shown in Table 5.

[Chem. 177]

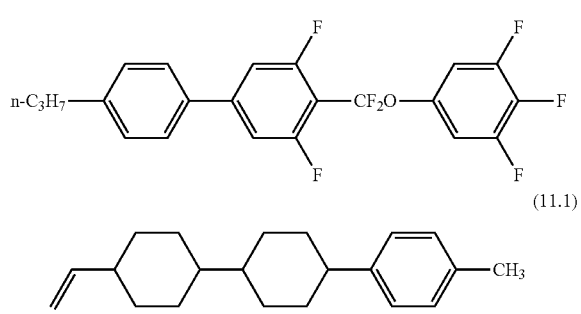

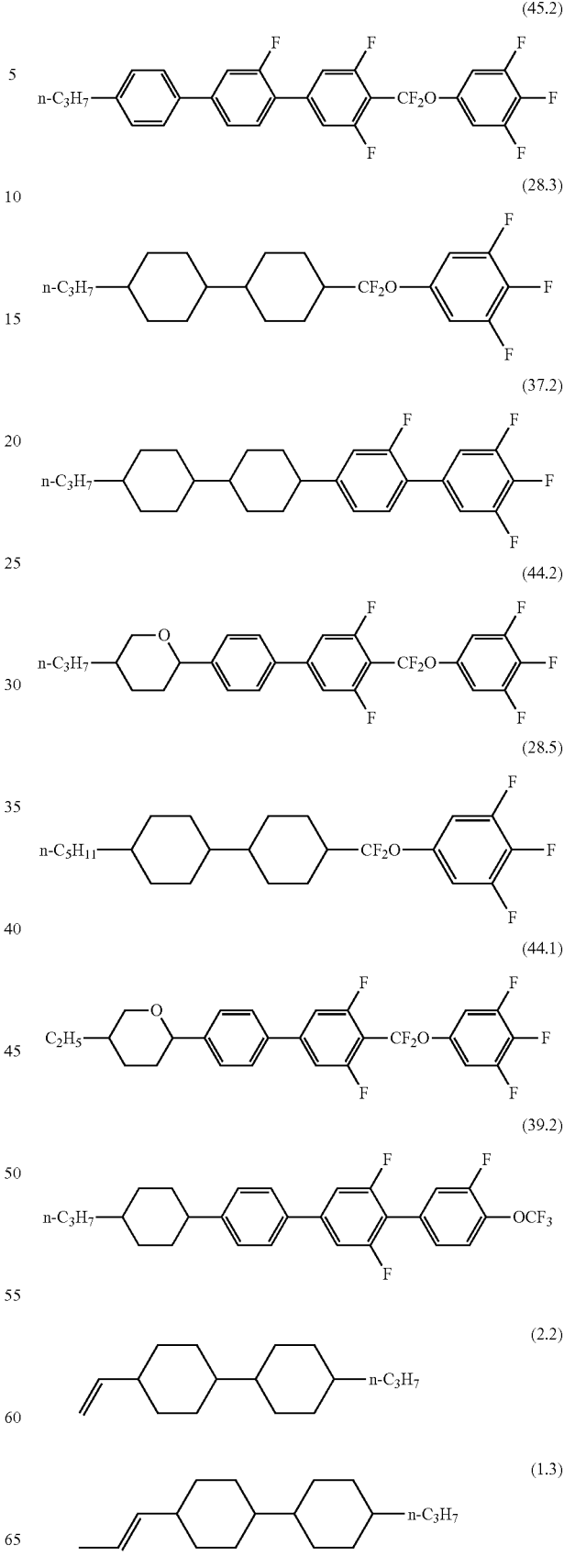

TABLE 5

|  | Example 9 | Comparative Example 5 | Comparative Example 6 |
|---|---|---|---|
| Tni (° C.) | 94.4 | 85.6 | 92.5 |
| Δn | 0.111 | 0.105 | 0.107 |
| Δε | 13.2 | 13.4 | 11.6 |
| η (mPa · s) | 19 | 18 | 15 |
| γ1 (mPa · s) | 126 | 121 | 95 |
| Formula (26.2) | 10 | 10 | 10 |
| Formula (11.1) | 5 | 5 | 5 |
| Formula (45.2) | 5 | 5 | 10 |
| Formula (28.3) | 5 | 10 | 10 |
| Formula (37.2) | 5 | 0 | 5 |
| Formula (44.2) | 8 | 10 | 0 |
| Formula (28.5) | 8 | 10 | 10 |
| Formula (44.1) | 7 | 10 | 0 |
| Formula (39.2) | 7 | 0 | 10 |
| Formula (2.2) | 30 | 30 | 30 |
| Formula (1.3) | 10 | 10 | 10 |

In Table 5, a numerical value of each of the formulae represents a ratio (unit: % by mass) of each of the compounds contained in each composition.

Comparative Example 5 is a liquid crystal composition containing compounds represented by the formula (44.2), the formula (28.5), and the formula (44.1) substituted for compounds (compounds represented by the formula (37.2) and the formula (39.2)) contained in a liquid crystal composition of Example 9 and represented by the general formula (i). Comparing physical property values of Example 9 with those of Comparative Example 5, a temperature of Tni is significantly decreased by removing the compounds represented by the general formula (i). Therefore, Example 9 has a higher Tni temperature and can be used in a wider temperature range.

Comparative Example 6 is a liquid crystal composition containing compounds represented by the formula (45.2), the formula (28.3), the formula (28.5), and the formula (39.2) substituted for compounds (compounds represented by the formula (44.1) and the formula (44.2)) contained in the liquid crystal composition of Example 9 and represented by the general formula (ii). Comparing the results of Example 9 with those of Comparative Example 6, Tni is decreased by removing the compounds represented by the general formula (ii), and further Δ∈ is also decreased.

Examples 10 to 12

Compositions were prepared by using compounds represented by chemical formulae below, and physical properties thereof were measured. The results are shown in Table 6.

[Chem. 177]

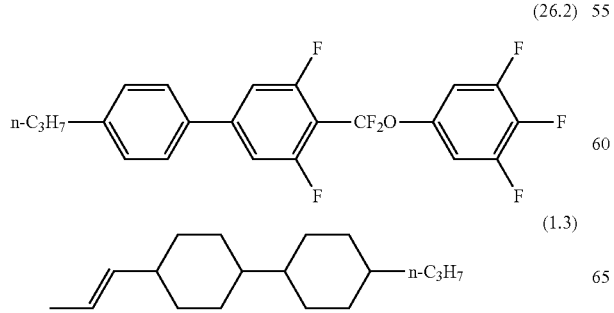

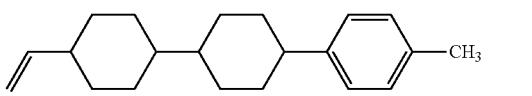

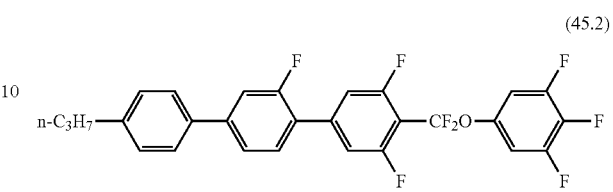

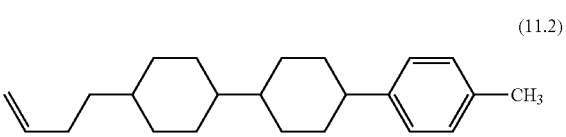

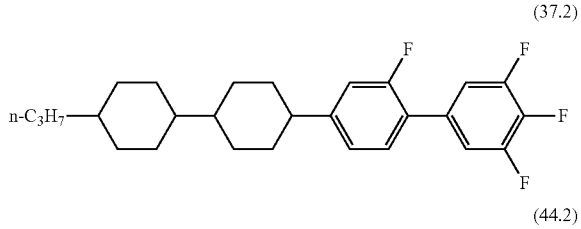

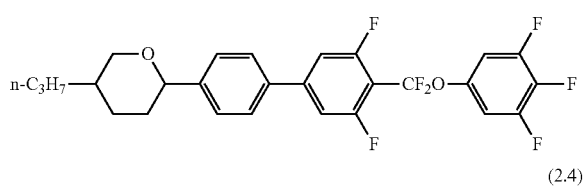

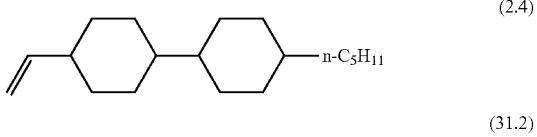

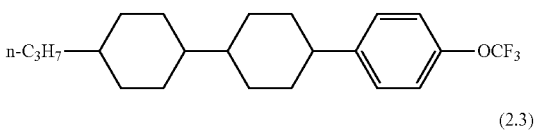

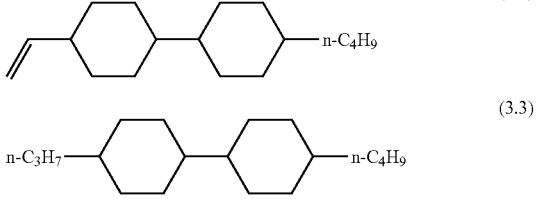

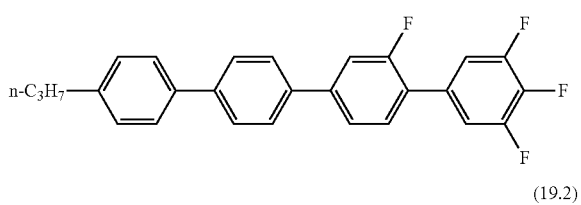

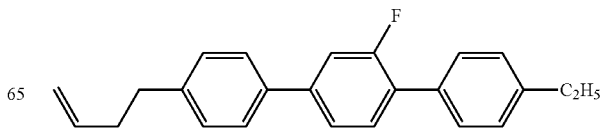

-continued

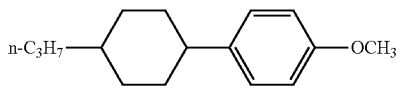
(6.3)

TABLE 6

|  | Example 10 | Example 11 | Example 12 |
|---|---|---|---|
| Tni (° C.) | 89.9 | 87.1 | 94.2 |
| Δn | 0.105 | 0.105 | 0.105 |
| η (mPa · s) | 14 | 15 | 15 |
| γ1 (mPa · s) | 70 | 75 | 82 |
| Formula (26.2) | 9 | 9 | 6 |
| Formula (1.3) | 8 | 8 | 8 |
| Formula (11.1) | 17 | 17 | 17 |
| Formula (45.2) | 5 | 5 | 5 |
| Formula (11.2) | 9 | 9 | 9 |
| Formula (37.2) | 7 | 4 | 7 |
| Formula (44.2) | 4 | 7 | 7 |
| Formula (2.4) | 10 | 10 | 10 |
| Formula (31.2) | 3 | 3 | 3 |
| Formula (2.3) | 11 | 11 | 11 |
| Formula (3.3) | 4 | 4 | 4 |
| Formula (41.2) | 1 | 1 | 1 |
| Formula (19.2) | 1 | 1 | 1 |
| Formula (6.3) | 11 | 11 | 11 |

In Table 6, a numerical value of each of the formulae represents a ratio (unit: % by mass) of each of the compounds contained in each composition.

Examples 13 to 15

Compositions were prepared by using compounds represented by chemical formulae below, and physical properties thereof were measured. The results are shown in Table 7.

[Chem. 179]

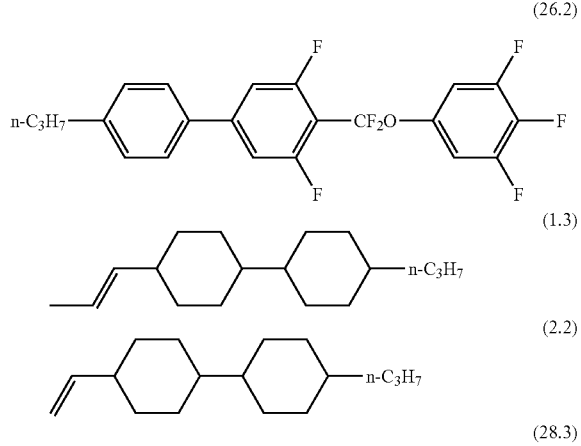

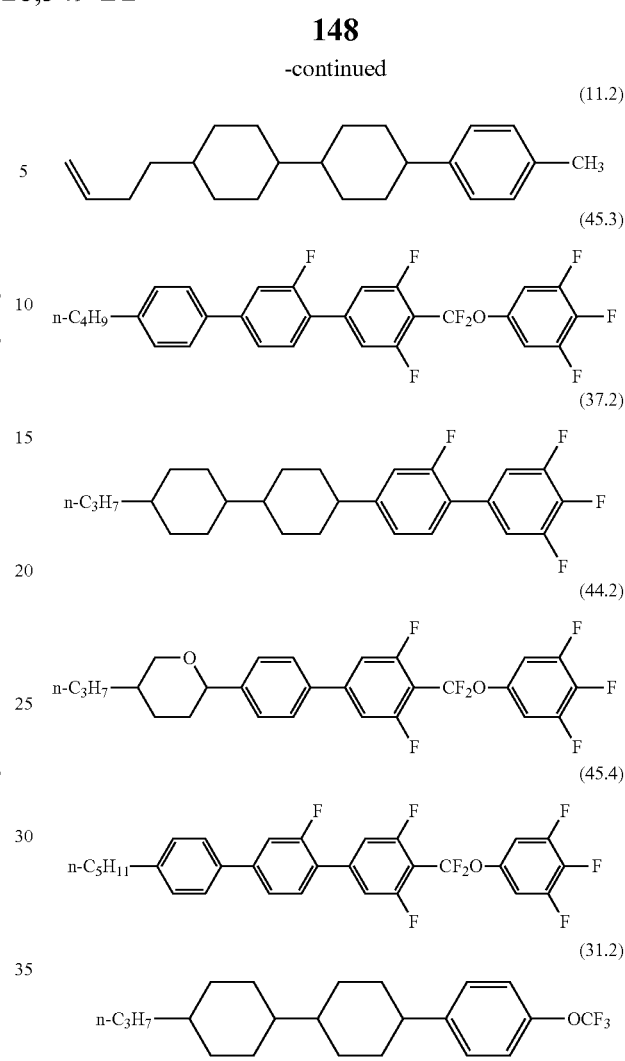

TABLE 7

|  | Example 13 | Example 14 | Example 15 |
|---|---|---|---|
| Tni (° C.) | 91.0 | 94.2 | 95.2 |
| Δn | 0.100 | 0.099 | 0.102 |
| Δε | 9.0 | 8.5 | 9.6 |
| γ1 (mPa · s) | 90 | 84 | 111 |
| Formula (26.2) | 7 | 7 | 7 |
| Formula (1.3) | 15 | 15 | 15 |
| Formula (2.2) | 30 | 30 | 30 |
| Formula (28.3) | 7 | 7 | 7 |
| Formula (11.2) | 12 | 12 | 12 |
| Formula (45.3) | 7 | 6 | 7 |
| Formula (37.2) | 2 | 5 | 8 |
| Formula (44.2) | 6 | 4 | 6 |
| Formula (45.4) | 3 | 3 | 3 |
| Formula (31.2) | 11 | 11 | 5 |

In Table 7, a numerical value of each of the formulae represents a ratio (unit: % by mass) of each of the compounds contained in each composition.

Examples 16 to 18

Compositions were prepared by using compounds represented by chemical formulae below, and physical properties thereof were measured. The results are shown in Table 8.

[Chem. 180]

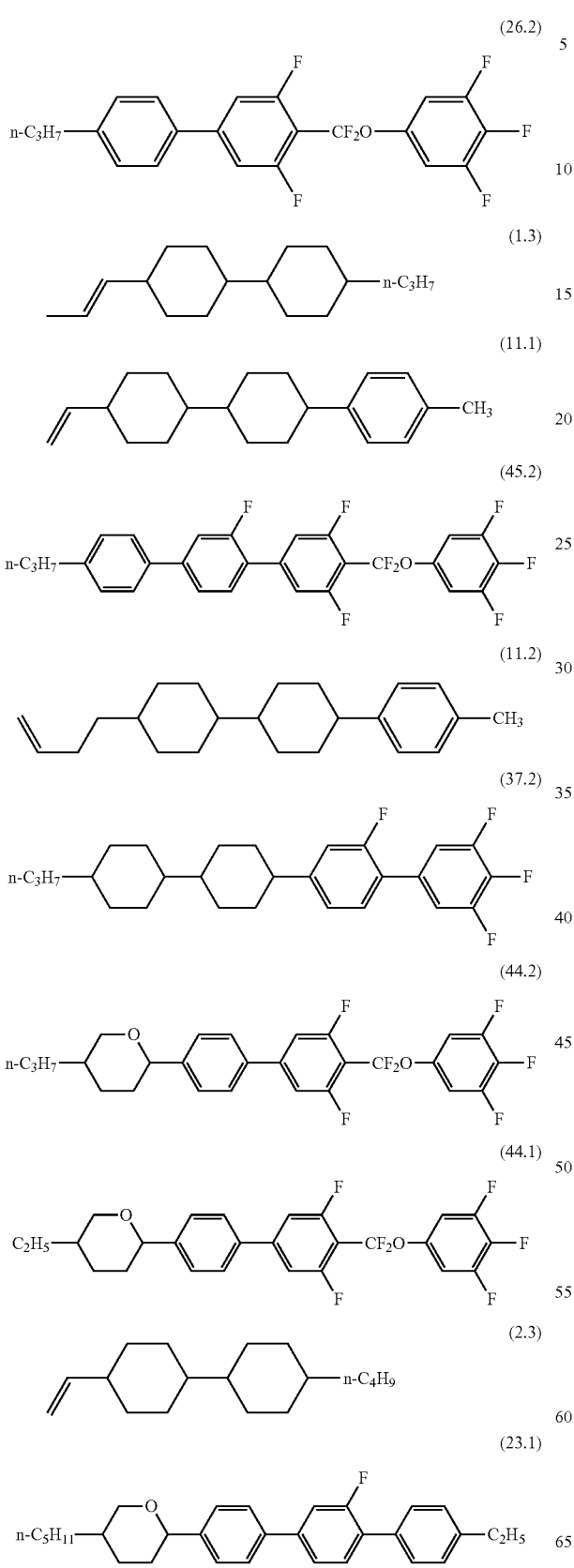

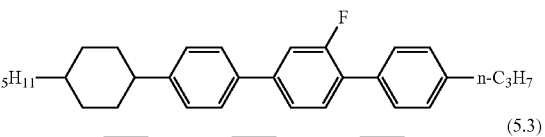

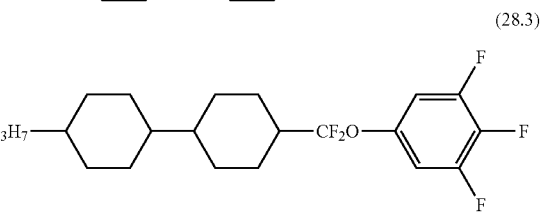

TABLE 8

| | Example 16 | Example 17 | Example 18 |
|---|---|---|---|
| Tni (° C.) | 118.2 | 118.4 | 116.5 |
| Δn | 0.130 | 0.134 | 0.126 |
| Δε | 10.4 | 15.0 | 9.7 |
| η (mPa · s) | 24 | 31 | 21 |
| γ1 (mPa · s) | 125 | 167 | 108 |
| Formula (26.2) | 15 | 15 | 15 |
| Formula (1.3) | 10 | 10 | 10 |
| Formula (11.1) | 15 | 6 | 15 |
| Formula (45.2) | 5 | 5 | 5 |
| Formula (11.2) | 10 | 10 | 10 |
| Formula (37.2) | 5 | 8 | 4 |
| Formula (44.2) | 5 | 8 | 3 |
| Formula (44.1) | 5 | 8 | 3 |
| Formula (2.3) | 15 | 15 | 15 |
| Formula (23.1) | 5 | 5 | 5 |
| Formula (23.2) | 5 | 5 | 5 |
| Formula (5.3) | 5 | 5 | 5 |
| Formula (28.3) | 0 | 0 | 5 |

In Table 8, a numerical value of each of the formulae represents a ratio (unit: % by mass) of each of the compounds contained in each composition.

Examples 19 to 21

Compositions were prepared by using compounds represented by chemical formulae below, and physical properties thereof were measured. The results are shown in Table 9.

[Chem. 181]

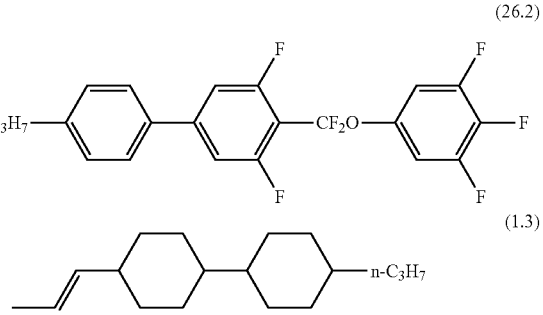

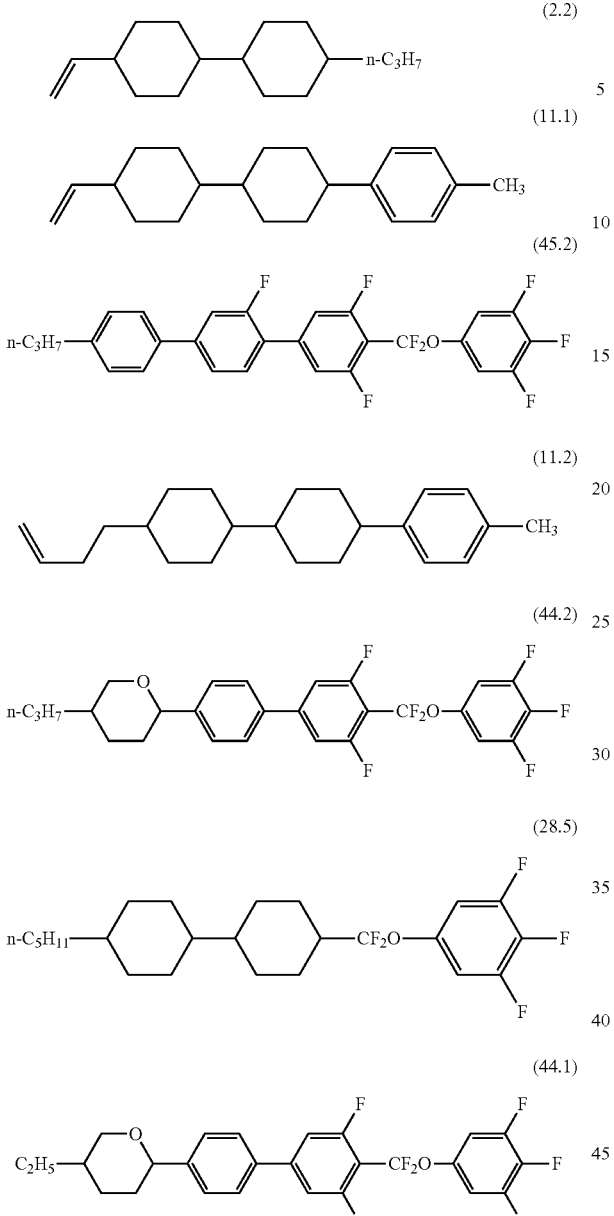

TABLE 9

|  | Example 19 | Example 20 | Example 21 |
|---|---|---|---|
| Tni (° C.) | 87.4 | 87 | 87.8 |
| Δn | 0.105 | 0.105 | 0.105 |
| Δε | 9.5 | 9.5 | 9.5 |
| γ1 (mPa·s) | 96 | 96 | 96 |
| Formula (26.2) | 10 | 10 | 10 |
| Formula (1.3) | 7 | 7 | 7 |
| Formula (2.2) | 25 | 25 | 25 |
| Formula (11.1) | 15 | 15 | 15 |
| Formula (45.2) | 5 | 5 | 5 |
| Formula (11.2) | 8 | 8 | 8 |
| Formula (44.2) | 5 | 3 | 7 |
| Formula (28.5) | 5 | 5 | 5 |
| Formula (44.1) | 5 | 7 | 3 |
| Formula (54.2) | 5 | 5 | 5 |
| Formula (28.3) | 10 | 10 | 10 |

In Table 9, a numerical value of each of the formulae represents a ratio (unit: % by mass) of each of the compounds contained in each composition.

Evaluations of initial VHR, VHR after heating (150° C. for 1 hour), image sticking, volatility, process adaptability, and solubility at a low temperature of the liquid crystal composition of each of the examples are described.

TABLE 10

|  | Example 2 | Example 6 | Example 9 | Example 10 | Example 13 | Example 16 | Example 19 |
|---|---|---|---|---|---|---|---|
| Initial VHR (%) | 99.2 | 99.3 | 99.1 | 99.2 | 99.1 | 99.4 | 99.3 |
| VHR after heating (%) | 98.0 | 98.2 | 98.2 | 98.1 | 98.3 | 98.3 | 98.2 |
| Image sticking | A | B | B | B | A | A | A |
| Volatility | A | B | B | A | A | A | A |
| Process adaptability | A | A | A | A | A | A | A |
| Solubility at low temperature | B | B | A | B | B | B | B |

As a result of the same evaluation conducted for the liquid crystal compositions of the examples other than Examples 2, 6, 9, 10, 13, 16, and 19 shown in the above table, good results were obtained.

The configuration and combination in each of the embodiments described above are only examples, and addition, omission, replacement, and other modifications of the configuration can be made within a range not deviating from the gist of the present invention. Also, the present invention is not limited to the embodiments and is limited only by the scope of the claims.

INDUSTRIAL APPLICABILITY

A liquid crystal composition according to the present invention can be widely applied to the field of a liquid crystal display device and liquid crystal display.

REFERENCE SIGNS LIST

100 . . . first substrate, 102 . . . TFT layer, 103 . . . pixel electrode, 104 . . . passivation film, 105 . . . first alignment film, 200 . . . second substrate, 201 . . . planarization film (overcoat layer), 202 . . . black matrix, 203 . . . color filter, 204 . . . transparent electrode, 205 . . . second alignment film, 301 . . . sealing material, 302 . . . projection (columnar spacer), 303 . . . liquid crystal layer, 304 . . . projection (columnar spacer), 401 . . . mask pattern, 402 . . . resin layer, L . . . light

The invention claimed is:

1. A liquid crystal composition, comprising:
a compound represented by general formula (X-1-2) below, wherein the compound represented by general formula (X-1-2) is included in the liquid crystal composition, and a content of the compound represented by general formula (X-1-2) is 7% by mass or less;
a compound represented by general formula (ii) below;
a compound represented by general formula (VIII) below,
a compound represented by formula (2.2) below; and
a compound represented by general formula (XI) below:

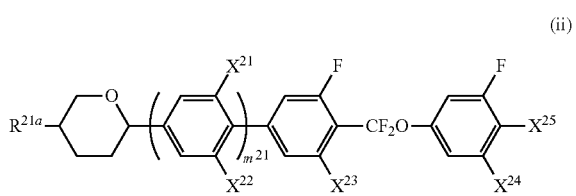

(in the formula (ii), $R^{21a}$ represents an alkyl group having 1 to 8 carbon atoms; one or nonadjacent two or more —CH$_2$— in the alkyl group may be each independently substituted by —CH=CH—, —C≡C—, —O—, —CO—, —COO—, or —OCO—; one or two or more hydrogen atoms in the alkyl group may be each independently substituted by a fluorine atom or a chlorine atom;

$m^{21}$ represents 0 or 1; $X^{21}$, $X^{22}$, $X^{23}$, and $X^{24}$ each independently represent a hydrogen atom, a fluorine atom, or a chlorine atom; and $X^{25}$ represents a hydrogen atom, a fluorine atom, a chlorine atom, a cyano group, —CF$_3$, or —OCF$_3$),

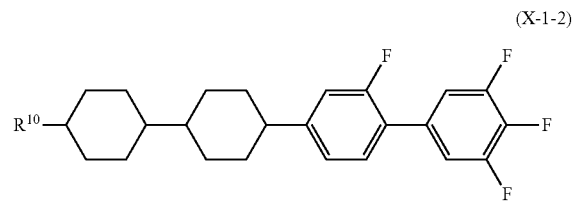

(in the formula (X-1-2), $R^{10}$ represents an alkyl group having 1 to 5 carbon atoms, an alkenyl group having 2 to 5 carbon atoms, or an alkoxy group having 1 to 4 carbon atoms),

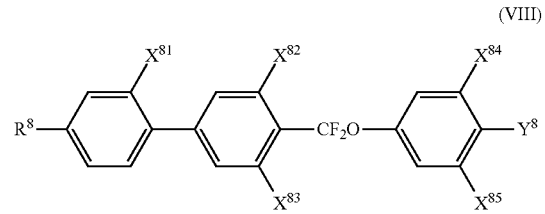

(in the formula (VIII), $R^8$ represents an alkyl group having 1 to 5 carbon atoms, an alkenyl group having 2 to 5 carbon atoms, or an alkoxy group having 1 to 4 carbon atoms, $X^{81}$ to $X^{85}$ each independently represent a hydrogen atom or a fluorine atom, and $Y^8$ represents a fluorine atom or —OCF$_3$),

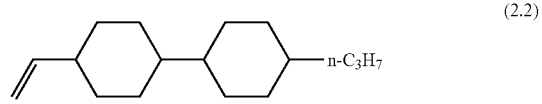

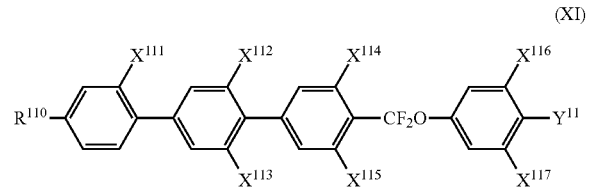

(in the formula, $X^{111}$ to $X^{117}$ each independently represent a fluorine atom or a hydrogen atom, at least one of $X^{111}$ to $X^{117}$ represents a fluorine atom, $R^{110}$ represents an alkyl group having 1 to 5 carbon atoms, an alkenyl group having 2 to 5 carbon atoms, or an alkoxy group having 1 to 4 carbon atoms, and $Y^{11}$ represents a fluorine atom or —OCF$_3$).

2. The liquid crystal composition according to claim 1, further comprising another compound represented by the general formula (X-1-2).

3. The liquid crystal composition according to claim 1, further comprising another compound represented by the general formula (ii).

4. The liquid crystal composition according to claim 1, further comprising a compound represented by general formula (L) below,

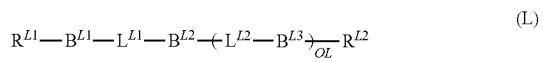

(in the formula, $R^{L1}$ and $R^{L2}$ each independently represent an alkyl group having 1 to 8 carbon atoms; one or nonadjacent two or more —$CH_2$— in the alkyl group may be each independently substituted by —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of:

(a) a 1,4-cyclohexylene group (one —$CH_2$— or nonadjacent two or more —$CH_2$— present in the group may be substituted by —O—); and (b) a 1,4-phenylene group (one —CH= or nonadjacent two or more —CH= present in the group may be substituted by —N=), and one and/or two or more hydrogen atoms in the group (a) and the group (b) may be each independently substituted by a cyano group, a fluorine atom, or a chlorine atom;

$L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—; and when OL is 2 or 3, and a plurality of $L^{L2}$ are present, $L^{L2}$ may be the same or different, and when OL is 2 or 3, and a plurality of $B^{L3}$ are present, $B^{L3}$ may be the same or different).

5. The liquid crystal composition according to claim 1, further comprising a compound represented by general formula (M) below,

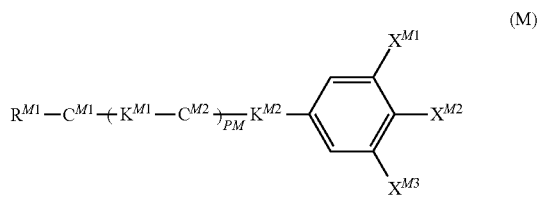

(M)

(in the formula, $R^{M1}$ represents an alkyl group having 1 to 8 carbon atoms; one or nonadjacent two or more —$CH_2$— in the alkyl group may be each independently substituted by —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of:

(d) a 1,4-cyclohexylene group (one —$CH_2$— or nonadjacent two or more —$CH_2$— present in the group may be substituted by —O— or —S—); and (e) a 1,4-phenylene group (one —CH= or nonadjacent two or more —CH= present in the group may be substituted by —N=), and one and/or two or more hydrogen atoms in the group (d) and the group (e) may be each independently substituted by a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

when PM is 2, 3, or 4, and a plurality of $K^{M1}$ are present, $K^{M1}$ may be the same or different, and when PM is 2, 3, or 4, and a plurality of $C^{M2}$ are present, $C^{M2}$ may be the same or different;

$X^{M1}$ and $X^{M3}$ each independently represent a hydrogen atom, a chlorine atom, or a fluorine atom; and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group, with the compounds represented by the general formula (i) and the general formula (ii) being excluded).

6. A liquid crystal display device comprising the liquid crystal composition according to claim 1.

7. A liquid crystal display device for an IPS mode, an OCB mode, an ECB mode, a VA mode, or a FFS mode comprising the liquid crystal composition according to claim 1.

8. A liquid crystal display comprising the liquid crystal display device according to claim 7.

9. A liquid crystal display comprising the liquid crystal display device according to claim 8.

10. The liquid crystal composition according to claim 1, wherein the liquid crystal composition has a rotational viscosity γ1 at 295K of 70 to 90 mPa·s.

11. The liquid crystal composition according to claim 1, further comprising a compound represented by general formula (IX-2),

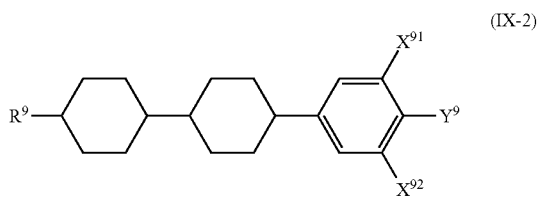

(IX-2)

wherein $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, and $Y^9$ represents a fluorine atom, a chlorine atom, or —$OCF_3$.

12. The liquid crystal composition according to claim 1, wherein the alkyl group of the $R^{10}$ has 3 carbon atoms.

13. The liquid crystal composition according to claim 1, wherein the compound represented by general formula (X-1-2) is included in the liquid crystal composition at a content of 1% by mass or more.

14. The liquid crystal composition according to claim 1, wherein the compound represented by general formula (X-1-2) is included in the liquid crystal composition at a content of 2% by mass or more.

* * * * *